United States Patent

Komatsuzaki et al.

[11] Patent Number: 6,091,902
[45] Date of Patent: Jul. 18, 2000

[54] ZOOM CAMERA WITH PSEUDO ZOOMING FUNCTION

[75] Inventors: Hiroshi Komatsuzaki; Yasuhiro Nishitani; Yoichi Iwasaki; Hiroshi Omura; Osamu Inaba; Takashi Suzuki; Hideo Kobayashi, all of Saitama, Japan

[73] Assignees: Fuji Photo Film Co., Ltd., Kanagawa; Fuji Photo Optical Co., Ltd., Saitama, both of Japan

[21] Appl. No.: 09/257,378

[22] Filed: Feb. 25, 1999

[30] Foreign Application Priority Data

| Feb. 25, 1998 | [JP] | Japan | 10-043201 |
| Feb. 25, 1998 | [JP] | Japan | 10-043580 |
| Feb. 25, 1998 | [JP] | Japan | 10-043581 |
| Feb. 25, 1998 | [JP] | Japan | 10-043649 |
| Feb. 25, 1998 | [JP] | Japan | 10-043988 |
| Feb. 25, 1998 | [JP] | Japan | 10-043989 |
| Feb. 25, 1998 | [JP] | Japan | 10-044064 |

[51] Int. Cl.[7] ............................................. G03B 17/00
[52] U.S. Cl. ............................................................ 396/60
[58] Field of Search ................................................ 396/60

[56] References Cited

U.S. PATENT DOCUMENTS

| 4,583,831 | 4/1986 | Harvey . | |
| 5,606,383 | 2/1997 | Daitoku et al. | 396/60 |
| 5,627,622 | 5/1997 | Ootsuka et al. | 396/60 |
| 5,694,624 | 12/1997 | Daitoku et al. | 396/60 |

FOREIGN PATENT DOCUMENTS

| 3-92838 | 4/1991 | Japan . |
| 4-27927 | 1/1992 | Japan . |
| 4-317035 | 11/1992 | Japan . |
| 4-322231 | 11/1992 | Japan . |
| 5-82921 | 11/1993 | Japan . |

Primary Examiner—Russell Adams
Attorney, Agent, or Firm—Young & Thompson

[57] ABSTRACT

A zoom camera with a pseudo zooming function for assigning a frame a pseudo zoom ratio by which a printing area and a print magnification of the frame are modified to obtain a photo print that looks like being photographed at a virtual focal length that is equal to a multiplication product of the pseudo zoom ratio and an actual focal length of a taking lens used for photographing the frame. A virtual focal length is determined in accordance with operating direction and amount of a manual zooming operation member. A viewfinder is controlled in correspondence with the virtual focal length, to show a photographic field to be contained in a photo print as photographed at the virtual focal length. In accordance with a predetermined relationship between virtual focal length and actual focal length and pseudo zoom ratio, actual focal length of the taking lens is changed depending upon the virtual focal length, and a pseudo zoom ratio is decided to each frame depending upon the virtual focal length determined at the photography of that frame. The pseudo zoom ratio is recorded in association with the photographed frame.

22 Claims, 41 Drawing Sheets

FIG. 22
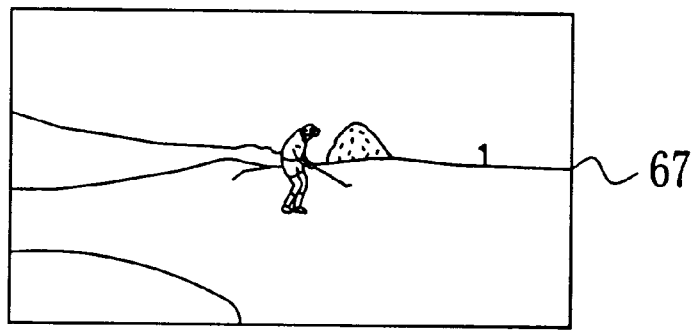
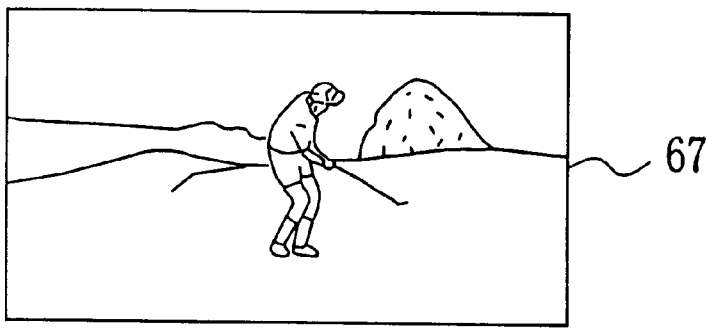
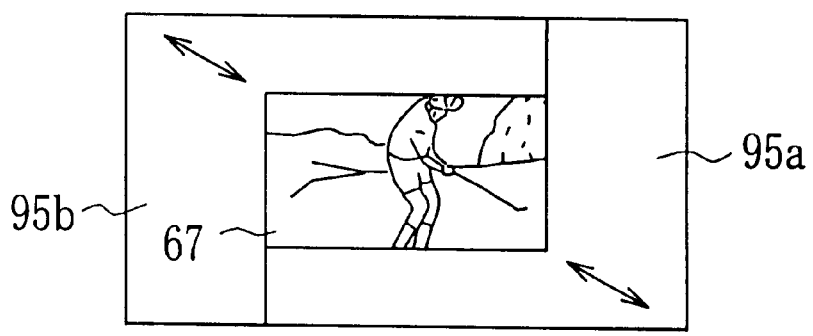

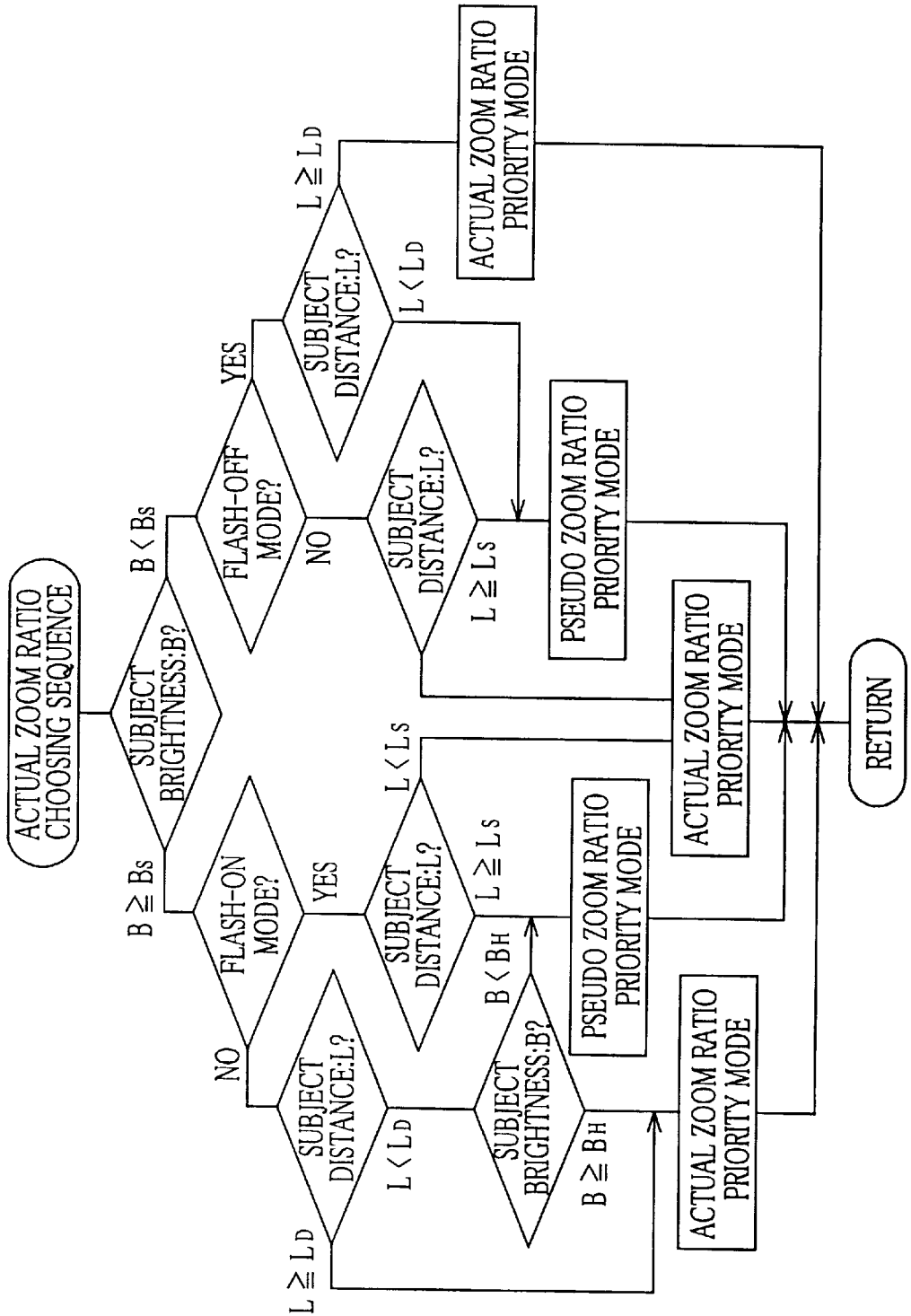

ZOOM CAMERA WITH PSEUDO ZOOMING FUNCTION

BACKGROUND OF THE INVENTION

1. Field of the Invention

The present invention relates to a zoom camera that uses a zoom lens for photography and has a pseudo zooming function by which a photo print contains a virtually magnified subject compared to the original frame photographed through the zoom camera, so the photo print looks like being photographed at a longer focal length than an actual focal length of the taking lens actually used for photographing the original frame.

2. Background Arts

In standard photo-printing, a substantially whole area of an individual frame photographed on a photo filmstrip is printed at a standard magnification to provide a photo-print of a constant size. On the contrary, in a pseudo zooming print system, that is disclosed for example in JPA 3-92838, JPA 4-27927 and JPA 4-317035, a partial area to print within an original frame is defined by trimming or masking four sides of the original frame, and a photo-print of the constant size is made from the defined partial area by printing at a larger magnification than the standard magnification. As a result, the photo-print contains only those subjects included the partial area but which are enlarged as if they were taken at a larger focal length than the actual one. This is called "pseudo zooming effect". Hereinafter, the ratio of a magnification used for the pseudo zoom printing to the standard print magnification is referred to as the pseudo zoom ratio. In other words, the focal length that is virtually obtained by the pseudo zooming is larger than the actual focal length by the pseudo zoom ratio.

In the above prior arts, data indicating whether the pseudo zooming print is designated or not, data of the area to print, or data of a selected pseudo zoom ratio is recorded magnetically on the filmstrip in association with respective frames.

JPA 4-27927 and JPA 4-317035 disclose a zoom camera that uses a zoom lens for photography and also has the pseudo zooming function. By using the pseudo zooming function in combination with the zoom lens, a zoom ratio that is larger than a maximum zoom ratio of the zoom lens is obtained in view of the subsequent photo-prints. In other words, the camera of these prior arts virtually has a larger maximum zoom ratio than an actual maximum zoom ratio of the taking lens. Therefore, the zoom lens itself may be comparatively small or cheap.

Also, JPA 4-322231 discloses a zoom camera, wherein an image magnification is automatically determined depending upon a subject distance measured by the camera. According to the determined image magnification, a focal length of the taking lens is changed, and a pseudo zoom ratio is determined depending upon the focal length. To show a virtual photographic field that will be contained in a photo-print obtained by the pseudo zooming print method, the camera of this prior art uses movable relaying lenses for a finder optical system, so as to change the focal length of the finder optical system in correspondence with the pseudo zoom ratio besides the change in the focal length of the taking lens. A mirror is used for splitting the light passing through the taking lens and directing it toward the finder optical system. In this way, a field of view that approximately corresponds to the virtual photographic field.

However, in the camera disclosed in JPA 4-27927, the photographer must choose whether to use the pseudo zooming function or not after zooming up to a telephoto terminal. Therefore, for those who do not well know the pseudo zooming function, the function is not easy to handle, especially where there are several options in the pseudo zoom ratio.

The camera disclosed in JPA 4-317035 automatically switches over the pseudo zoom ratio from 1.0 to a larger value, e.g. 1.7 when the photographer zooms up further to a telephoto side after the taking lens actually reaches its maximum focal length. Thereafter, as the photographer zooms down to a wide-angle side, the focal length of the taking lens is decreased while maintaining the pseudo zoom ratio at the larger value. When the photographer zooms down further to the wide-angle side after the taking lens actually reaches its minimum focal length, the pseudo zoom ratio is reset to 1.0. While the taking lens is zoomed in this way, the virtual photographic field is changed correspondingly.

Although the pseudo zooming function is automatically selected in this prior art, the image magnification can changed only one increment for the pseudo zooming after the taking lens is zoomed up to the maximum focal length, so that the magnification change for the pseudo zooming looks abrupt. Since the change in virtual focal length, which is determined by the actual focal length of the taking lens and the pseudo zoom ratio, is not linear, the change in the virtual photographic field and thus the virtual field of view can not change continuously.

It is possible to make the one increment small, but the effect of pseudo zooming is reduced. Moreover, in order to cancel the pseudo zooming function, the photographer needs to zoom down beyond the minimum focal length. This makes the zooming operation inconvenient. Providing several steps of increments in the pseudo zoom ratio makes the switching to or from the pseudo zooming function more complicated.

Furthermore, it is well known in the art that image quality of photographic frames tends to be lowered with the increase in the focal length of the taking lens. Besides that, since a larger print magnification is used for the pseudo zooming print system, image quality of pseudo zooming photo-prints made through the pseudo zooming print system is still more lowered, especially when a large pseudo zoom ratio of 1.7 or more is used. Accordingly, it is desirable to avoid a large pseudo zoom ratio as far as possible for the interest of print quality.

In the zoom camera disclosed in JPA 4-322231, since the pseudo zooming function is always adopted throughout the entire focal length range, and the relationship between the pseudo zoom ratio and the image magnification of the viewfinder is not considered, the print quality is unnecessarily deteriorated. Since the image magnification is automatically determined depending upon the subject distance, the photographer cannot choose an appropriate zooming position. This camera uses a motor for zooming the taking lens and a second motor for zooming the finder optical system, so that the camera is relatively large and expensive.

It is well known in the art to make a print at a different print format or aspect ratio from an original frame. To make a panoramic print, for instance, top and bottom sides of the original frame are trimmed or masked to define an elongated printing area, and the printing area is printed at a larger magnification than the standard print magnification, i.e. about 1.7 times the standard print magnification. For this printing system, data about the designated print format is recorded by the camera side optically or magnetically on the filmstrip.

JPB 5-82921 discloses a zoom camera that has the pseudo zooming function and is also able to select one of different print formats. In this camera, the field of view may be limited correspondingly to the designated print format, but the image magnification of the view finder is not changed in a pseudo zooming range, but only the boundary of the view field is limited according to the pseudo zoom ratio. Therefore, it is not easy for the photographer to imagine how the consequent pseudo zooming print would look.

SUMMARY OF THE INVENTION

In view of the foregoing, a first object of the present invention is to provide a zoom camera which automatically decides whether to adopt the pseudo zooming function or not in order for taking high quality pictures, and the print quality is improved even when the pseudo zooming function is adopted.

A second object of the present invention is to provide a zoom camera wherein it is easy to see through the viewfinder how the photo-print would be finished when the pseudo zooming function is adopted as well as when the pseudo zooming function is not adopted.

A third object of the present invention is to provide a zoom camera having the pseudo zooming function that is easy to handle, operates smoothly, and can be manufactured at a low cost in a compact fashion.

A fourth object of the present invention is to provide a zoom camera having the pseudo zooming function, wherein an optimum combination of actual focal length of the taking lens and pseudo zoom ratio is automatically determined for achieving an ultimate print quality depending upon photographic conditions under which an original frame is individually photographed, without the need for the photographer to consider the photographic conditions. The photographic conditions include the subject distance, the subject brightness, whether the flash light is projected onto the subject, and a designated print format and so forth.

To achieve the above objects, a zoom camera of the present invention is provided with a virtual focal length determining means for determining a virtual focal length in accordance with operating direction and amount of a manual zooming operation member, the virtual focal length ranging from a minimum focal length of the taking lens to a value that is obtained by multiplying a maximum focal length of the taking lens by a maximum pseudo zoom ratio; a finder controlling means for controlling a viewfinder in correspondence with the determined virtual focal length, to show a photographic field to be contained in a photo print as photographed at the determined virtual focal length; a lens zooming means for changing actual focal length of the taking lens depending upon the determined virtual focal length in accordance with a predetermined relationship between virtual focal length and actual focal length and pseudo zoom ratio; a pseudo zoom ratio deciding means for deciding a pseudo zoom ratio depending upon the determined virtual focal length in accordance with the predetermined relationship when a frame is photographed at the determined virtual focal length; and a pseudo zoom ratio recording means for recording the pseudo zoom ratio in association with the photographed frame.

According to a preferred embodiment, the viewfinder constitute an optical zoom finder having a corresponding focal length range to that of virtual focal length, and the finder controlling means changes focal length of the optical zoom finder in correspondence with the determined virtual focal length.

According to a preferred embodiment, the relationship between actual focal length and virtual focal length and pseudo zoom ratio is predetermined such that pseudo zoom ratio is set to be 1.0 and actual focal length of the taking lens is determined to be equal to the determined virtual focal length in a range where the determined virtual focal length is within the maximum focal length of the taking lens, whereas in a range where the determined virtual focal length is above the maximum focal length of the taking lens, actual focal length is maintained at the maximum value, and pseudo zoom ratio is increased or decreased in proportion to operating direction and amount of the manual zooming operation.

According to another preferred embodiment, the relationship between actual focal length and virtual focal length and pseudo zoom ratio is predetermined such that pseudo zoom ratio is set to be 1.0 and actual focal length of the taking lens is determined to be equal to the determined virtual focal length in an actual zooming range where the determined virtual focal length is below the maximum focal length of the taking lens, whereas in a pseudo zooming range where the determined virtual focal length is above the maximum focal length of the taking lens, actual focal length is varied up and down between the maximum value and at least one predetermined smaller value, and pseudo zoom ratio is determined to increase or decrease virtual focal length in proportion to operating direction and amount of the manual zooming operation.

According to still another embodiment, the relationship between actual focal length and virtual focal length and pseudo zoom ratio is predetermined such that actual focal length of the taking lens is determined to be equal to or less than the determined virtual focal length, and is increased or decreased in the same direction as the determined virtual focal length in the whole range of virtual focal length, and pseudo zoom ratio of more than 1.0 is used before the determined virtual focal length reaches the maximum focal length of the taking lens.

According to another preferred embodiment, the whole range of virtual focal length is divided into a plurality of steps, and a pair of actual focal length and pseudo zoom ratio are allocated to each virtual focal length step in the predetermined relationship.

According to a further embodiment, the relationship between actual focal length and virtual focal length and pseudo zoom ratio is predetermined such that the whole range of virtual focal length is divided into a plurality of steps, and at least some of the virtual focal length steps are each allocated a plurality of options of pairs of actual zoom ratio and pseudo zoom ratio, and the pseudo zoom ratio deciding means decides the pseudo zoom ratio from one pair of the plurality of options that is chosen depending upon the determined virtual focal length and photographic condition at each photography.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 22 is an explanatory diagram illustrating a field of view of a viewfinder according to still another embodiment of the invention;

FIG. 46 is a flow chart illustrating an actual zoom ratio choosing sequence as a sub routine of the main sequence of FIG. 44;

DETAILED DESCRIPTION OF THE PREFERRED EMBODIMENT

Figure 1:
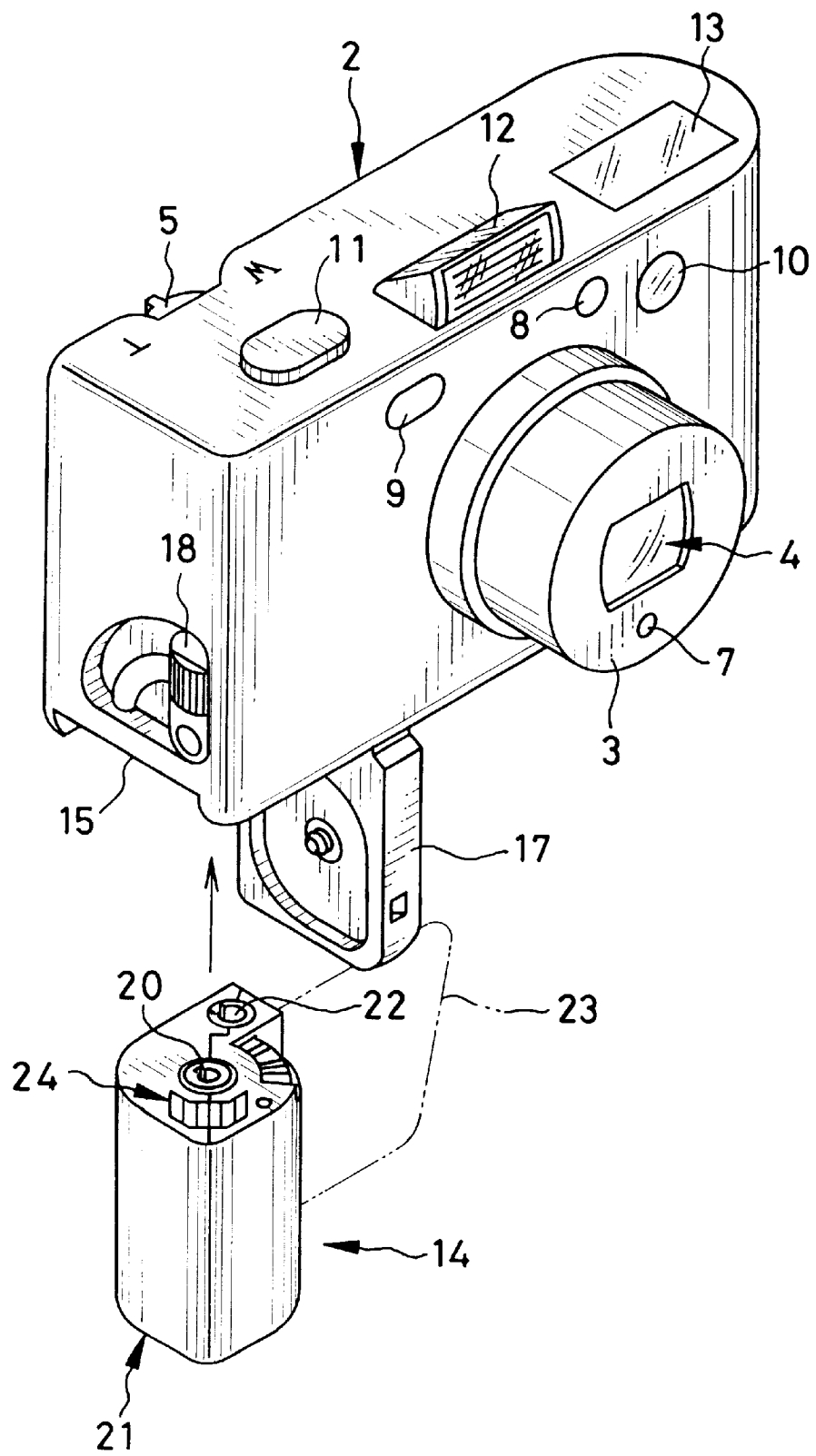
FIG. 1 is a perspective view illustrating an outer appearance of a zoom camera.

In a zoom camera 2 shown in FIG. 1, a lens barrel 3 holds a taking lens 4 that functions as an optical zooming system. According to this embodiment, the taking lens 4 has a maximum zoom ratio fmax/fmin of 2.0, wherein fmin and fmax represent a minimum focal length and a maximum focal length respectively. For example, fmin=35 mm and fmax=70 mm. The camera 2 also has the pseudo zooming function by which a pseudo zoom ratio Zb of 1.0 to 2.0 is assigned to an individual frame at the exposure, wherein Zb=1.0 means that the pseudo zooming function is inactive or not utilized. Consequently, the camera 2 virtually has a maximum zoom ratio of 4.0, and can virtually zoom up to 140 mm.

Hereinafter, the focal length of the optical zooming system 4 will be referred to as an actual focal length or "f" (f=fmin to fmax) in order to distinguish from a virtual focal length or "F" that is obtained by multiplying the actual focal length by the pseudo zoom ratio (F=f×Zb). The ratio of the actual focal length f to the minimum focal length fmim will be referred to as an actual zoom ratio or "Za", whereas the ratio of the virtual focal length F to the minimum focal length fmim will be referred to as a virtual zoom ratio or "Zc".

When a zooming lever 5 is pushed to a telephoto side indicated by "T" or to a wide-angle side indicated by "W", the taking lens 4 changes the actual focal length in a way as set forth in detail later, and a pseudo zoom ratio is determined such that the virtual focal length changes in a substantially linear fashion. The zooming lever 5 is urged by a spring force to return to a middle position between the terminal positions.

Figure 2:
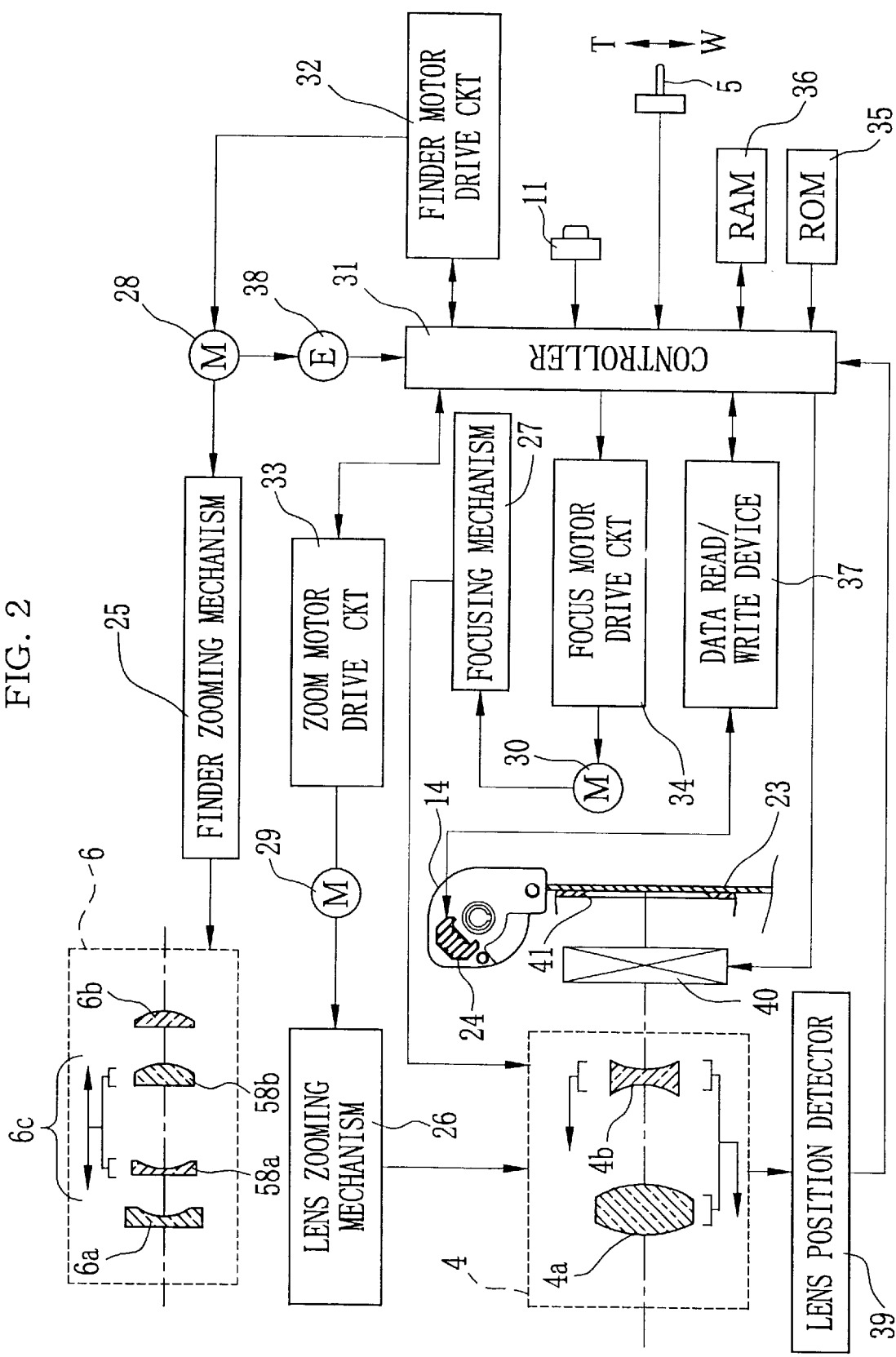
FIG. 2 is a block diagram illustrating an internal construction of the zoom camera, according an embodiment of the invention.

As shown in FIG. 2, the camera 2 has a finder optical system 6 consisting of an objective lens 6a, an eyepiece lens 6b and a finder zoom lens system 6c. The maximum zoom ratio of the finder optical system 6 is 4.0 in this embodiment. The finder zoom lens system 6c is driven such that the focal length of the finder 6 changes in correspondence with the virtual focal length of the camera 2.

A photosensor 7 for measuring a subject brightness is provided in a front face of the lens barrel 3 below the taking lens 4. A light projecting window 8 and a light receiving window 9 for measuring a subject distance, and a finder objective window 10 are located above the lens barrel 3. A shutter button 11, a flash projector 12, and an LCD panel 13 for displaying information on photography are located on a top side of the camera 2.

A lever 18 located on one side of the camera 2 is for opening a bottom lid 17 of a cartridge chamber 15 for loading or unloading a photo film cartridge 14. By rotating the lever 18 clockwise as shown in FIG. 1, the bottom lid 17 is unlocked. Just by closing the bottom lid 17, the lever 18 automatically rotates counterclockwise, locking the bottom lid 17 in the closed position.

The photo film cartridge 14 is of a modified IX 240 type that consists of a plastic cartridge shell 21 with a rotatable spool 20, a door member 22 for opening and closing a film port of the cartridge shell 21, a photo filmstrip 23 coiled around the spool 20, and an IC memory 24. As shown for example in FIG. 3, the IC memory 24 consists of six contact patterns 24a, 24b, 24c, 24d, 24e and 24f that are exposed to the outside of the cartridge shell 21 and are electrically connected to not-shown memory segments. Some of these memory segments store data about the filmstrip 23, such as a film type, a film speed, the number of available exposures. The film data stored in the IC memory 24 can be read by the camera 2 through contact strips provided inside the cartridge chamber 15, through they are not shown in the drawings. The IC memory 24 is a memory device that reserves data without a back-up power source, and permits writing data while it is supplied with power, i.e. EEPROM or a flash memory. According to this embodiment, data of the pseudo zoom ratio is written one of the memory segments of the IC memory 24 in association with each frame.

Referring to FIG. 2, the camera 2 is provided with a finder zooming mechanism 25 for the finder optical system 6, and a lens zooming mechanism 26 and a focusing mechanism 27 for the taking lens 4. The finder zooming mechanism 25, the lens zooming mechanism 26 and the focusing mechanism 27 are driven by a finder motor 28, a zoom motor 29 and a focus motor 30 respectively. The finder motor 28, the zoom motor 29 and the focus motor 30 are controlled by a controller 31 through a finder motor drive circuit 32, a zoom motor drive circuit 33 and a focus motor drive circuit 34, respectively.

The controller 31 is constituted of a CPU and other control circuits for controlling respective circuits and mechanisms of the camera 2. ROM 35 and RAM 36 are connected to the controller 31. The ROM 35 previously stores control programs and various data including table data for determining a pseudo zoom ratio, data for determining an exposure and data for focusing. The RAM 36 stores data obtained during the operation of the camera 2, including the subject brightness and the subject distance measured through the photosensor 7 and the light projecting and receiving windows 8 and 9. The controller 4 also controls a data read/write device 37 for reading data from or writing data in the IC memory 24 of the photo film cartridge 14 that is loaded in the cartridge chamber 15.

Also, signals entered through the zooming lever 5 or the shutter button 11 are fed in the controller 31. Responsive to the signal from the zooming lever 5, the controller 31 drives the finder motor 28, while monitoring rotational position of the finder motor 28 through a rotary encoder 38. Thus the focal length of the finder 6 is changed through the finder zooming mechanism 25. The controller 31 controls the zoom motor 29 in accordance with the signal from the zooming lever 5, while monitoring position of the taking lens 4 through a lens position detector 39.

Responsive to a signal generated when the shutter button 11 is pressed halfway, the controller 31 measures the subject brightness and distance, and drives the focus motor 30 in accordance with the measured subject distance. Upon a shutter release signal generated when the shutter button 11 is fully pressed down, the controller 31 drives a shutter unit 40 in accordance with an exposure value determined based on the measured subject brightness. Then, a picture frame is photographed on the filmstrip 23. Corresponding to the IX 240 type filmstrip 23, the exposure aperture 41 defines a high-vision size frame recording area, and every frame is recorded in the entire frame recording area.

Figure 4:
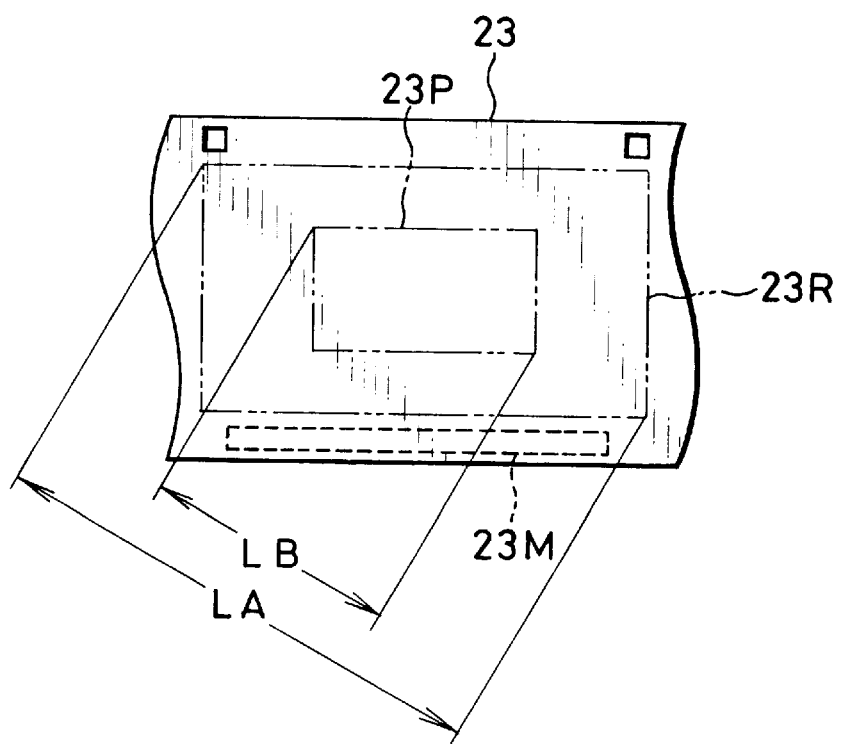
FIG. 4 is an explanatory diagram of an IX240 type filmstrip, illustrating a relationship between an original frame and a printing area used for pseudo zooming.

As described with respect to the prior arts, the pseudo zoom ratio is used for the pseudo zoom printing. Concretely, as shown in FIG. 4, within an original frame 23R which is equal in size to the exposure aperture 41, a printing area 23P to print is defined in accordance with the pseudo zoom ratio, such that the printing area 23P has the same aspect ratio and the same diagonal center as the original frame 23R. Assuming that the original frame 23R has a diagonal length LA, the printing area 23P is defined to have a diagonal length LB=LA/Zb, wherein Zb represents the pseudo zoom ratio. Then, the printing area 23P is printed in a designated size at a specific magnification that is larger than a standard magnification that is used for printing the entire area of the original frame in the designated size. Therefore, the pseudo zoom ratio coincides with the ratio of the specific print magnification to the standard print magnification. In FIG. 4, designated by 23M is a transparent magnetic recording track provided for each frame recording area on the filmstrip 23.

The taking lens 4 consists of a front lens group 4a and a rear lens group 4b. For zooming, both the front and rear lens groups 4a and 4b are moved along an optical axis of the taking lens 4. For focusing, only the rear lens group 4b is moved along the optical axis.

Figure 5:
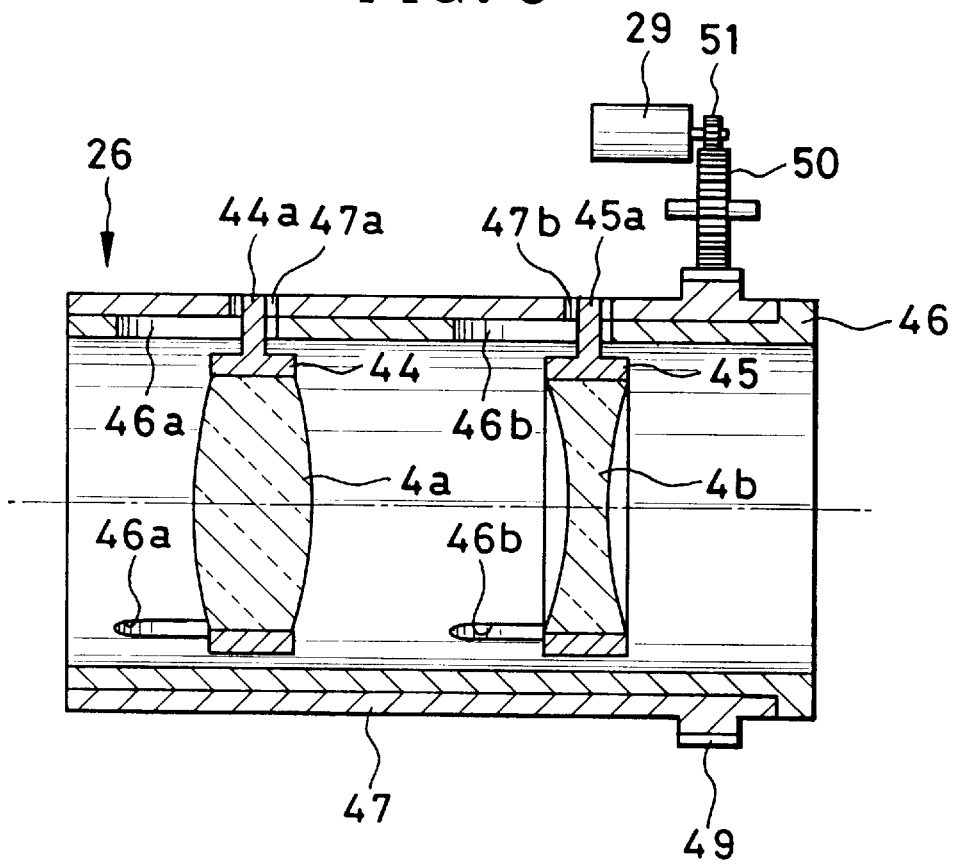
FIG. 5 is a sectional view of a lens zooming mechanism of a taking lens.

FIG. 5 shows an embodiment of the lens zooming mechanism 26 for the taking lens 4. The front and rear lens groups 4a and 4b are held in lens frames 44 and 45 respectively. The lens frame 44 has three cam follower pins 44a that radially protrude from its outer periphery and are spaced equally from one another. The lens frame 45 also has three cam follower pins 45a in the same way as the lens frame 44.

The front and rear lens frames 44 and 45 are held in an axial cam barrel 46 and a rotary cam barrel 47 which are located inside the lens barrel 3. The rotary cam barrel 47 is fitted on the outer periphery of the axial cam barrel 46, and is rotatable relative to the axial cam barrel 46. The axial cam barrel 46 has three axial cam grooves 46a for accepting the three pins 44a of the front lens frame 44, and three axial cam grooves 46b for accepting the three pins 45b of the rear lens frame 45. The rotary cam barrel 47 also has three rotary cam grooves 47a for accepting the three pins 44a of the front lens frame 44, and three rotary cam grooves 47b for accepting the three pins 45b of the rear lens frame 45. A drive gear 49 is formed around the outer periphery of the rotary cam barrel 47, and the rotational movement of the zooming motor 29 is transmitted to the rotary cam barrel 47 through the gear 49 and transmission gears 50 and 51.

Figure 6:
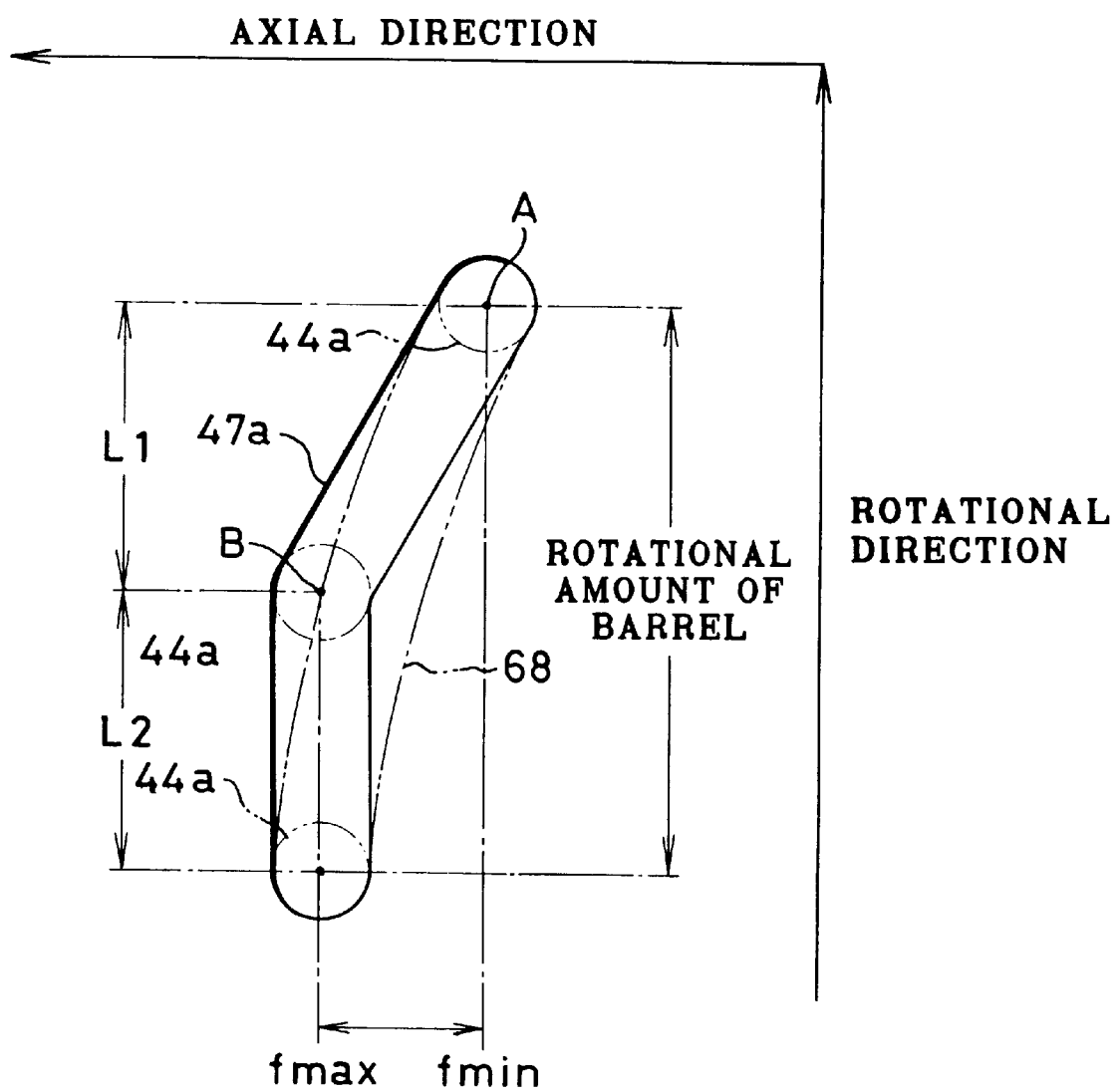
FIG. 6 is an explanatory diagram of a cam groove of a rotary cam barrel of the lens zooming mechanism according to an embodiment of the invention.

FIG. 6 shows one of the rotary cam grooves 47a. The rotary cam grooves 47a have a first section L1 that extends linearly diagonally from an axial position A that corresponds to the wide-angle terminal where the taking lens 4 has the minimum focal length fmin (=35 mm), to an axial position B that corresponds to an actual telephoto terminal of the taking lens 4 where the actual focal length is at the maximum fmax (=70 mm). The first section L1 is continued to a second section L2 where the cam grooves 47a extend in the circumferential direction of the rotary cam barrel 47.

As the rotary barrel 47 is rotated about the axial cam barrel 46, the pins 44a and 45a move along the rotary cam grooves 47a and 47b. Because the section L1 of the rotary cam grooves 47a and 47b extend diagonally, and the pins 44a and 45a are also inserted in the axial cam grooves 46a and 46a, the lens frames 44 and 45 move along the optical axis of the taking lens 4. The rotary cam grooves 47b for the rear lens frame 45 have a similar contour to the rotary cam grooves 47a but the inclination of the section L1 is different so as to change the spacing between the front and rear lens groups 6a and 6b.

The rotary cam barrel 47 rotates in a forward rotational direction shown by an arrow in FIG. 6 while the zooming lever 5 is pushed to the telephoto side. While the zooming lever 5 is pushed to the wide-angle side, the motor 29 is driven to rotate the rotary cam barrel 47 in a reverse direction. As the rotary cam barrel 47 rotates in the forward direction, and the pins 44a and 45a move along the section L1 from the position A to the position B, the actual focal length increases linearly from the minimum focal length fmin to the actual maximum focal length fmax. Thereafter, if the zooming lever 5 is still operated to the telephoto side, the pins 44a and 45a moves in the section L2, where the actual focal length is maintained at the maximum value fmax.

Figure 7:
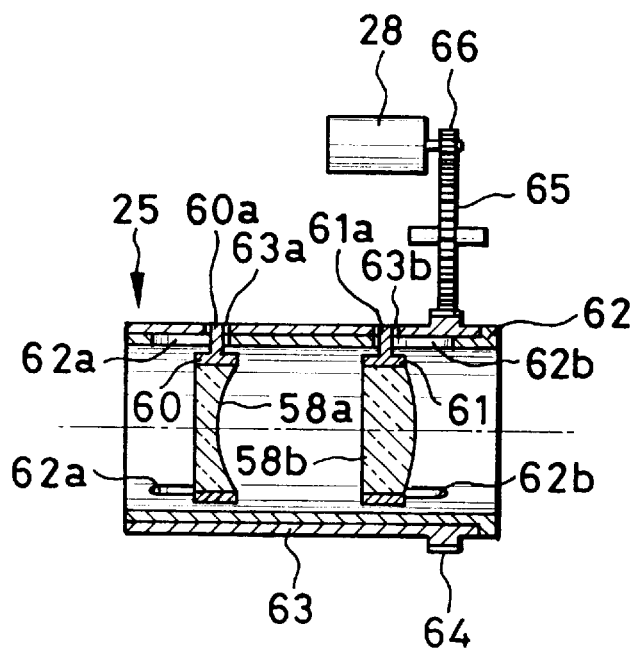
FIG. 7 is a sectional view of a finder optical system and a finder zooming mechanism.

FIG. 7 shows the finder zooming mechanism 25 for the finder optical system 6, wherein the objective lens 6a and the eyepiece lens 6b are not shown. The zoom lens system 6c consists of a front lens group 58a and a rear lens group 58a which are held in front and rear lens frames 60 and 61 respectively. In the same way as the front and rear lens frames 44 and 45, the front and rear lens frames 60 and 61 are provided with three cam follower pins 60a and 61a each, and are held in a finder axial cam barrel 62 and a finder rotary cam barrel 63. The finder rotary cam barrel 63 is rotatably fitted on the finder axial cam barrel 62, and has a drive gear 64 formed around its outer periphery. Through the drive gear 64 and transmission gears 65 and 66, the finder rotary cam barrel 63 is rotated by the finder motor 28.

The finder axial cam barrel 62 has three axial cam grooves 62a for accepting the pins 60a of the front lens frame 60 and three axial cam grooves 62b for accepting the pins 61a of the rear lens frame 61. The finder rotary cam barrel 63 has three helical cam grooves 63a for accepting the pins 60a and three helical cam grooves 63b for accepting the pins 61a. As the finder rotary cam barrel 63 rotates about the finder axial cam barrel 62, the front and rear lens frames 60 and 61 move along an optical axis of the finder 6 because the pins 60a and 61a move along the helical cam grooves 63a and 63b while being guided along the axial cam grooves 62a and 62b respectively.

The helical cam grooves 63a and 63b are formed such that the front and rear lens groups 58a and 58b move away from each other in the axial direction for zooming up the finder optical system 6 to the telephoto side, and that the front and rear lens groups 58a and 58b move closer to each other in the axial direction for zooming down the finder optical system 6 to the wide-angle side.

It is to be noted that the cam and cam follower mechanisms for the zooming mechanisms 25 and 26 are not limited to the above embodiment. For example, it is possible to provide one or two cam grooves and one or two cam follower pins for each lens frame.

Figure 8:
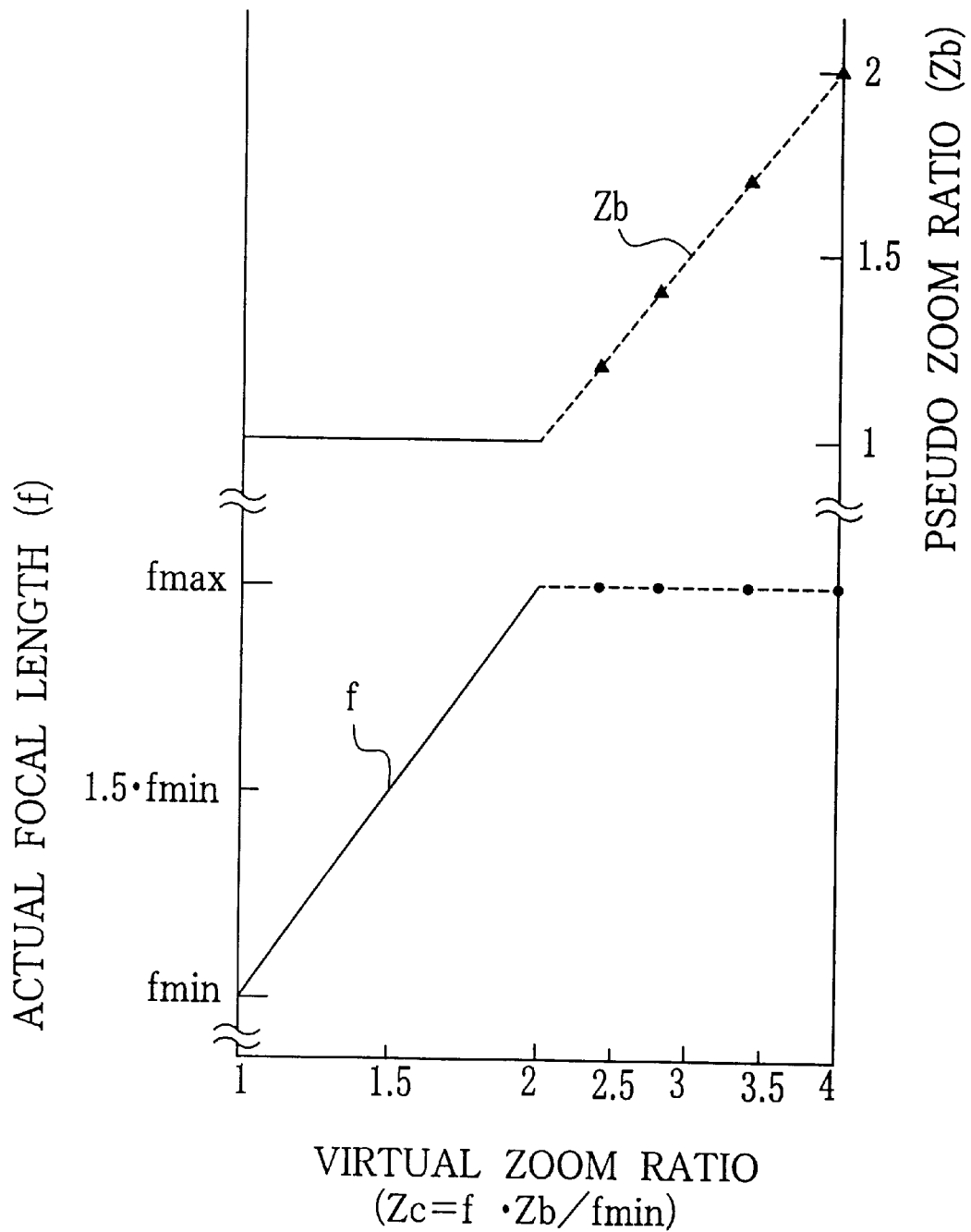
FIG. 8 is a graph illustrating a relationship between actual focal length of the taking lens and pseudo zoom ratio and virtual zoom ratio according to the embodiment of FIG. 6.

As shown in FIG. 8, while the pins 44a and 45a move in the section L1, the controller 31 sets the pseudo zoom ratio Zb at 1.0, so the virtual focal length F=f×Zb is equal to the actual focal length f. After the pins 44a and 45a move in the section L2, the controller 31 changes the pseudo zoom ratio Zb from 1.0 to 2.0, such that the virtual focal length F increases approximately linearly up to the maximum value of 2×fmax, as the rotary cam barrel 47 rotates in the forward direction responsive to the operation on the zooming lever 5 to the telephoto side. Therefore, the section L2 may be called a pseudo zooming range where the virtual focal length F is beyond the actual focal length f and the pseudo zooming function is active.

Figure 9:
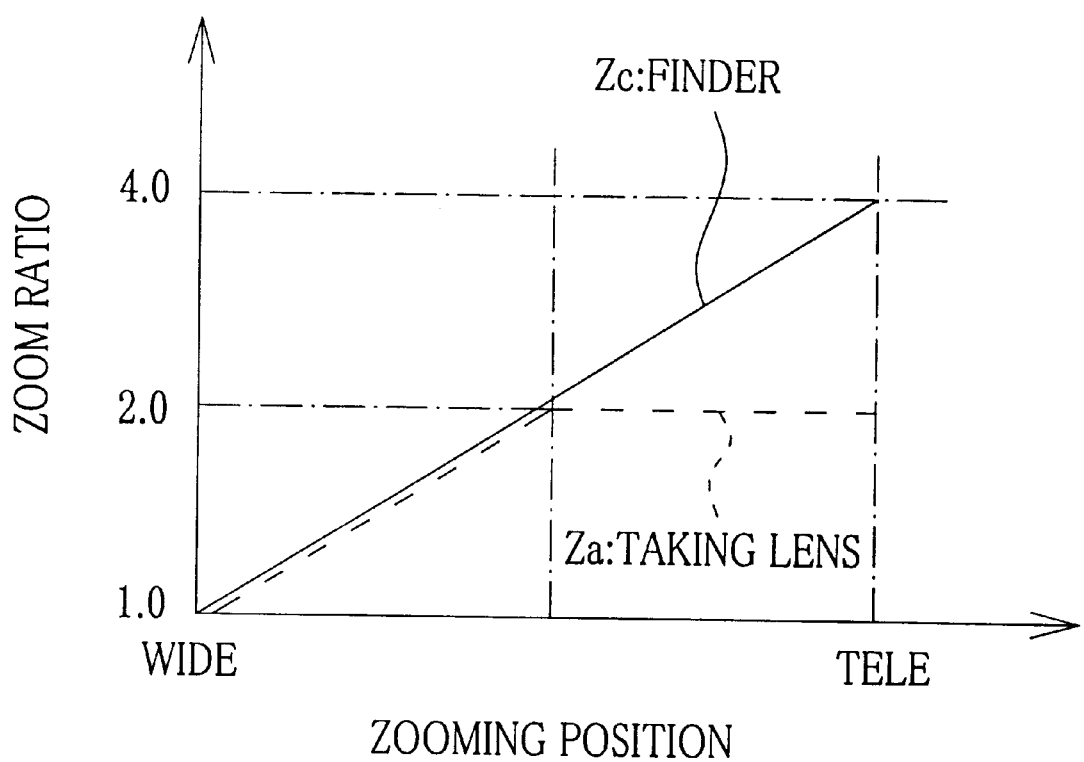
FIG. 9 is a graph illustrating a relationship between actual zoom ratio of the taking lens and zoom ratio of the finder optical system and zooming position determined by operating a zooming lever according to the embodiment of FIG. 6.

As described above, the finder optical system 6 has a maximum zoom ratio of 4.0. While the zooming lever 5 is pushed to the telephoto side or to the wide-angle side, the finder motor 28 is driven to rotate the finder rotary cam barrel 62 in a forward direction or in a reverse direction, such that the focal length of the finder optical system 6 linearly changes between a minimum value and a maximum value. That is, the finder optical system 6 is zoomed at a zoom ratio that coincides with the virtual zoom ratio Zc=F/fmin, as shown in FIG. 9.

However, it is practically preferable to change the virtual zoom ratio and hence the finder zoom ratio stepwise in the pseudo zooming range, in order to limit the requisite number of options of the pseudo zoom ratio, and thus the requisite number of sizes of trimming masks and that of print magnifications. Therefore, though the finder optical system 6 is linearly zoomed while the zooming lever 5 is operated, the finder optical system 6 is stopped at a nearest one of predetermined zooming positions, e.g., Zc=2.4, 2.8, 3.4 or 4.0, in the pseudo zooming range, as soon as the operation on the zooming lever 5 is stopped.

Of course, it is possible to stop the optical finder 6 at an appropriate zooming position even in the pseudo zooming range, assuming that the pseudo zooming print is made by use of a printer that has a mask whose size can change linearly and a zoom lens whose magnification can change linearly, or by use of a digital printer.

In accordance with the predetermined finder zoom ratio Zc in the pseudo zooming range, the pseudo zoom ratio is set at one of predetermined values: Zb=1.2, 1.4, 1.7 or 2.0.

Table 1 shows a relationship between the finder zoom ratio Zc, the actual zoom ratio Za and the pseudo zoom ratio Zb, wherein Za=f/fmin and Zc=F/fmin.

TABLE 1

| ACTUAL ZOOM RATIO | PSEUDO ZOOM RATIO | VIRTUAL ZOOM RATIO |
|---|---|---|
| 1.0–2.0 | 1.0 | 1.0–2.0 |
| 2.0 | 1.2 | 2.4 |
| 2.0 | 1.4 | 2.8 |
| 2.0 | 1.7 | 3.4 |
| 2.0 | 2.0 | 4.0 |

Since the pseudo zooming function is not used in a range before the actual maximum focal length fmax of the taking lens, the print quality is maintained in a high level in this range. Even in the pseudo zooming range, since the pseudo zoom ratio increases gradually from 1.0 to 2.0, the print quality is generally improved compared to a case where a large pseudo zoom ratio, e.g. 1.7 is used in the whole pseudo zooming range.

Figure 10:
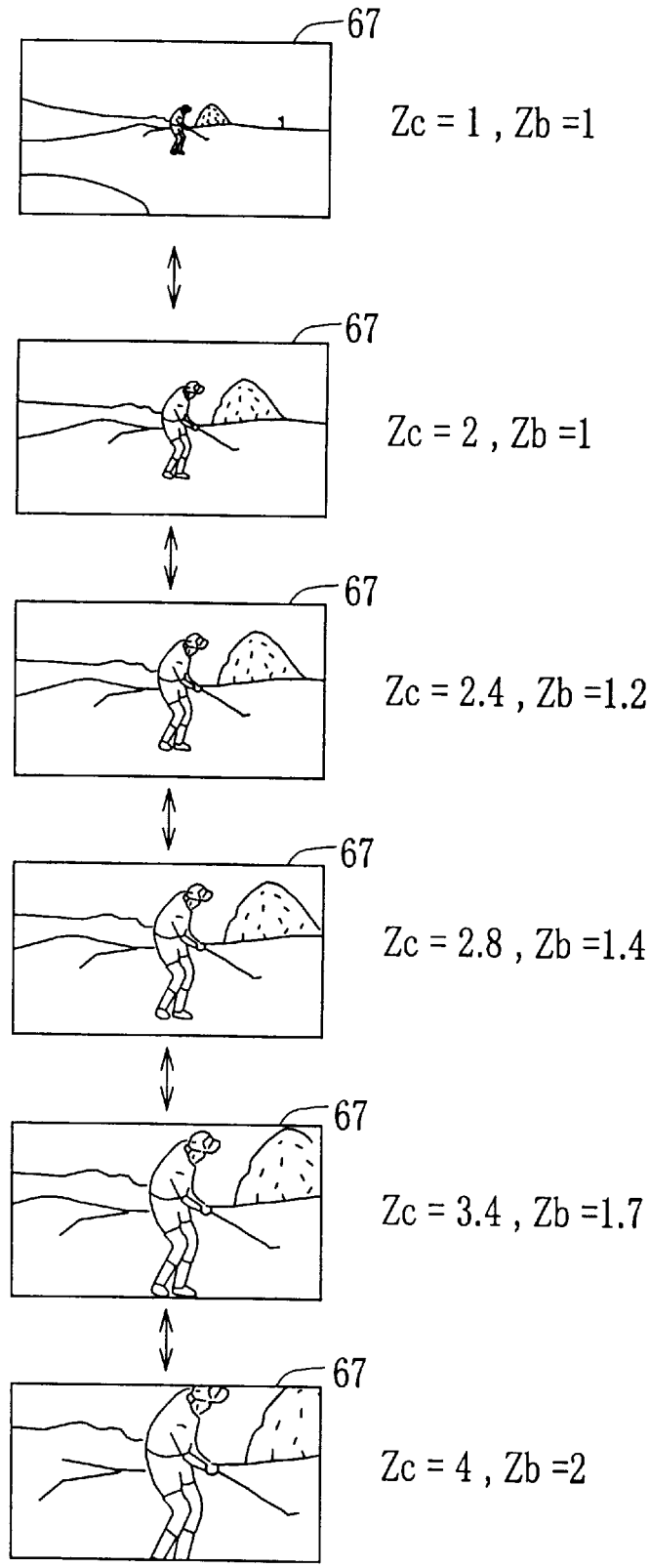
FIG. 10 is an explanatory diagram illustrating a field of view provided by the finder optical system of FIG. 7, zoomed correspondingly to the virtual focal length.

Because the finder optical system 6 is zoomed in correspondence with the virtual zoom ratio, a photographic field to be contained in the printing area P is always shown in a whole size of a field of view 67 of the finder optical system 6 that has the same aspect ratio as the expsoure aperture 41, as shown in FIG. 10. Therefore, the photographer can frame a photographic field that is to be contained in a finished photo-print without being conscious of the pseudo zooming function. Taking account of parallax, the finder optical system 6 may be designed to frame a slightly smaller range than the printing area P.

Now the operation of the above described zoom camera 2 will be summarized.

When the photo film cartridge 14 is loaded in the cartridge chamber 15 and the bottom lid 17 is locked in the closed position, the camera 2 opens the door member 22 and rotates the spool 20 in an unwinding direction. Thereby, the filmstrip 23 is advanced out of the cartridge shell 21 till an unexposed image recording portion of the filmstrip 23 is positioned behind the exposure aperture 41. The controller 31 reads out the film data from the IC memory 24 of the cartridge shell 21 and writes the film data in the RAM 36.

Figure 11:
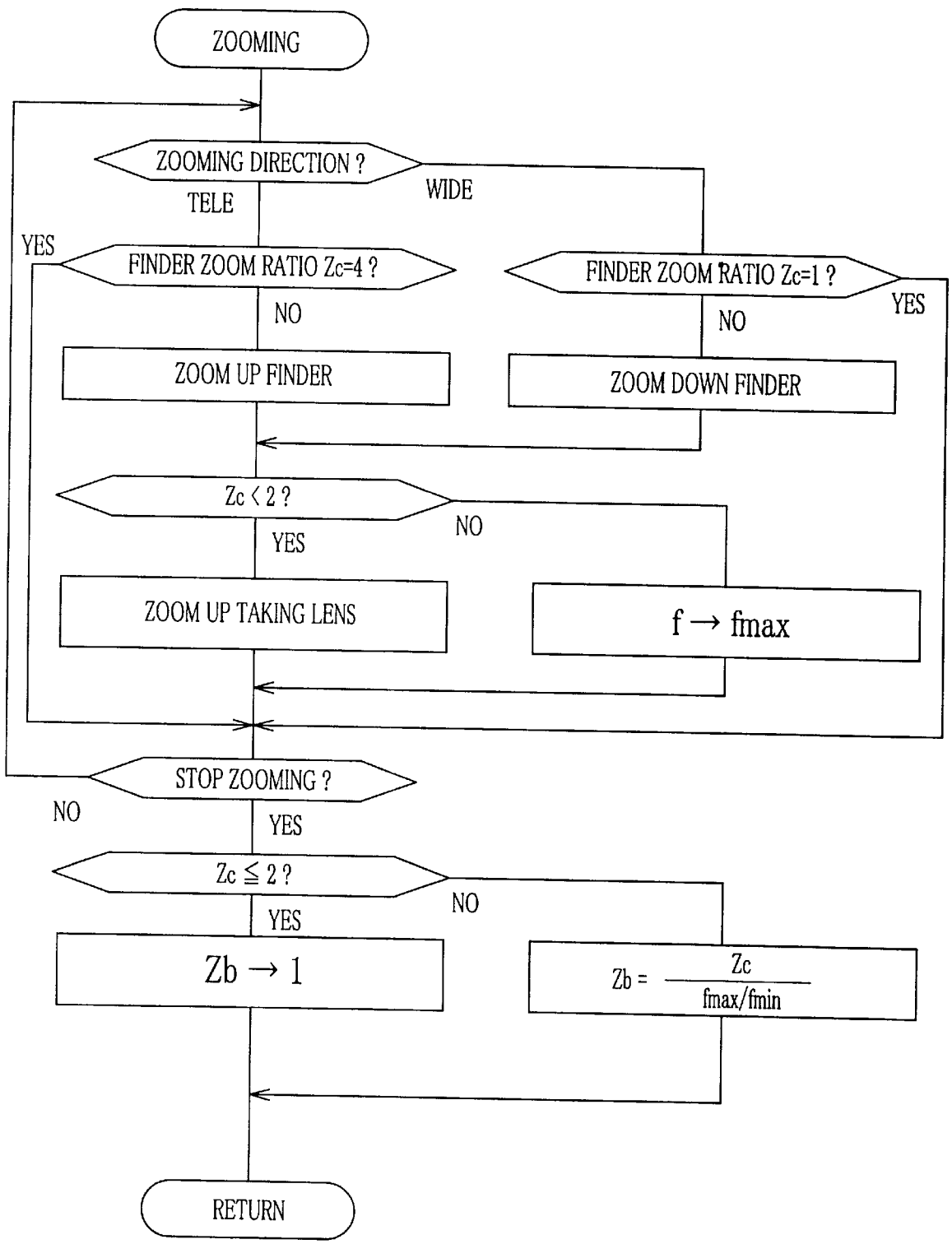
FIG. 11 is a flow chart illustrating a zooming sequence for the embodiment of FIG. 6.

Immediately after a main switch of the camera 2 is turned on, the taking lens 4 and the finder 6 are set at their wide-angle terminal. Referring to FIG. 11 illustrating a zooming operation sequence, when the zooming lever 5 is operated, the controller 31 drives the finder motor 28 and the zoom motor 29 respectively through the finder motor drive circuit 32 and the zoom motor drive circuit 33 in accordance with the operating direction and amount of the zooming lever 5.

While the zooming lever 5 is pushed to the telephoto side, the finder motor 28 is driven to rotate the finder rotary cam barrel 62 in the forward direction, so the finder optical system 6 is zoomed up by a ratio corresponding to the rotational amount of the finder motor 28. Simultaneously, the zoom motor 29 is driven to rotate the rotary cam barrel 47 rotates in the forward direction. As the rotary cam barrel 47 rotates in the forward direction, so the taking lens 4 is zoomed up linearly from the minimum focal length fmin to the actual maximum focal length fmax till the pins 44a and 45a move along the section L1 of the cam grooves 47a and 47b.

If the zooming lever 5 is still operated to the telephoto side after the actual focal length reaches the maximum value fmax (the actual zoom ratio Za=2.0), the rotary cam barrel 47 is rotated further in the forward direction, and the pins 44a and 45a move along the section L2, so the actual focal length is maintained at the maximum focal length fmax, as shown in FIG. 8. The finder rotary cam barrel 63 is also rotated further in the forward direction, so that the finder optical system 6 is zoomed up linearly from 2.0 to 4.0 in zoom ratio.

The controller 31 keeps monitoring the rotational position of the finder motor 28 through the rotary encoder 38, and derives a zooming position or present zoom ratio of the finder optical system 6 from the rotational position of the finder motor 28. When the operation on the zooming lever 5 is stopped, the controller 31 sets the finder optical system 6 at the nearest one of the predetermined zooming positions: Zc=2.4, 2.8, 3.4 or 4.0, in the pseudo zooming range. Then, the controller 31 reads out pseudo zoom ratio data according to the present zoom ratio of the finder optical system 6, from a look-up table stored in the ROM 35, that conceptually corresponds to Table 1. The pseudo zoom ratio data read out from the ROM 35 is temporality stored in the RAM 36, and is revised as the zooming position of the finder optical system 6 changes with the operation on the zooming lever 5.

When the shutter button 11 is pressed halfway, a subject brightness and a subject distance are measured through the photosensor 7 and the light projecting and receiving windows 8 and 9. Also, a present zooming position or actual zoom ratio Za of the taking lens 4 is detected through the lens position detector 39. Based on the measured subject brightness and distance and the present zooming position of the taking lens, the controller 31 reads out focusing data and exposure control data from the ROM 35. Then, the focus motor 30 is driven through the focus motor drive circuit 34, to move the rear lens group 4b in accordance with the focusing data. If the photographer quits pressing the release button 11 after pressing it halfway, the controller 31 resets the rear lens group 4b to a preceding zooming position through the focus motor drive circuit 34.

When the release button 11 is pressed to the full, the controller 31 activates the shutter unit 40 at a shutter speed in an exposure time designated by the exposure control data. Thus, a frame is recorded on the filmstrip 23 in the same size defined by the exposure aperture 41. Simultaneously, the pseudo zoom ratio data is read out from the RAM 35, and is written in the IC memory 24 through the data read/write device 37. If, however, the shutter button 11 is pressed before the zooming position goes into the pseudo zooming range, that is, before the taking lens 4 reaches its maximum focal length fmax, the data read/write device 37 does not write any pseudo zoom ratio data in the IC memory 24.

When all the available exposures are done on the filmstrip 23, the filmstrip 23 is rewound into the cartridge shell 21. Thereafter, the photo film cartridge 14 is removed from the camera 2 and is forwarded to a photofinisher for development and printing. In printing, the pseudo zoom ratio data is read out from the IC memory 24, and a printing area P to be printed within the original frame is determined by the designated pseudo zoom ratio, in the way as described with refence to FIG. 4. The determined printing area P is printed at a magnification that is larger by the designated pseudo zoom ratio than the standard magnification used for printing the whole area of the orignal frame in the same size.

Figure 12:
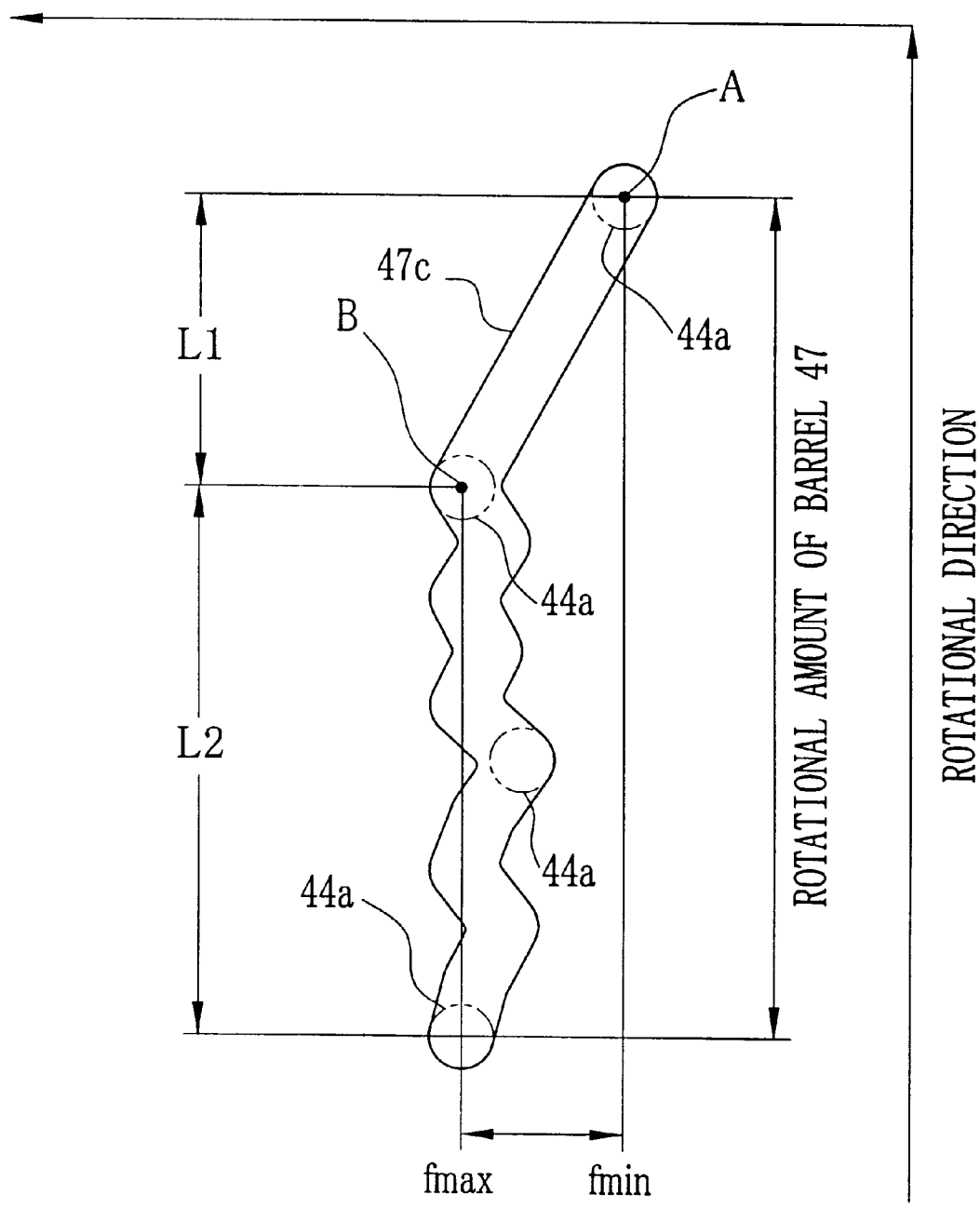
FIG. 12 is an explanatory diagram of another embodiment of cam groove of the rotary cam barrel of the lens zooming mechanism.

FIG. 12 shows one of rotary cam grooves 47c of a rotary cam barrel 47, according to another embodiment of the invention. Also in this embodiment, rotary cam grooves for the rear lens group 4b of the taking lens 4 have a corresponding shape to the rotary cam grooves 47c for the front lens group 4a. The rotary cam grooves 47c have a first section L1 that extends linearly from an axial position A that corresponds to the wide-angle terminal where the taking lens 4 has the minimum focal length fmin, to an axial position B that corresponds to an actual telephoto terminal of the taking lens 4 where the actual focal length is at the maximum fmax.

The first section L1 is continued to a second section L2 where the cam grooves 47a and 47b wind back and forth in the axial direction.

As the rotary cam barrel 47 rotates in the forward direction as shown by an arrow, and the pins 44a and 45a move along the section L1 from the position A to the position B, the actual focal length increases linearly from the minimum focal length fmin to the actual maximum focal length fmax. Thereafter, if the zooming lever 5 is still operated to the telephoto side, the actual focal length varies up and down in a range near the maximum focal length fmax in accordance with the positions of the pins 44a and 45a moving in the section L2 of the rotary cam grooves 47a and 47b.

Also in this embodiment, the controller 31 sets the pseudo zoom ratio Zb at 1.0, while the pins 44a and 45a move in the section L1, so the virtual focal length F=f×Zb is equal to the actual focal length f. After the pins 44a and 45a move in the section L2, the controller 31 sets the pseudo zoom ratio Zb at a value of more than 1.0 to 2.0, such that the virtual focal length F changes approximately linearly up to the maximum value of fmax×2(=140 mm).

Figure 13:
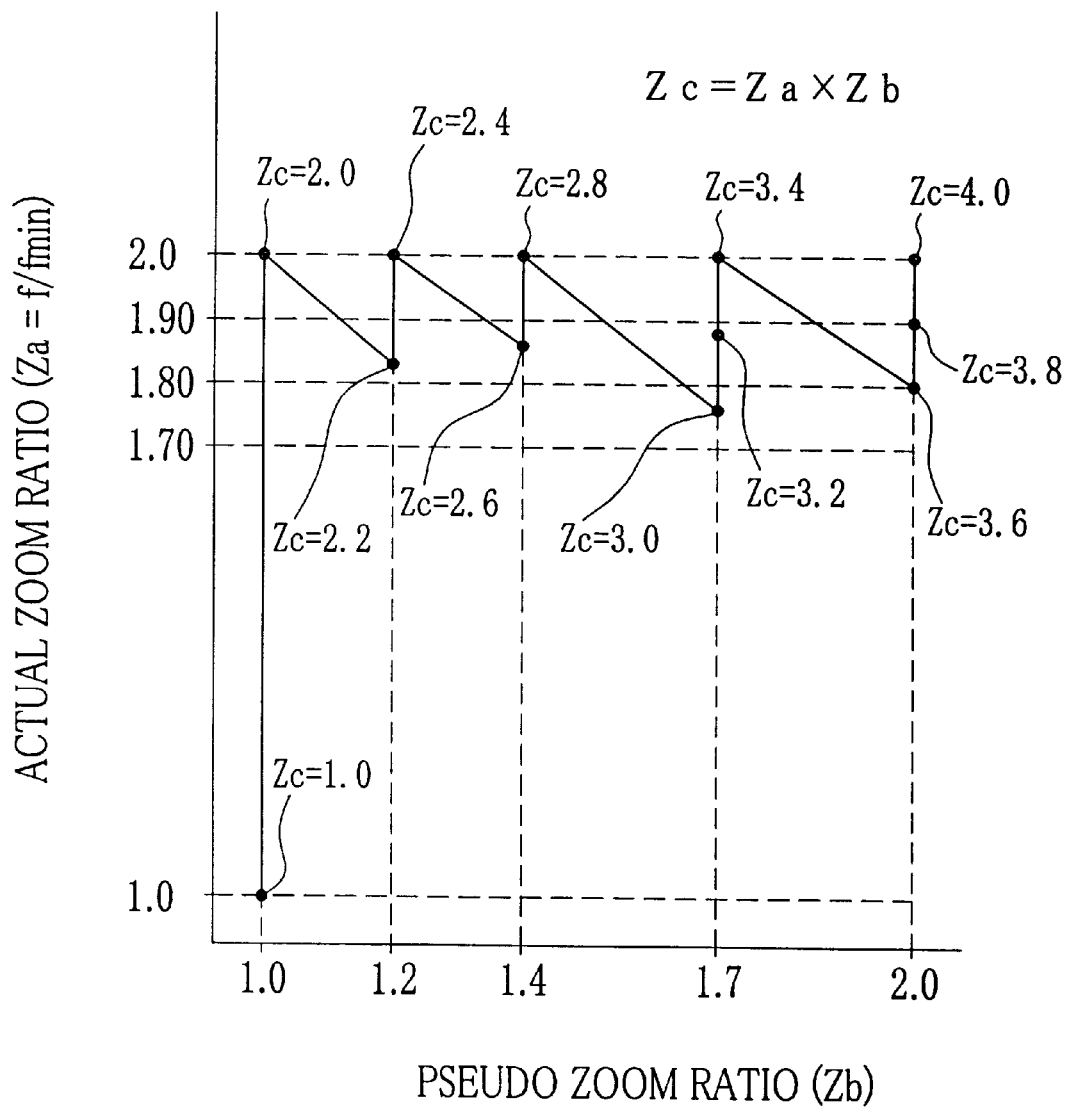
FIG. 13 is a graph illustrating a relationship between actual zoom ratio of the taking lens and pseudo zoom ratio according to the embodiment of FIG. 12.
Figure 14:
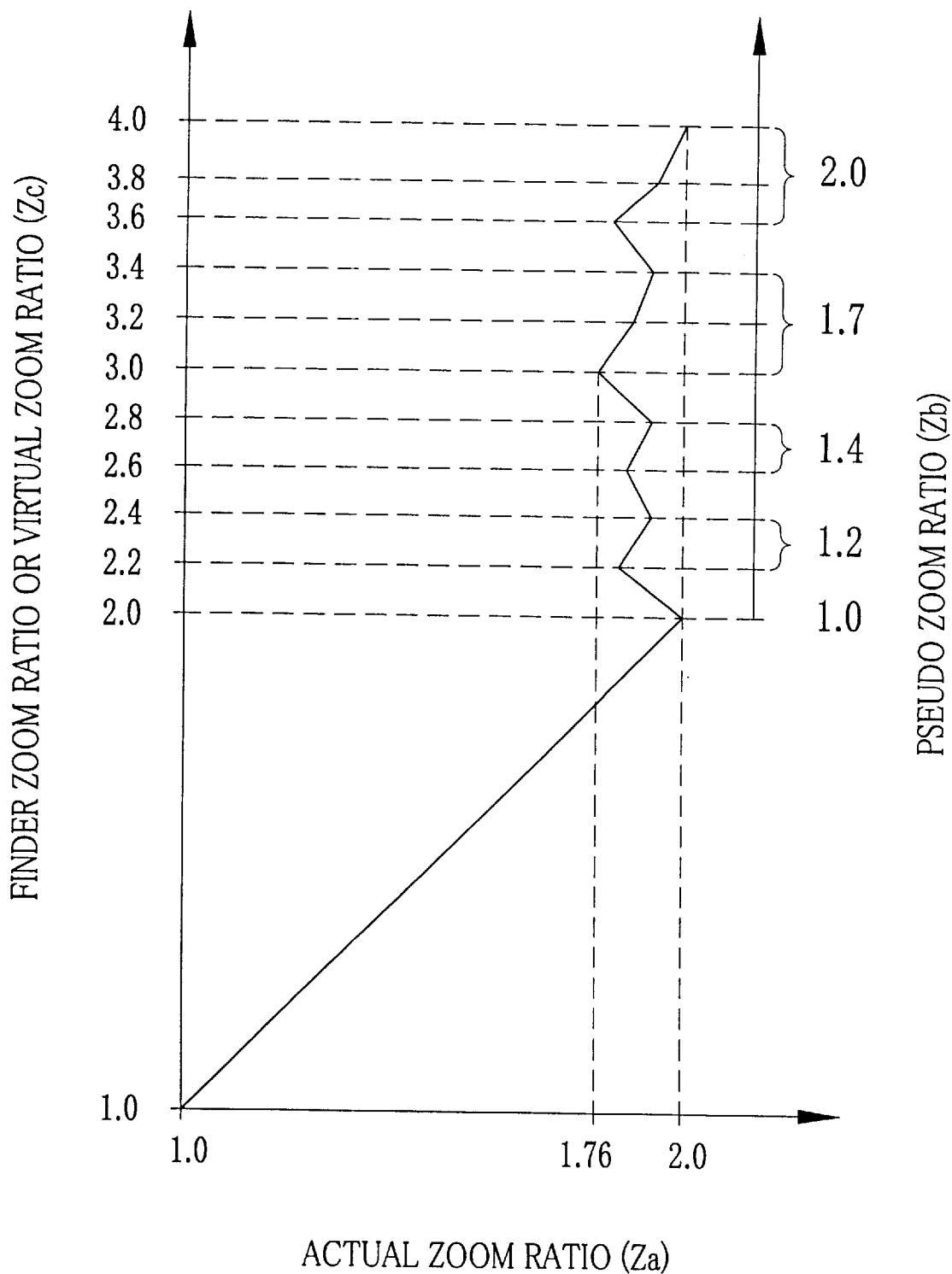
FIG. 14 is a graph illustrating a curve of finder zoom ratio that coincides with virtual zoom ratio determined by the relationship between the actual zoom ratio of the taking lens and the pseudo zoom ratio of FIG. 13.

Table 2 shows a correlation between the actual focal length f and the pseudo zoom ratio Zb and the virtual zoom ratio Zc, and this correlation is graphically shown in FIGS. 13 and 14. As defined above, Zc=F/fmin=f×Zb/fmin=f/fmin×Zb=Za×Zb.

TABLE 2

| ACTUAL ZOOM RATIO | PSEUDO ZOOM RATIO | VIRTUAL ZOOM RATIO |
|---|---|---|
| 1.0–2.0 | 1.0 | 1.0–2.0 |
| 1.83 | 1.2 | 2.2 |
| 2.0 | 1.2 | 2.4 |
| 1.86 | 1.4 | 2.5 |
| 2.0 | 1.4 | 2.8 |
| 1.76 | 1.7 | 3.0 |
| 1.88 | 1.7 | 3.2 |
| 2.0 | 1.7 | 3.4 |
| 1.8 | 2.0 | 3.6 |
| 1.9 | 2.0 | 3.8 |
| 2.0 | 2.0 | 4.0 |

Since the pseudo zooming function is not used in a range before the actual maximum focal length fmax of the taking lens, the print quality is maintained in a high level in this range. By making the actual focal length up and down in a range near the maximum focal length fmax in the pseudo zooming range where the virtual focal length is beyond the actual maximum focal length fmax, it is possible to provide more zooming steps with few options of pseudo zooming ratio, in compariosn with the embodiment shown in Table 1. Moreover, increment in the pseudo zoom ratio between adjacent zooming steps becomes small in total. Thereby, image deterioration rate of the photo-prints due to the zooming is equalized in the whole zooming range.

In this embodiment, the optical finder 63 is driven in the same way as the first embodiment, so as to change the finder zoom ratio linearly from 2.0 to 4.0 in accordance with the virtual zoom ratio. The controller 31 determines the pseudo zoom ratio according to the zoom ratio of the finder optical system 6 with reference to a look-up table stored in the ROM 35, that is conceptually equivalent to Table 2.

Figure 15:
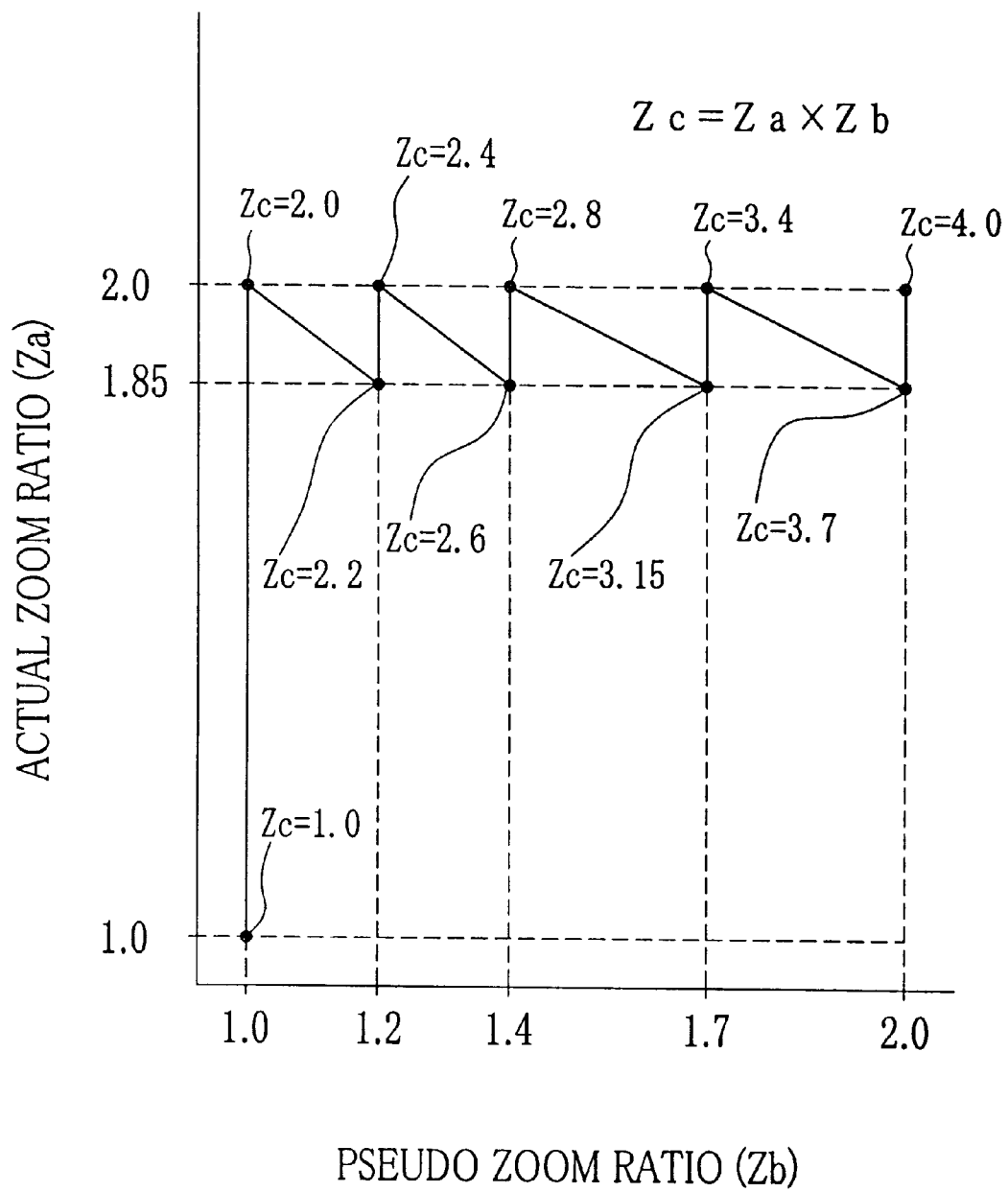
FIG. 15 is a graph illustrating a relationship between actual zoom ratio and pseudo zoom ratio according to another embodiment of the invention.
Figure 16:
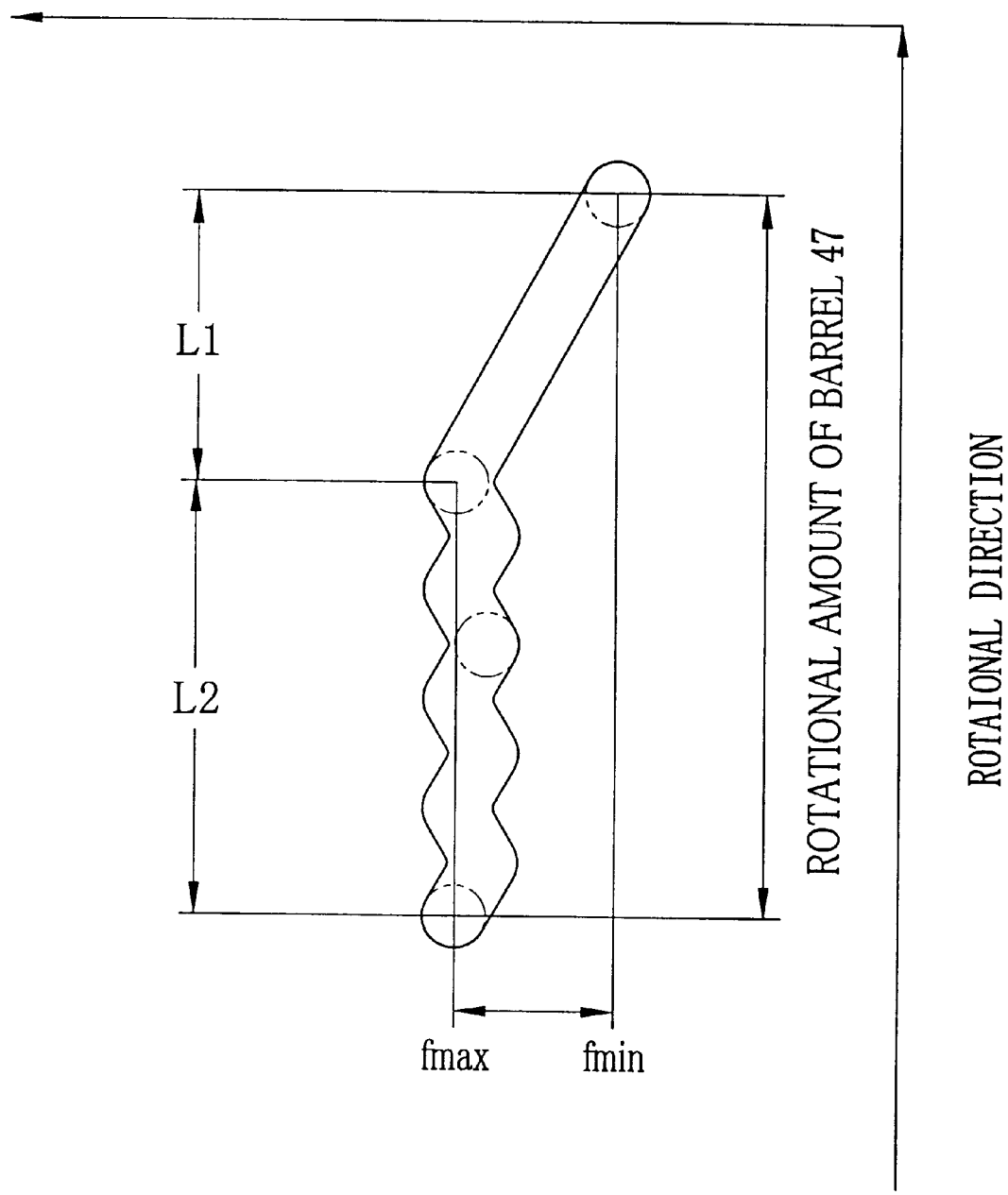
FIG. 16 is an explanatory diagram of a cam groove of the cam barrel for the embodiment of FIG. 15.

In the above embodiment, the actual focal length of the taking lens 4 is irregularly changed in a range near the maximum value fmax in the pseudo zooming range where the virtual focal length is beyond the actual maximum focal length fmax. It is alternatively possible to change the actual focal length between the maximum value fmax and a value near the maximum value fmax in the pseudo zooming range, as shown for example in FIG. 15. In the example of FIG. 15, the actual zoom ratio Za=f/fmin is changed between 2.0 and 1.85. According to this configuration, the rotary cam barrel 47 has rotary cam grooves with regular curves in the section L2 corresponding to the pseudo zooming range, as shown in FIG. 16. This makes the rotational movement of the cam barrel 47 and the axial movement of the lens groups 4a and 4b more smooth, while achieving the same effects as the embodiment of FIGS. 12 to 14.

Figure 17:
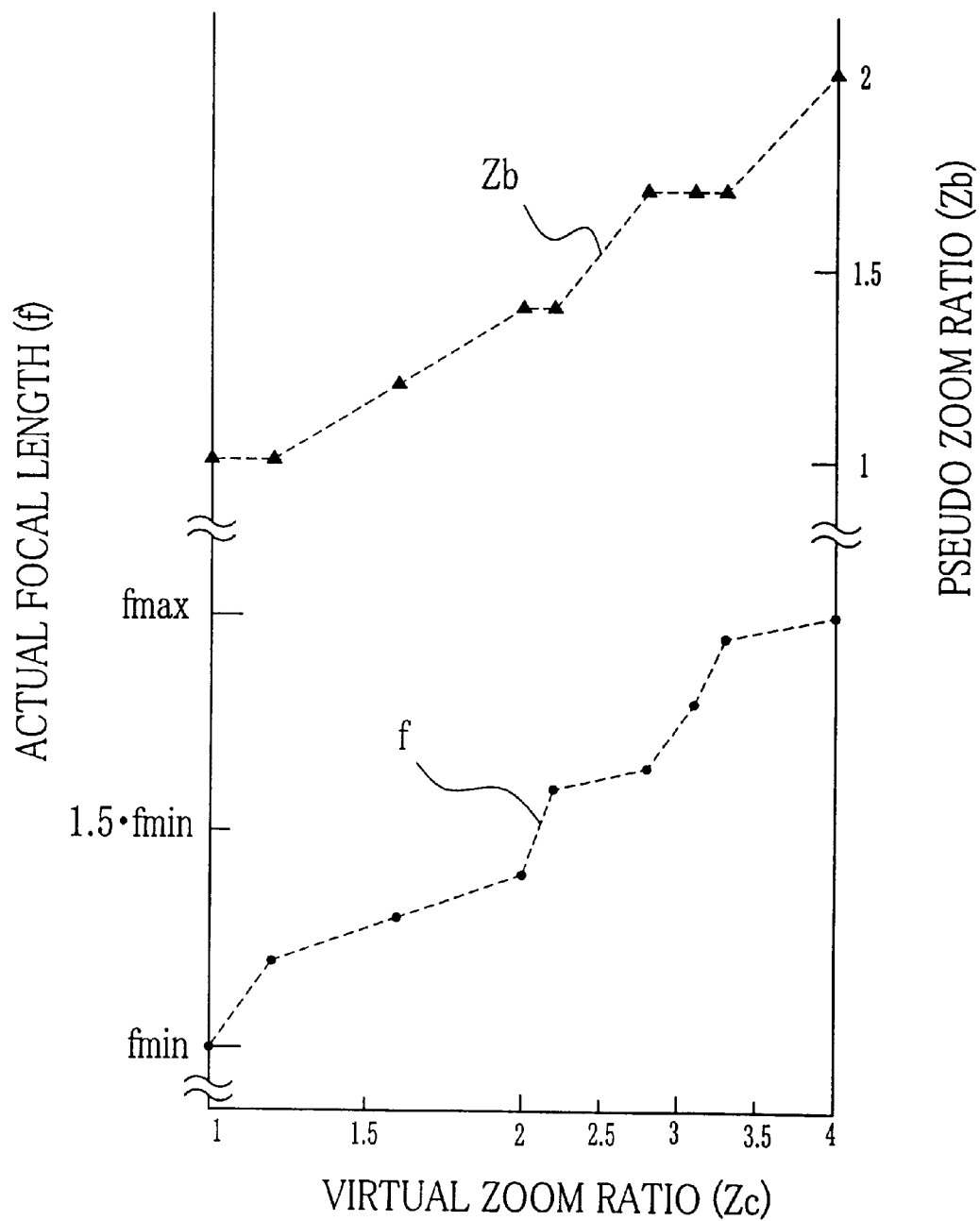
FIG. 17 is a graph illustrating a relationship between actual focal length of the taking lens and pseudo zoom ratio and virtual zoom ratio according to another embodiment of the invention.
Figure 18:
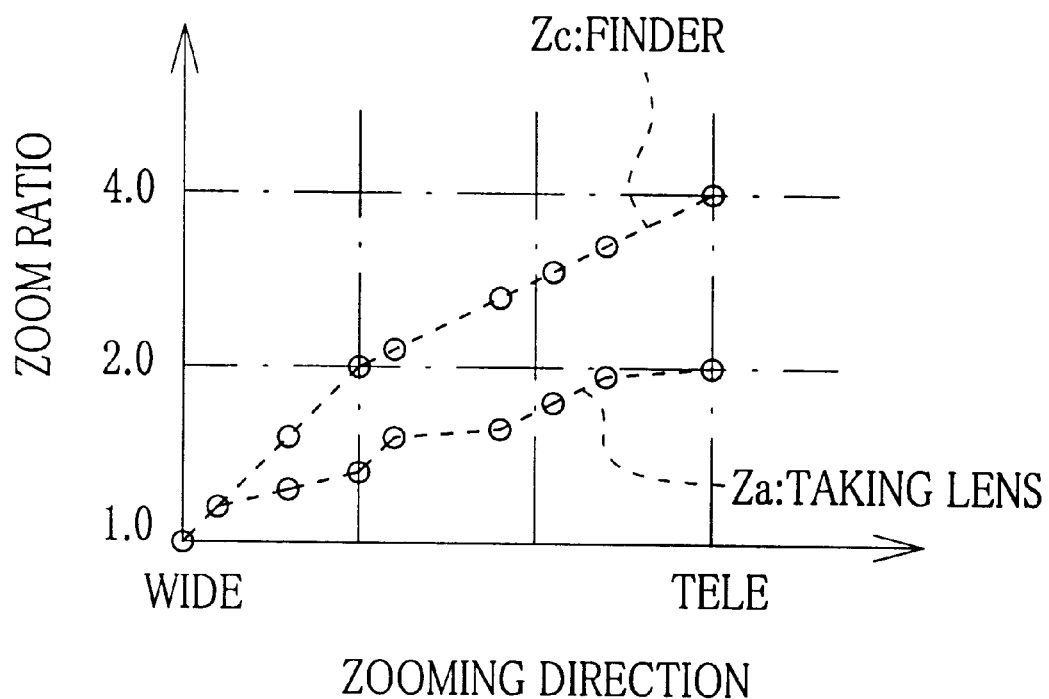
FIG. 18 is a graph illustrating a relationship between actual zoom ratio and finder zoom ratio and zooming position determined by operating a zooming lever according to the embodiment of FIG. 17.

FIGS. 17 and 18 show a relationship between the actual focal length f of a taking lens 4 and the pseudo zoom ratio Zb according to another embodiment of the invention, wherein the pseudo zooming function is used before the actual focal length f reaches its maximum value fmax. Although the control method is different from the above embodiments, this embodiment may be fundamentally equal in construction to the embodiment shown in FIG. 2. Therefore, the following description relates only to those elements which are essential to the present embodiment, and the same reference numerals are used for those elements which may be equivalent to those shown in FIG. 2.

Also in this embodiment, the taking lens 4 has a maximum zoom ratio fmax/fmin of 2.0, whereas a finder optical system 6 has a maximum zoom ratio of 4.0. The finder optical system 6 is controlled to change its zooming position in accordance with the zooming direction and amount entered through a zooming lever 5, such that the zoom ratio of the zoom finder coincides with the virtual zoom ratio Zc obtained by the pseudo zoom printing. On the contrary to the above embodiments, the actual focal length f is also increased or decreased between the minimum value fmin and the maximum value fmax in the whole zooming range in accordance with the zooming direction and amount of the zooming lever 5, as shown in FIG. 17. Correspondingly, the pseudo zoom ratio Zb is determined in a range from 1.0 to 2.0, such that the virtual zoom ratio Zc gradually increases up to 4.0 at the maximum.

Specifically, a controller 31 controls the taking lens 4 and the finder optical system 6 to change their zooming position in accordance with the operating direction of the zooming lever 5, and when the operation on the zooming lever 5 is terminated, the controller 31 stops the zoom finder at the nearest one of predetermined zooming positions: Zc=1.0, 1.2, 1.6, 2, 2.2, 2.8, 3.1, 3.3 or 4.0. Simultaneously, the controller 31 stops the taking lens at the nearest one of predetermined zooming positions: Za=1.0, 1.2, 1.4, 1.6, 1.65, 1.8, 1.95 or 2.0. Then, the controller 31 determines the pseudo zoom ratio Zb depending upon the combination of the finder zoom ratio Zc and the actual zoom ratio Za, for example, with reference to a look-up table stored in a ROM 35.

Table 3 shows a correlation between the finder zoom ratio Zc, the actual zoom ratio Za (=f/fmin), the pseudo zoom ratio Zb, that conceptually corresponds to the table data stored in the ROM 35 for this embodiment.

TABLE 3

| ACTUAL ZOOM RATIO | PSEUDO ZOOM RATIO | FINDER ZOOM RATIO |
| --- | --- | --- |
| 1.0 | 1.0 | 1.0 |
| 1.2 | 1.0 | 1.2 |
| 1.2 | 1.3 | 1.6 |
| 1.4 | 1.4 | 2.0 |
| 1.6 | 1.4 | 2.2 |
| 1.65 | 1.7 | 2.8 |
| 1.8 | 1.7 | 3.1 |
| 1.95 | 1.7 | 3.3 |
| 2.0 | 2.0 | 4.0 |

As known from Table 3, the pseudo zoom ratio Zb=Zc/Za, and is determined to be one of predetermined values: Zb=1.0, 1.3, 1.4, 1.7 or 2.0. In this way, the finder zooming position and the virtual focal length F (=Zc×fmin) changes equally to each other in accordance with the zooming operation on the zoom lever 5, and a relatively large number of zooming steps are obtained with a small number of options of the pseudo zoom ratio.

To increase the actual focal length f and thus the actual zoom ratio Za gradually as the zooming lever 5 is operated to the telephoto side, rotary cam grooves of a lens zooming mechanism 26 extend diagonally to the axial direction of the taking lens 4 in its whole length in this embodiment, as implied by phantom lines 68 in FIG. 6.

In the above embodiments, the pseudo zoom ratio is determined depending upon the zooming position of the finder optical system 6 with reference to a look-up table. It is alternatively possible to determine the pseudo zoom ratio depending upon the zooming position of the taking lens 4, assuming that correlation between the pseudo zoom ratio Zb, the zooming position of the taking lens 4 or the actual zoom ratio Za and the zooming position of the finder 6 or the virtual zoom ratio Zc is predetermined. It is possible to determine the pseudo zoom ratio by calculation at each exposure, instead of reading out pseudo zoom ratio data from the ROM 35.

Figure 19:
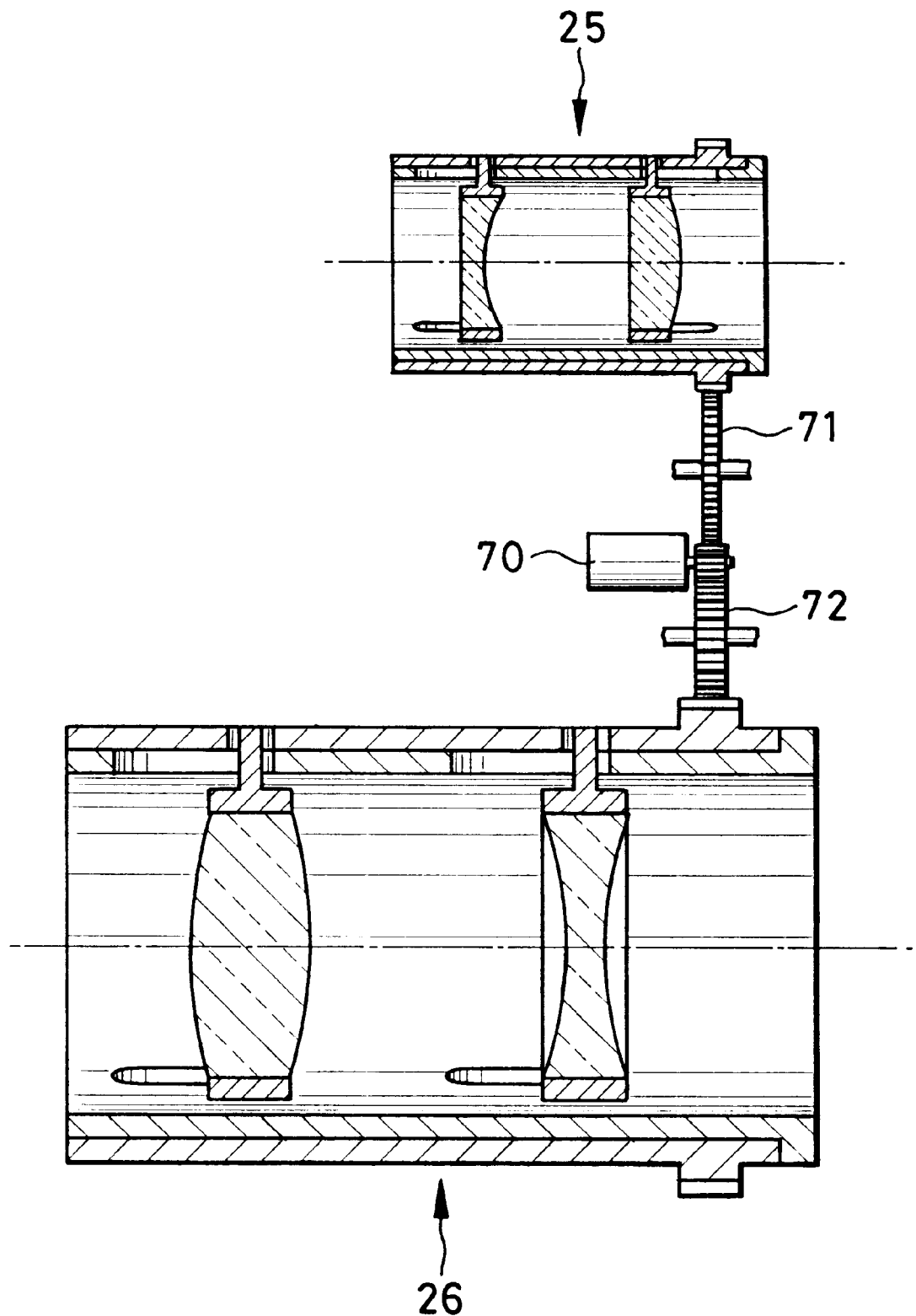
FIG. 19 is a sectional view of an embodiment wherein the lens zooming mechanism and the finder zooming mechanism are driven by a single motor.

Since the lens zooming mechanism 26 as well as the finder zooming mechanism 25 may be synchronously driven in the same direction while the zooming lever 5 is operated in the same zooming direction, it is possible to drive these mechanisms 25 and 26 by a single zoom motor. For example, as shown in FIG. 19, the finder zooming mechanism 25 and the lens zooming mechanism 26 may be driven by a zoom motor 70 through respective transmission gears 71 and 72 having appropriate reduction ratios.

Figure 20:
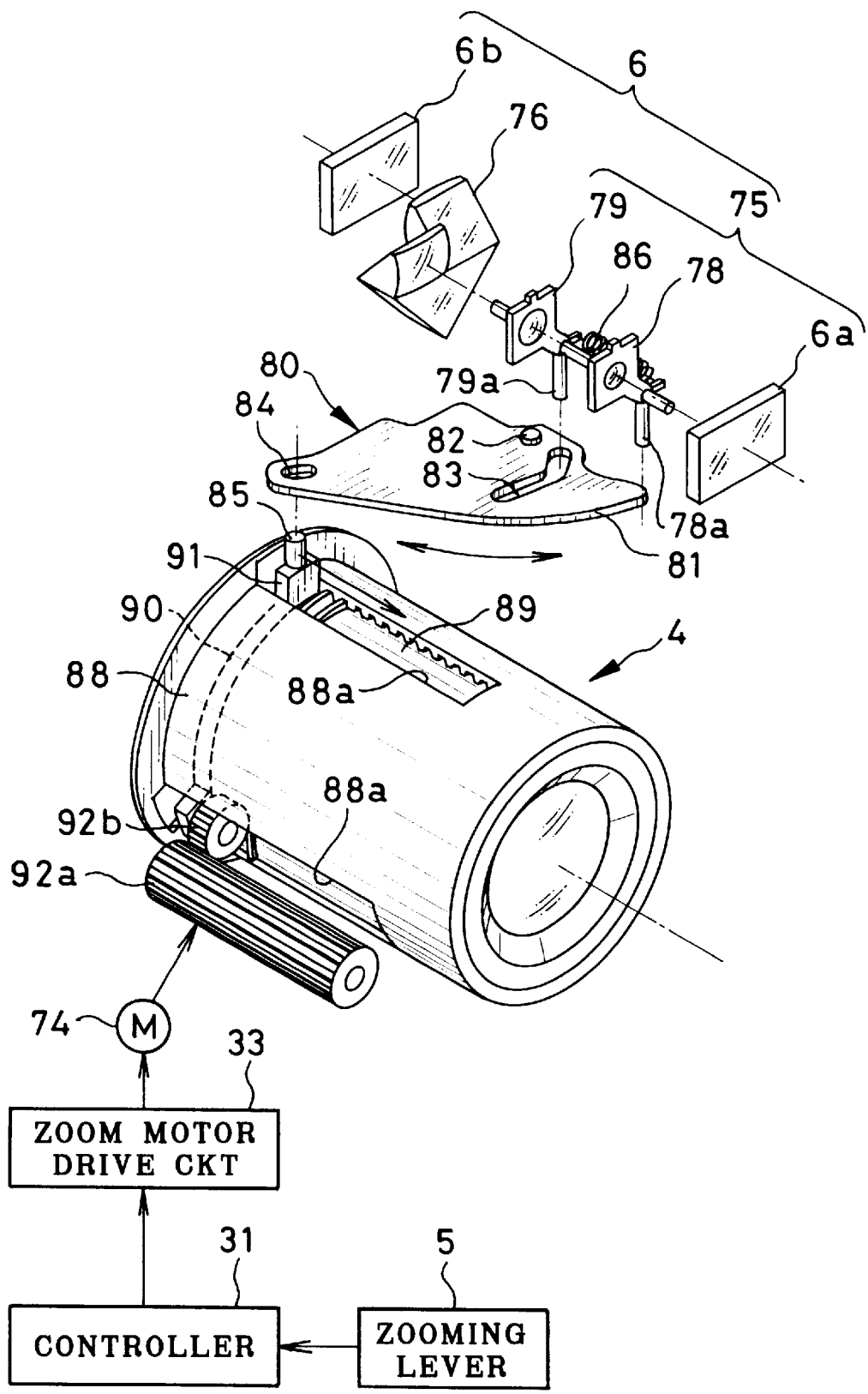
FIG. 20 is a perspective view of a taking lens, a finder optical system and a finder zooming mechanism according to another embodiment of the invention.

FIG. 20 shows an embodiment, wherein an optical finder optical system 6 and a taking lens 4 are interconnected by a cam mechanism, and are zoomed in cooperation by driving a single motor 74.

The finder optical system 6 of this embodiment is an real image finder that consists of an objective lens system 75, an erect image prism or Porro prism 76 and an eyepiece lens 6*b*. The objective lens system 75 consists of a fixed objective lens 6*a* and first and second movable lenses 78 and 79 arranged in this order from the object side. Lens holders of the movable lenses 78 and 79 have cam pins 78*a* and 79*a* that are interlocked with a sector cam plate 80.

The sector cam plate 80 has an arched cam surface 81 directed to the object side, and is pivotal about an axle 82 in a horizontal plane that is parallel to the optical axes of the taking lens 4 and the finder optical system 6. The cam pin 78*a* of the first movable lens 78 is engaged with the cam surface 81, whereas the cam pin 79*a* of the second movable lens 79 is engaged with a cam slot 83. The sector cam plate 80 further has a cam slop 84 with which a drive pin 85 of the taking lens 4 is engaged to transmit the zooming movement of the taking lens 4.

To keep the pin 78*a* of the first movable lens 78 in contact with the arched cam surface 81, and the pin 79*b* of the second movable lens 79 in contact with an object side edge of the cam slot 83, the first and second movable lenses 78 and 79 are urged toward each other by a coiled spring 86. In accordance with the rotational amount of the cam plate 80, the movable lenses 78 and 79 are moved in the axial direction.

In this embodiment, the taking lens 4 is a mechanical zoom lens consisting of front and rear lens groups, wherein a cam mechanism is used for changing spacing between the front and rear lens groups during zooming, and only the rear lens group is moved for focusing, though the lens groups are not shown in FIG. 20. The lens groups are held in a lens barrel that includes a fixed barrel 88, a rotary barrel 89 and an axial movement guide ring 90. The rotary barrel 89 is mounted inside the fixed barrel 88 and is engaged with the fixed barrel 88 through a helicoid, so that the rotary barrel 89 is rotatable about the optical axis of the taking lens 4 while moving along the optical axis.

An axial movement ring 90 is attached to a rear end of the rotary barrel 89 so as to be rotatable relative to the rotary barrel 89. The axial movement ring 90 has three radial projections 91 around its outer periphery. The projections 91 are inserted in three axial slots 88*a* of the fixed barrel 88, so that the axial movement ring 90 moves in the axial direction without rotating, along with the axial movement of the rotary barrel 89.

The rotary barrel 89 is rotated by the motor 74 through transmission gears 92a and 92b, and a controller 31 controls rotational direction and amount of the motor 74 through a zoom motor drive circuit 33 depending upon operating direction and amount of a zooming lever 5.

The front and rear lens groups of the taking lens 4 are mounted in the rotary barrel 89 through a cam mechanism such that both lens groups move in the axial direction while changing the distance to each other, while the rotary barrel 89 rotates to move in the axial direction with the axial movement ring 90. Therefore, the axial position of the axial movement ring 90 represents the zooming position of the taking lens 4. Since the cam plate 80 rotates with the axial movement of the axial movement ring 90, the movable lenses 78 and 79 of the finder optical system 6 is moved along the optical axis of the finder optical system 6 in accordance with the zooming position of the taking lens 4.

The cam surface 81 and the cam slot 83 of the cam plate 80 are shaped such that the zooming position of the finder optical system 6 changes with the zooming position of the taking lens 4 in a predetermined way, e.g., in the way as shown in FIG. 18. The embodiment of FIG. 20 is also applicable to changing the zooming positions of the taking lens 4 and the finder optical system 6 in the way as shown in FIG. 9, FIG. 14 or FIG. 15. The controller 31 determines the pseudo zoom ratio depending upon the zooming position of the taking lens 4. It is possible to determine the pseudo zoom ratio depending upon the rotational position of the zoom motor 74 that may be detected through a rotary encoder or the like.

Although the taking lens 4 is a mechanical zoom lens consisting of two lens groups in the above embodiments, it is possible to use a zoom lens consisting of three or more lens groups. The taking lens 4 may also be a zoom lens where a front lens group is moved for focusing. It is possible to use an optical compensation type zoom lens using a plurality of zoom motors as the taking lens 4. In that case, it is possible to utilize one of these zoom motors for zooming the optical finder optical system 6.

It is also possible to drive a finder zooming mechanism by a motor, and drive a taking lens zooming mechanism in cooperation with the finder zooming mechanism through an appropriate transmission mechanism such as a gear train or a cam mechanism.

The optical finder optical system 6 is not limited to the real image type, but may be a virtual image type. In that case, the finder zoom ratio means an image magnification relative to a minimum size of an image viewed through of the finder.

Figure 21:
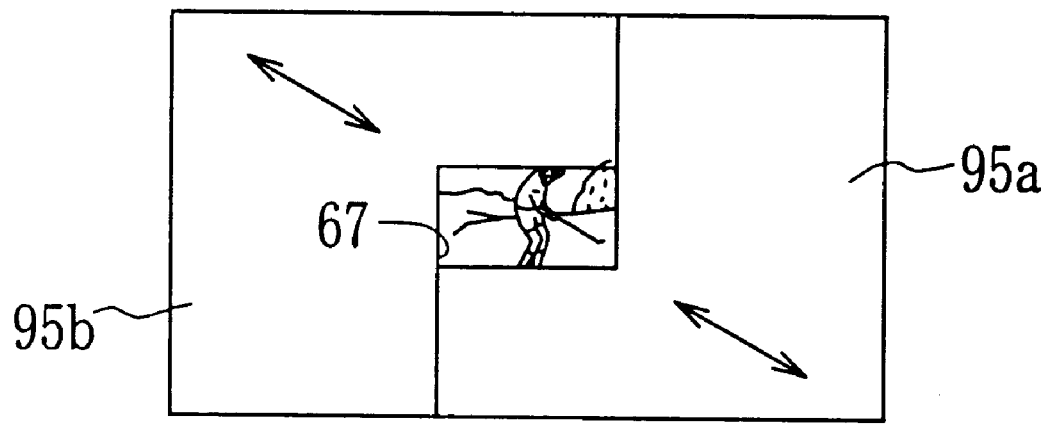
FIG. 21 is an explanatory diagram illustrating a field of view of a viewfinder according to another embodiment of the invention.

Instead of the finder optical system 6, it is possible to use a fixed focus finder and change the size of view field 67 in accordance with the virtual zoom ratio by use of a pair of movable framing blades 95a and 95b, as shown in FIG. 21. In that case, the view field 67 corresponds in size to the printing area P relative to the full size frame photographed on the filmstrip 23. The framing blades 95a and 95b may be moved by use of the zoom motor for the taking lens.

It is also possible to combine the movable framing blades 95a and 95b with a zoom finder. According to an embodiment shown in FIG. 22, the zoom finder has the same maximum zoom ratio as a taking lens, and is zoomed at the same zoom ratio as the taking lens, till they reach their telephoto terminals. Thereafter, the framing blades 95a and 95b are driven to limit the field of view 67 in accordance with the pseudo zoom ratio responsive to a zooming operation to the telephoto side. Where the pseudo zoom ratio of more than 1.0 is assigned before the focal length of the taking lens reaches its maximum value, the framing blades 95a and 95b are driven in accordance with the assigned pseudo zoom ratio. The finder zoom ratio may be different from the zoom ratio of the taking lens. It is also possible to zoom the zoom finder in accordance with the pseudo zoom ratio and change the size of the view field 67 in accordance with the zooming position of the taking lens.

Figure 23:
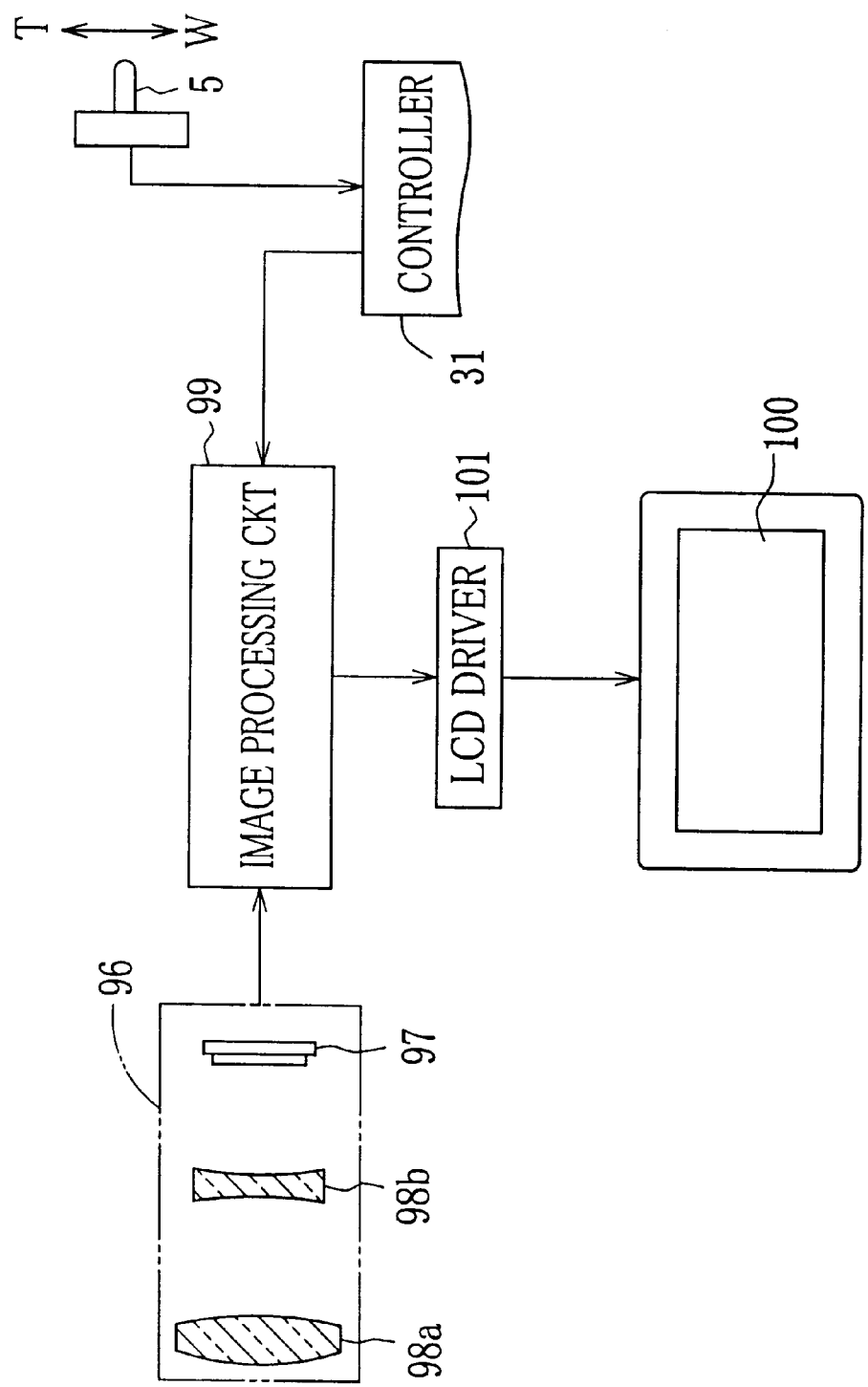
FIG. 23 is a block diagram of an electronic viewfinder.

It is also possible to use an electronic viewfinder in place of a finder optical system. For example, as shown in FIG. 23, the electronic viewfinder is constituted of an imaging device 96, an image processing circuit 99 and a digital display device 100 such as an LCD panel. The imaging device 96 consists of an image sensor 97 such as a CCD and an imaging lens system 98a and 98b for forming an image of the photographic subject on the CCD 97. A controller 31 controls the image processing circuit 99 to process image data detected through the imaging device 96 in accordance with a zooming signal from a zooming lever 5. Based on the processed image data, the LCD panel 100 is driven through an LCD driver 101, so the LCD panel 100 displays the photographic subject in a real time fashion at a magnification corresponding to the virtual zoom ratio obtained by the actual zooming of the taking lens and the pseudo zooming function.

It is possible to use a zoom lens in place of the imaging lens system 98a and 98b, and control the zoom lens in accordance with the zooming signal from the zooming lever 5.

In the above embodiments, the finder and the taking lens have individual optical systems. In alternative, the finder and the taking lens may partly use a common optical system, like in a single-lens reflex camera. In that case, the finder is zoomed together with the taking lens in a range where the pseudo zooming function is not used, whereas the finder is zoomed independently of the taking lens by use of its own zoom lens system or the like in the pseudo zooming range.

Figure 3:
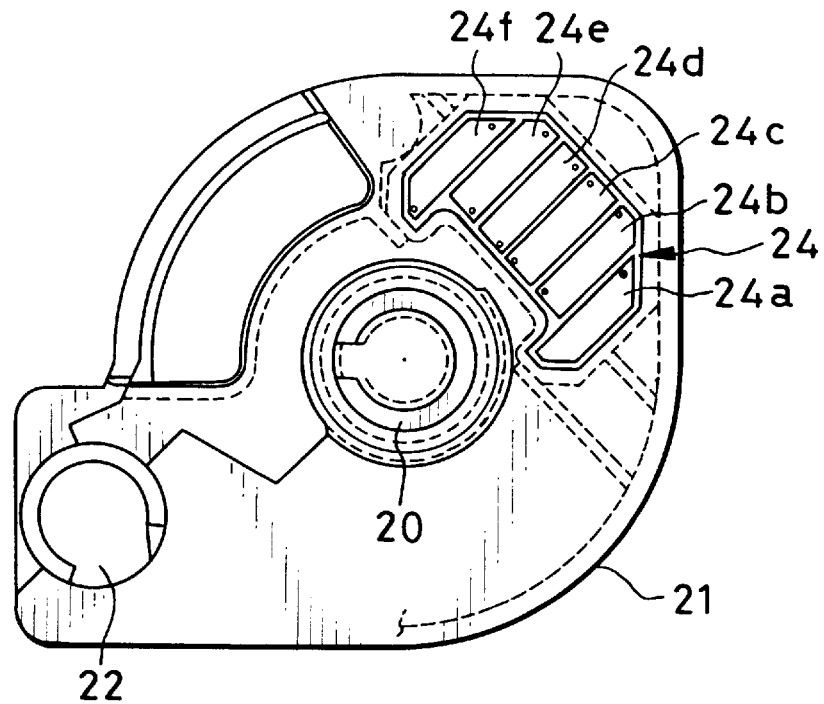
FIG. 3 is a top plan view of a face of an IX240 type photo film cartridge with an IC memory.

Although the pseudo zoom ratio data is written in the IC memory 24 of the cartridge shell 21, the IC memory 24 is not limited to the embodiment shown in FIG. 3, but may be replaced by an IC memory which is able to write data thereon through an optical device or the like, without the need for contact strips. It is also possible to write the pseudo zoom ratio data and other photographic data on the magnetic recording track 23M of the filmstrip 23, or to optically record the pseudo zoom ratio data on the filmstrip.

Figure 24:
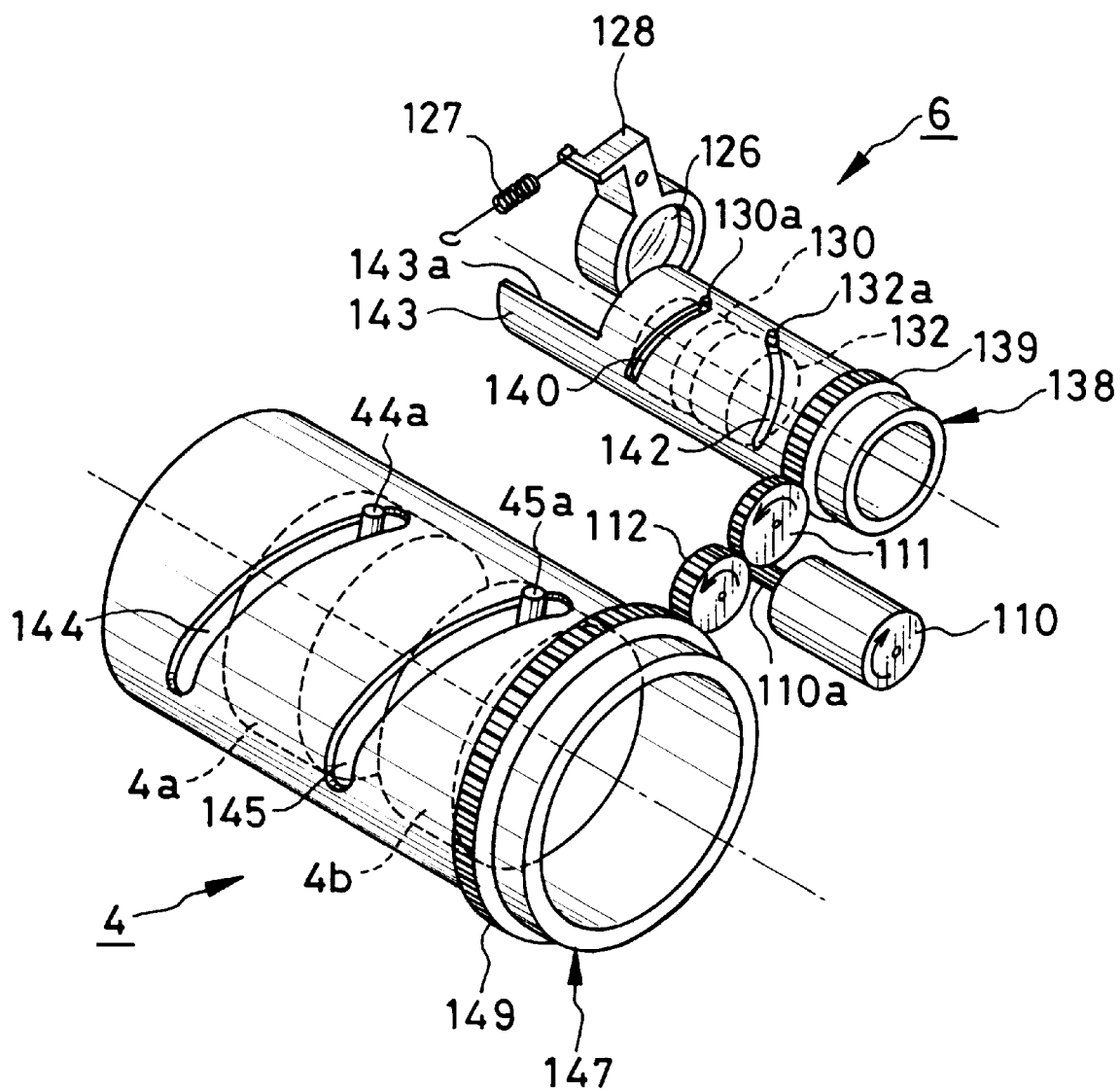
FIG. 24 is a perspective view of a taking lens and a finder optical system consisting of a zoom finder and a converter lens according to another embodiment of the invention.
Figure 25A:
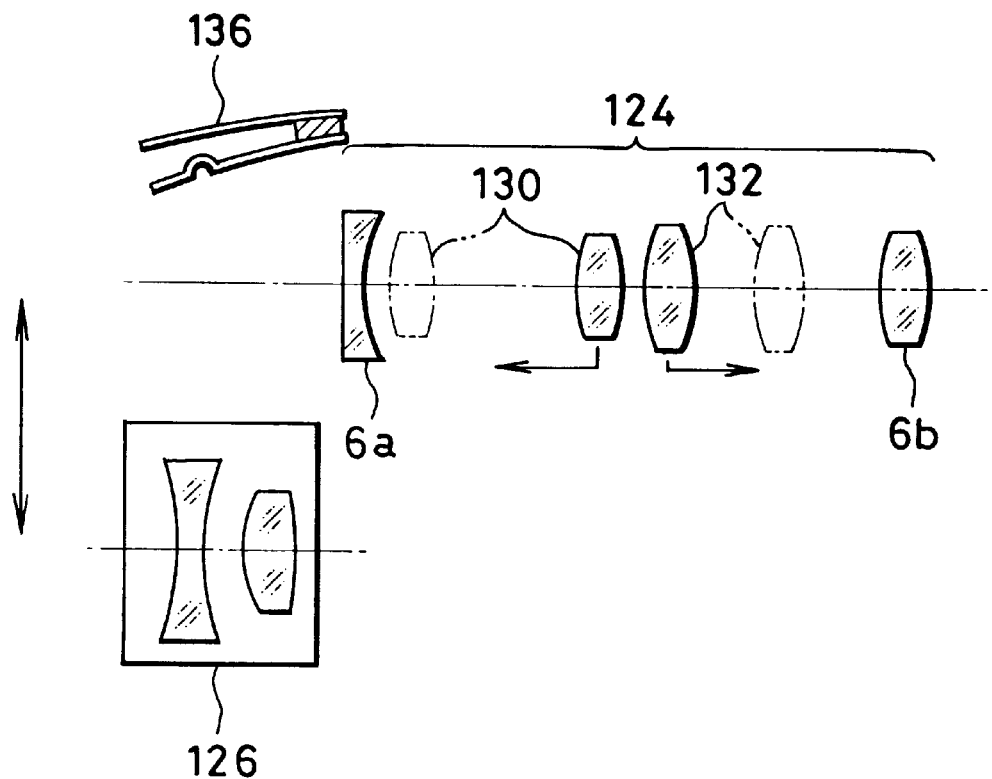
FIGS. 25A and 25B are explanatory diagrams illustrating a converter lens switching operation of the finder optical system according to the embodiment of FIG. 24.
Figure 25B:
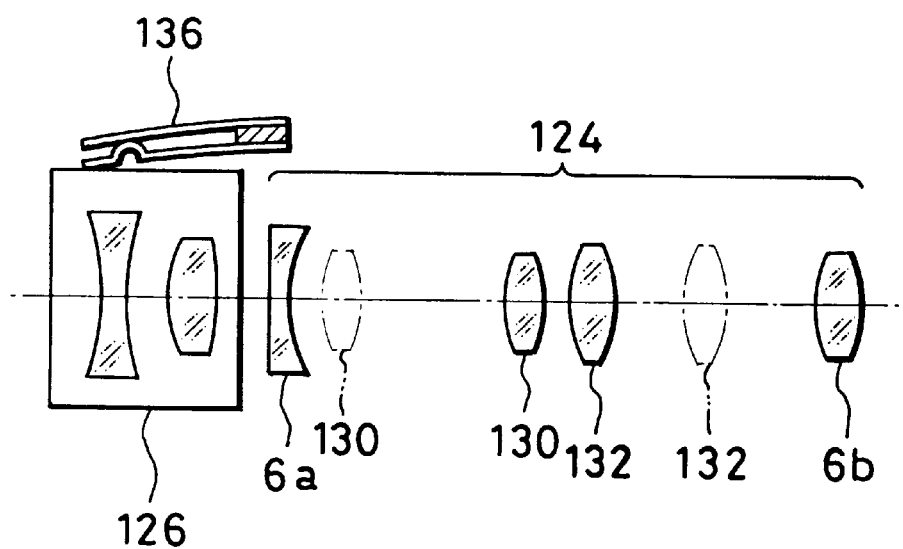

FIG. 24 shows a taking lens 4 and a finder optical system 6 for use in a zoom camera with the pseudo zooming function according to another embodiment of the invention, wherein a converter lens 126 is combined with a zoom finder 124 in the finder optical system 6, as shown in FIGS. 25A and 25B. The zoom finder 124 consists of an objective lens 6a, an eyepiece lens 6b and first and second movable lenses 130 and 132 movable along an optical axis of the zoom finder 124. The first and second movable lenses 130 and 132 are moved away from each other from their wide-angle terminal position shown by solid lines in FIG. 25A, increasing the focal length of the zoom finder 124. In this embodiment, the zoom finder 124 can zoom up to a zoom ratio of 2.5.

The converter lens 126 is movable between a position out of the optical axis of the zoom finder 124 as shown in FIG. 25A, and a position on the optical axis of the zoom finder 124 in front of the objective lens 6a, as shown in FIG. 25B. A leaf switch 136 is provided for detecting the insertion of the converter lens 126 in front of the zoom finder 124. In this embodiment, the converter lens 126 has a magnification of 1.4. Accordingly, the finder optical system 6 has a magnification at the maximum that corresponds to a zoom ratio of 3.5 (=2.5×1.4). Hereinafter, the zoom ratio of the finder optical system 6 will be called a total zoom ratio, to distinguish from the sole zoom ratio of the zoom finder 124.

Referring back to FIG. 24, the movable lenses 130 and 132 of the zoom finder 124 are held in a rotary cam barrel 138 with their cam follower pins 130*a* and 132*a* inserted in cam grooves 140 and 142 of the rotary cam barrel 138. The movable lenses 130 and 132 are also guided in the axial direction by an axial guide member through it is omitted from the drawings for clarity sake. The rotary cam barrel 138 has a ring gear 139 formed around its periphery, and is rotated by a lens motor 110 through a drive gear 110*a*, a transmission gear 111 and the ring gear 139. When the rotary cam barrel 138 is rotated in a clockwise direction in FIG. 24, the movable lenses 130 and 132 are moved away from each other. A converter switching member 143 is formed integrally with the rotary cam barrel 138 on the object side thereof.

Figure 26:
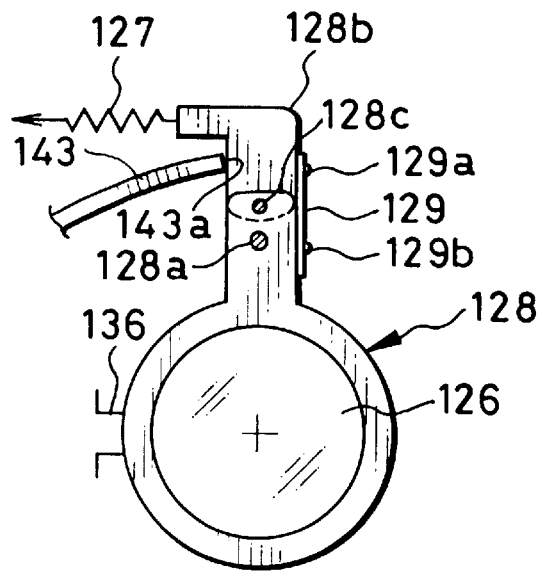
FIG. 26 is an enlarged view of a converter lens switching mechanism according to the embodiment of FIG. 24.

As shown in detail in FIG. 26, the converter lens 126 is held in a lens holder 128 that is mounted pivotal about an axle 128*a*, and is urged by a spring 127 to rotate in a counterclockwise direction in FIG. 26. Specifically, the lens holder 128 is coupled to a lever 128*b* through an axle 128*c* and a plate spring 129. The plate spring 129 is fixed to the lever 128*b* through a pin 129*a*, and is slidably connected to the lens holder 128 through a pin 129*b*.

When the rotary cam barrel 138 is rotated in the clockwise direction, i.e. to the telephoto side, beyond a predetermined rotational range from the wide-angle terminal position shown in FIG. 24, an edge 143*a* of the converter switching member 143 pushes the lever 128*b*, as shown in FIG. 26. As a result, the converter lens 126 is rotated clockwise against the force of the spring 127, to be inserted in front of the zoom finder 124. When the lens holder 128 is brought into contact with a stopper 136, the converter lens 126 is positioned coaxially with the zoom lens 124. Thereafter, as the rotary cam barrel 138 is rotated further in the clockwise direction, only the lever 128*b* rotates clockwise about the axle 128*c* while bending the spring 129.

When the rotary cam barrel 138 rotates counterclockwise, and the edge 143A of the converter switching member 143 moves in the removing direction from the lever 128*b*, the converter lens 126 moves away from the optical axis of the zoom lens 124 according to the force of the spring 127.

In the embodiment shown in FIG. 24, the taking lens 4 is a zoom lens consisting of front and rear lens groups 4*a* and 4*b*, and has a maximum zoom ratio of 2.5 in correspondence with the zoom finder 124. Cam follower pins 44*a* and 45*a* of the front and rear lens groups 4*a* and 4*b* are inserted in cam grooves 144 and 145 of a rotary cam barrel 147, and are guided along an optical axis of the taking lens 4 by a not-shown axial guide member, as the rotary cam barrel 147 rotates. The rotary cam barrel 147 is rotated by the lens motor 110 through the drive gear 110*a*, a transmission gear 112 and a ring gear 149 that is formed around the periphery of the rotary cam barrel 147. That is, the rotary cam barrels 138 and 147 are driven synchronously, and the cam grooves 144 and 145 are formed such that the taking lens 4 is zoomed at the same zoom ratio as the zoom finder 124 in the same range, i.e. from 1.0 to 2.5 in this instance.

Figure 27:
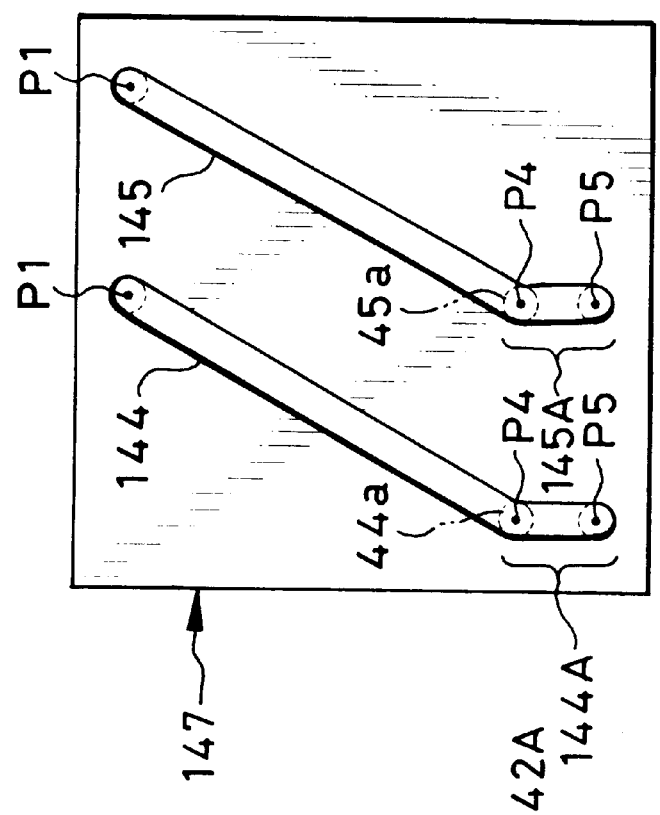
FIG. 27 is an unfolded view of a finder cam barrel of the finder optical system according to the embodiment of FIG. 24.
Figure 28:
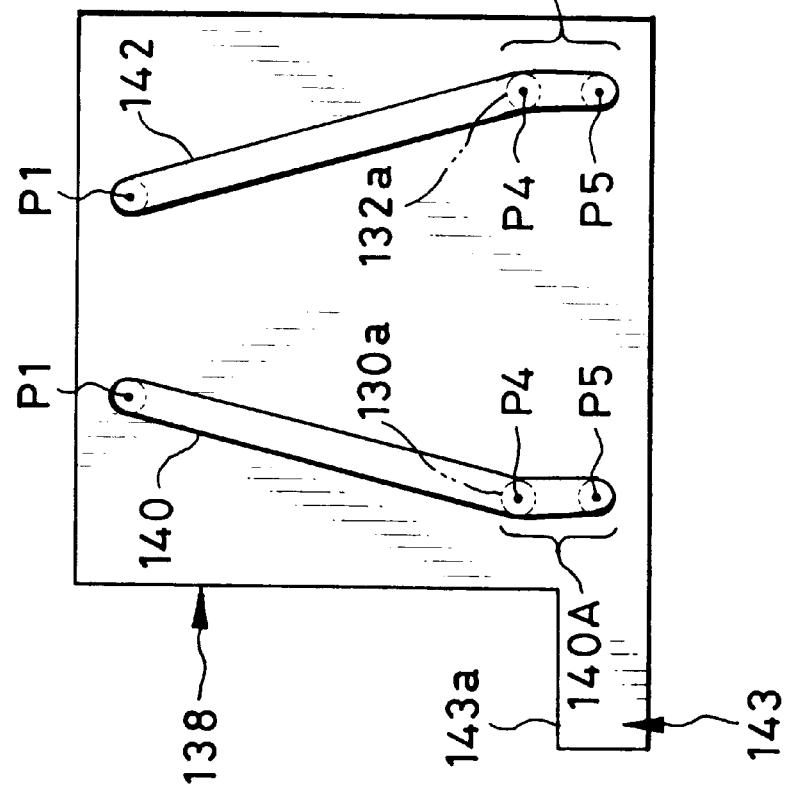
FIG. 28 is an unfolded view of a rotary cam barrel of the lens zooming mechanism according to the embodiment of FIG. 24.

FIGS. 27 and 28 schematically show the rotary cam barrels 138 and 147. Although these cam barrels 138 and 147 are different in size, the cam grooves 140, 142, 144 and 145 are illustrated in the same length in the rotational direction of the cam barrels 138 and 142, for the sake of easy understanding. The cam grooves 140, 142, 144 and 145 have sections 140A, 142A, 144A and 145A that extend in the rotational direction of the barrels 138 and 147 from points P4 where the zoom finder 124 and the taking lens 4 reach the maximum zoom ratio, to telephoto terminal points P5. A terminal point P1 of each grooves 140, 142, 144 and 145 corresponds to the wide-angle terminal position. The edge 143*a* of the converter switching member 143 extends along an axial line that crosses an intermediate point between the points P4 and P5 in the cam barrel 138.

According to this configuration, the lens motor 110 rotates in a forward direction in response to a zooming operation to the telephoto side, thereby to rotate the rotary lens barrels 138 and 147 in the clockwise direction. Then, the zoom finder 124 and the taking lens 4 is zoomed linearly at the same zoom ratio up to the maximum zoom ratio of 2.5 till the cam follower pins 130*a*, 132*a*, 44*a* and 45*a* reach the point P4, as shown by a solid line in FIG. 29. In this embodiment, the zoom finder 124 and the taking lens 4 are zoomed stepwise, that is, stopped at predetermined zooming positions P1 to P5: P1=1.0, P2=1.5, P3=2.0, and P4, P5=2.5 in zoom ratio. The zooming positions P1, P4 and P5 correspond to the points P1, P4 and P5 in the cam grooves 140, 142, 144 and 145.

Figure 29:
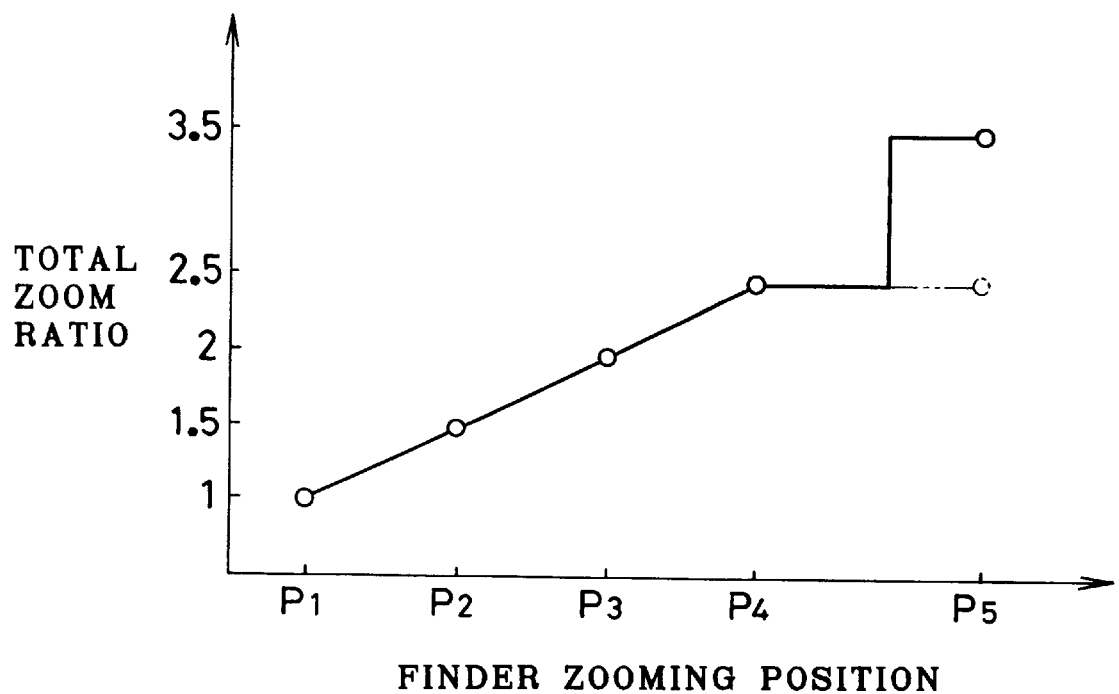
FIG. 29 is a graph illustrating a relationship between finder zooming position and total zoom ratio of the finder optical system according to the embodiment of FIG. 24.

After reaching the point P4, if the zooming operation to the telephoto side is continued, the cam follower pins 130*a*, 132*a*, 44*a* and 45*a* move along the sections 140A, 142A, 144A and 145A, so that the focal lengths of the zoom lens 124 and the taking lens 4 are maintained at the maximum value, as show by phantom lines in FIG. 29. However, while the rotary cam barrel 138 of the zoom finder 124 rotates from the point P4 to the point P5, the edge 143*a* of the converter switching member 143 pushes the lever 128*b*, so that the converter lens 126 is inserted in the optical axis of the zoom finder 124. Thus, the total zoom ratio of the finder optical system 6 becomes 3.5, as shown by the solid line in FIG. 29.

The insertion of the converter lens 126 is detected by the leaf contact 136, and a detection signal is sent to a not-shown controller. Then, a pseudo zoom ratio equal to the magnification of the converter lens 126, i.e., 1.4 in this instance, is assigned to respective original frames that are photographed while the converter lens 126 is inserted. The pseudo zoom ratio may be assigned as pseudo zoom ratio data to the original frame by use of an IC memory or a magnetic recording track or the like in the same way as described with respect to the above embodiments.

Figure 30:
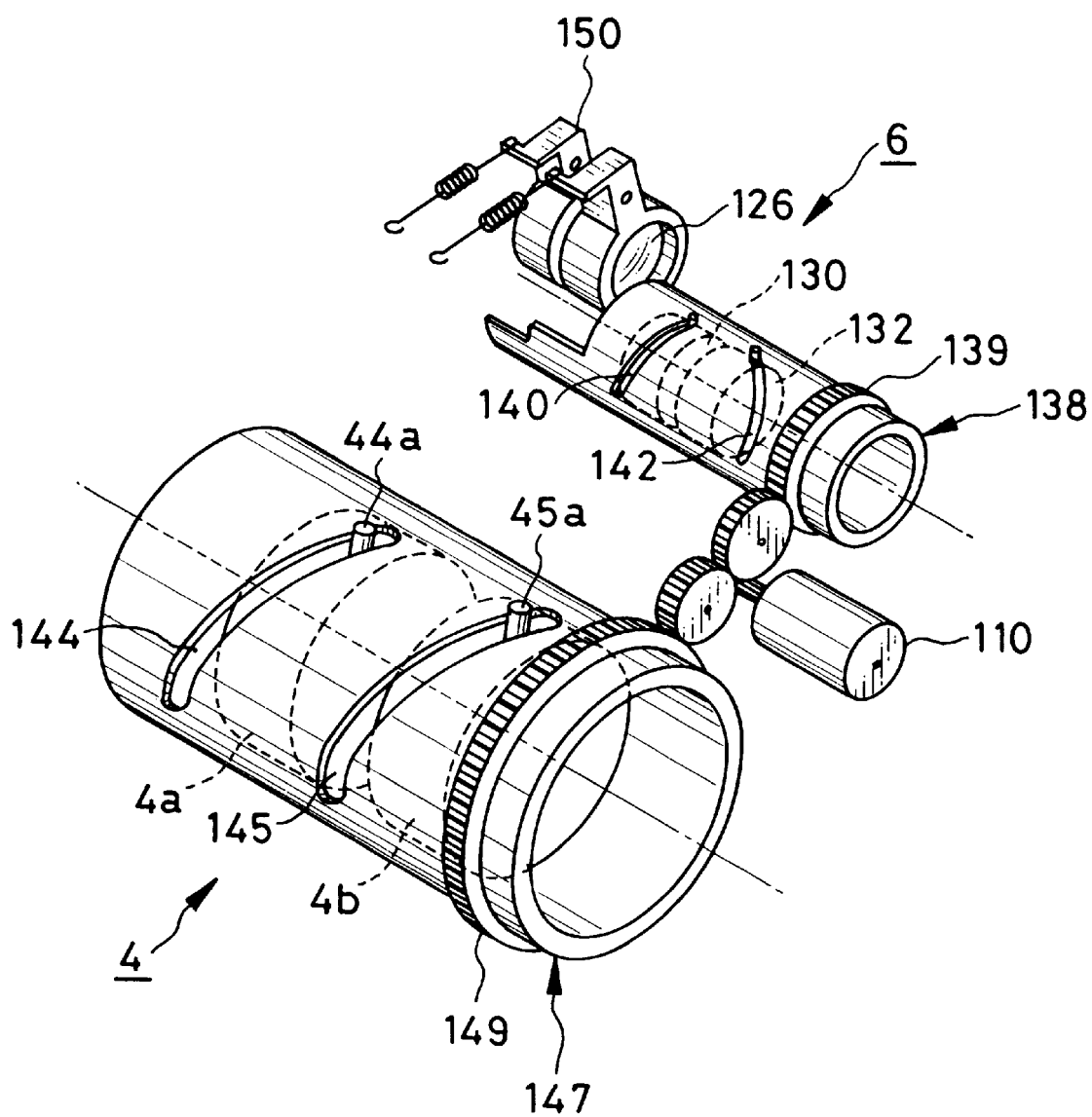
FIG. 30 is a perspective view of a taking lens and a finder optical system consisting of a zoom finder and two converter lenses according to another embodiment of the invention.

It is possible to use a second converter lens 150 in addition to a first converter lens 126, as shown in FIG. 30. For example, a composite magnification of the first and second converter lenses 126 and 150 is 2.0, whereas the magnification of the first converter lens 126 is 1.4. The second converter lens 150 is mounted to be movable into and out of the optical axis of a zoom finder 124, in the same way as the first converter lens 126, but separately from the first converter lens 126.

Figure 31:
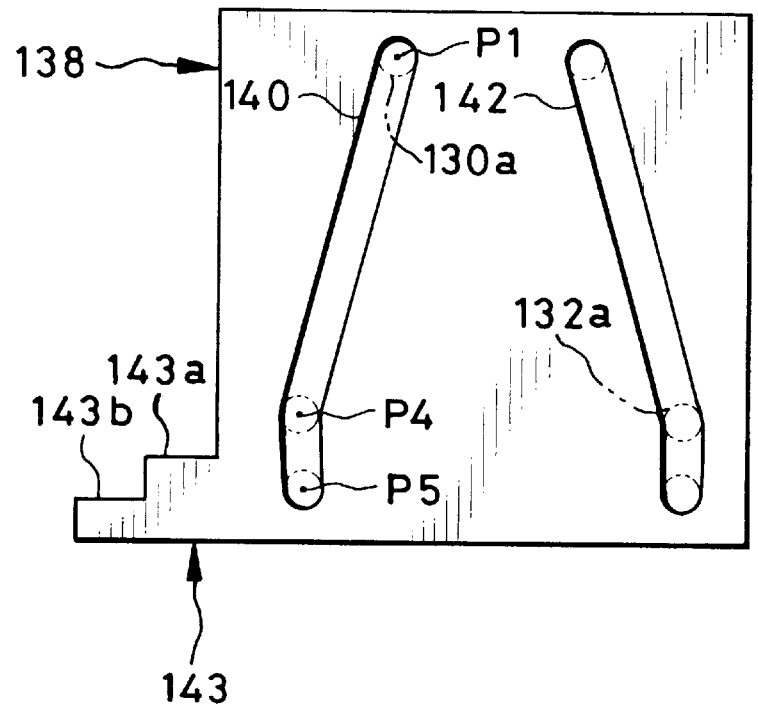
FIG. 31 is an unfolded view of a finder cam barrel of the finder optical system according to the embodiment of FIG. 30.
Figure 32A:
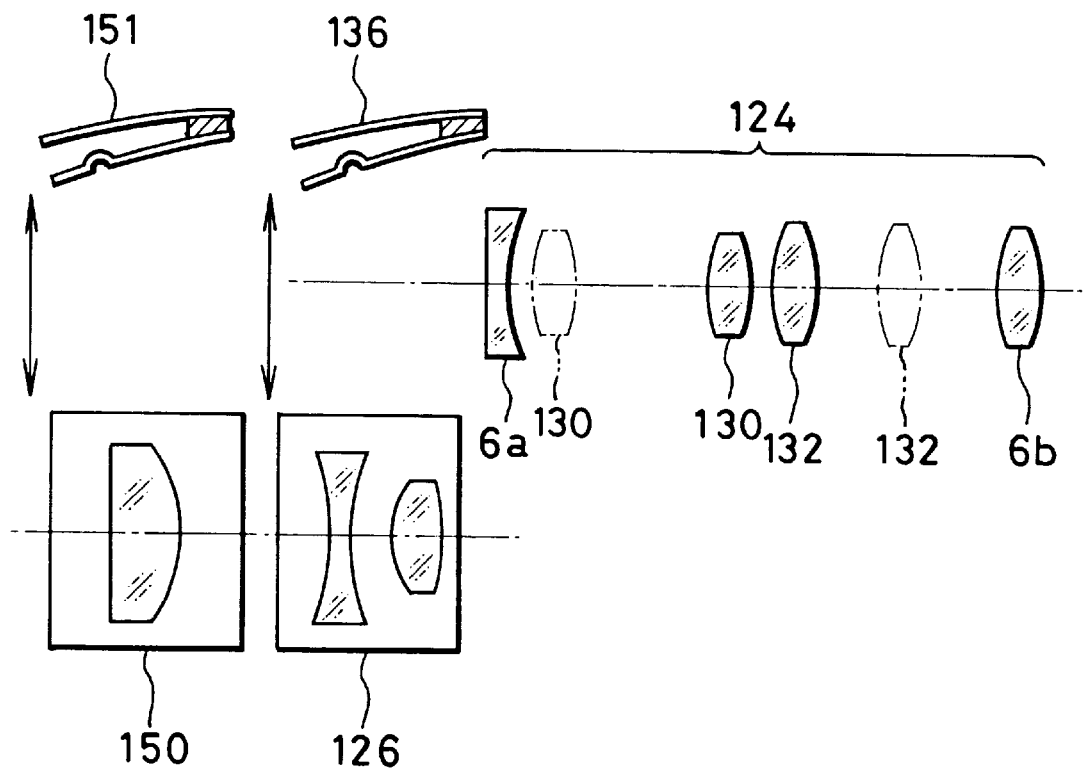
FIGS. 32A, 32B and 32C are explanatory diagrams illustrating a converter lens switching operation of the finder optical system according to the embodiment of FIG. 30.

As shown in FIG. 31, a rotary cam barrel 138 of the zoom finder 124 is provided with a converter switching member 143 having two edges 143*a* and 143*b*. As shown in FIGS. 32A, a leaf contact 151 for detecting insertion of the second converter lens 150 is provided besides a leaf contact 136 for the first converter lens 136. Other constructions may be equivalent to the embodiment shown in FIG. 24, so the embodiment of FIG. 30 will be described on the assumption that the other constructions are equal to those of the embodiment of FIG. 24.

According to the embodiment of FIG. 30, while the rotary cam barrel 138 is rotated in the clockwise direction to bring cam follower pins 130a and 132a from the wide-angle terminal point P1 to the bending point P4 of cam grooves 140 and 142, the zoom ratio of the zoom finder 124 increases up to the maximum value, and the converter lenses 126 and 150 are not inserted in the optical axis of the zoom finder 124, as shown in FIG. 32A.

Figure 32B:
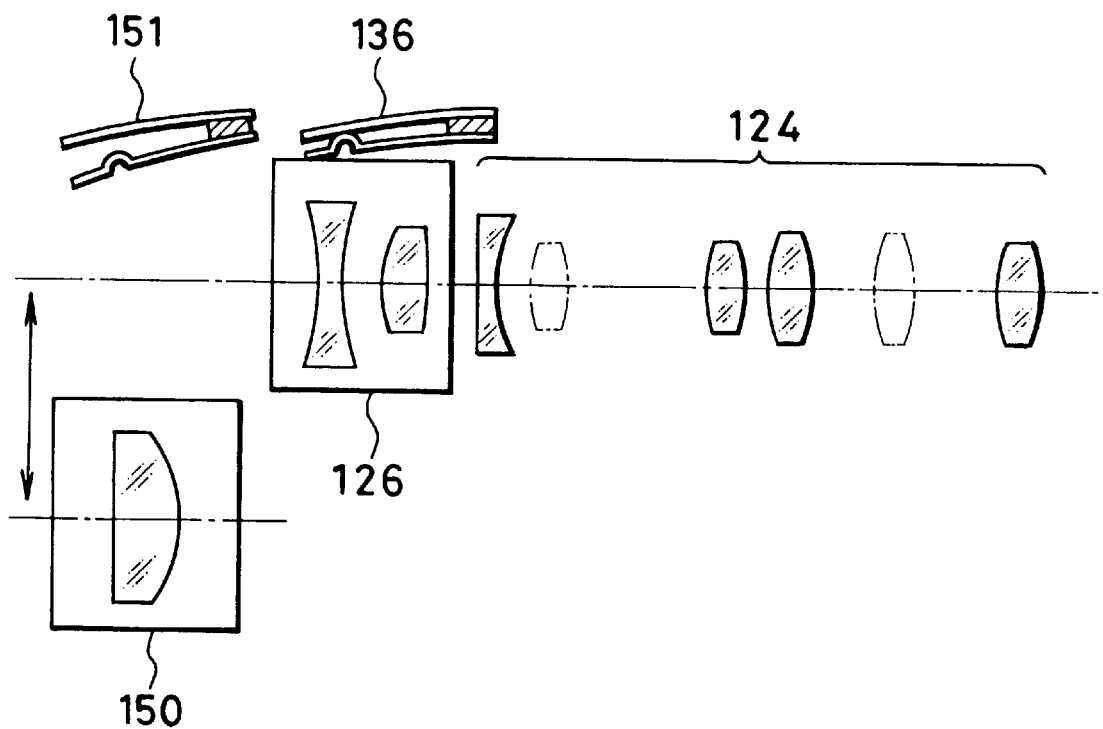
Figure 32C:
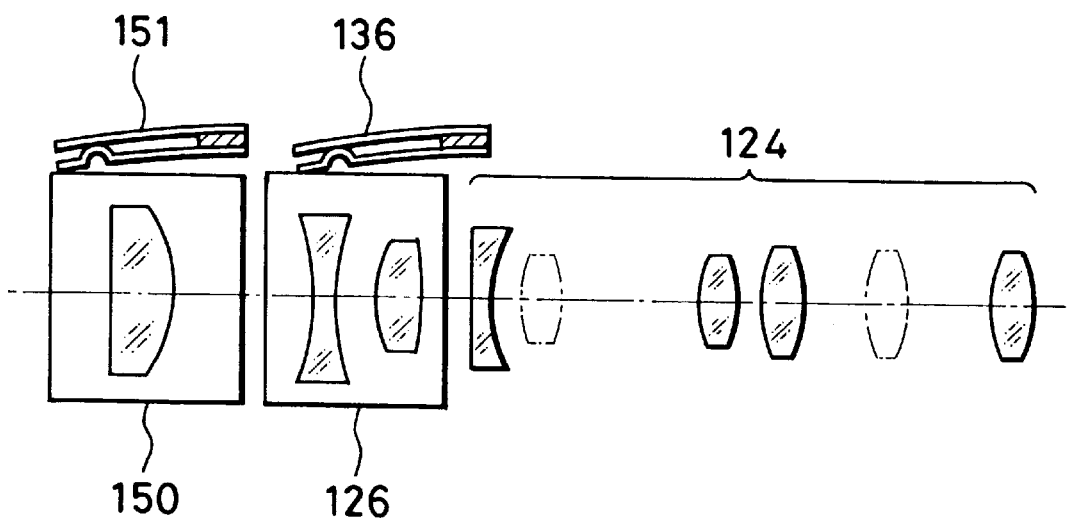
Figure 33:
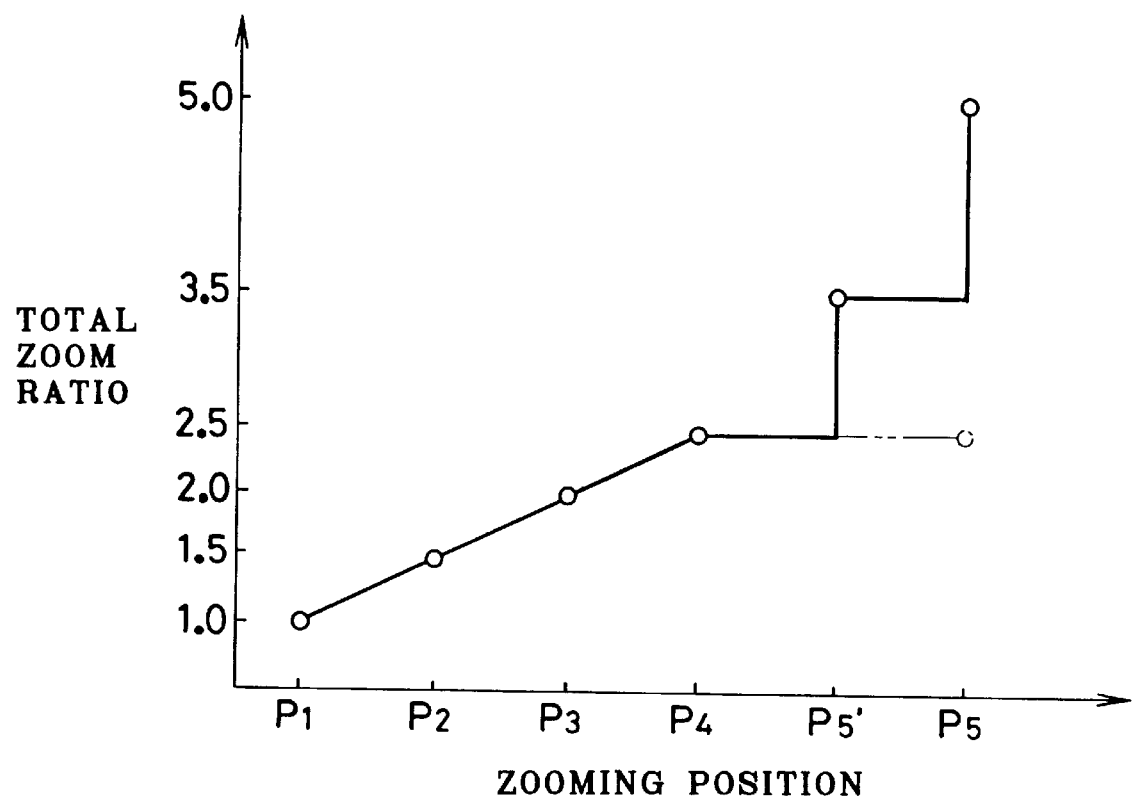
FIG. 33 is a graph illustrating a relationship between finder zooming position and total zoom ratio of the finder optical system according to the embodiment of FIG. 30.

While the rotary cam barrel 138 is rotated further in the clockwise direction to bring the pins 130a and 132a from the point P4 to the point P5, first the converter lens 126 is inserted in the optical axis of the zoom finder 124 at an intermediate point P5' between the points P4 and P5, as shown in FIGS. 32B and 33, thereafter, the second converter lens 150 is inserted in the optical axis, as shown in FIG. 32C. As a result, the total zoom ratio of the finder optical system 6 changes from 2.5 to 3.5 and then from 3.5 to 5.0, as shown by a slid line in FIG. 33, while the zoom ratio of the zoom finder 124 is maintained at the maximum value of 2.5, as shown by a phantom line.

When a frame is photographed while the insertion of the first converter lens 126 is detected by the leaf contact 136, a pseudo zoom ratio of 1.4 is assigned to that frame. When a frame is photographed while the insertion of the first and second converter lens 126 and 150 are detected by the leaf contacts 136 and 150, a pseudo zoom ratio of 2.0 is assigned to that frame.

Although the converter lens 126 or 150 is inserted into the optical axis of the zoom finder 124 by the converter switching member 143 that is formed integrally with the rotary cam barrel 138 of the zoom finder 124, and is retracted from the optical axis of the zoom finder 124 according to a spring force, the mechanism for switching the converter lens 126 and 150 is not limited to the above embodiment. For example, it is possible to drive a converter switching mechanism by the same motor as used for driving the rotary cam barrel of the zoom finder, or by a separate motor specific to the converter switching mechanism.

Figure 34:
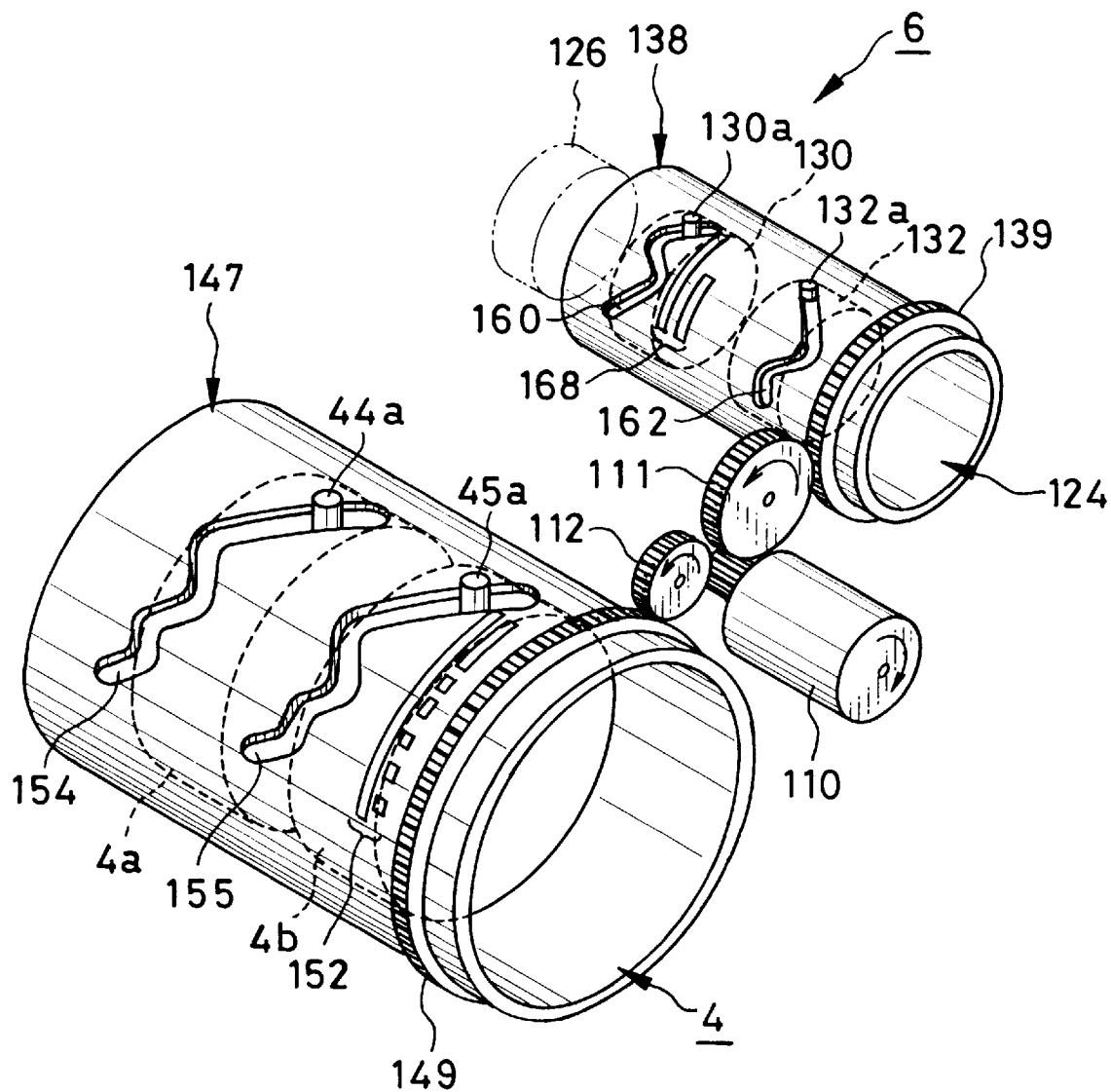
FIG. 34 is a perspective view of a taking lens and a finder optical system consisting of a zoom finder and a converter lens, according to another embodiment of the invention.

FIG. 34 shows a finder optical system 6 and a taking lens 4 according to another embodiment of the invention, wherein like or corresponding parts are designated by the same reference numerals as used in FIG. 24, so the following description relates only to those elements essential for explaining this embodiment.

A rotary cam barrel 147 of the taking lens 4 is provided with two cam grooves 154 and 155 for guiding cam follower pins 44a and 45a of front and rear lens groups 4a and 4b. The cam grooves 154 and 155 are shaped such that the zoom ratio of the taking lens 4 linearly increases up to its maximum value and thereafter varies up and down while the rotary cam barrel 147 is rotated clockwise from a wide-angle terminal position to a telephoto terminal position. Also in this embodiment, the taking lens 4 is assumed to be zoomed stepwise.

A contact pattern 152 for assigning a pseudo zoom ratio to each zooming position is provided on an outer periphery of the rotary cam barrel 147 along its circumferential or rotational direction. The pseudo zoom ratio assigning contact pattern 152 is brushed by a brush member 152A, see FIG. 35. Thereby, a different signal pattern is detected according to the rotational position of the rotary cam barrel 147 that represents the zooming position of the taking lens 4. In correspondence with the signal pattern, pseudo zoom ratio data is assigned to each frame.

Before the actual zoom ratio of the taking lens 4 first reaches the maximum value, the pseudo zoom ratio of 1.0 is assigned, that is, the pseudo zooming function is not used. Once the actual zoom ratio reaches the maximum value, if the rotary cam barrel 147 is rotated further to the telephoto side, a pseudo zoom ratio is allocated to each zooming positions such that the virtual zoom ratio increases in an approximately linear fashion.

Figure 36:
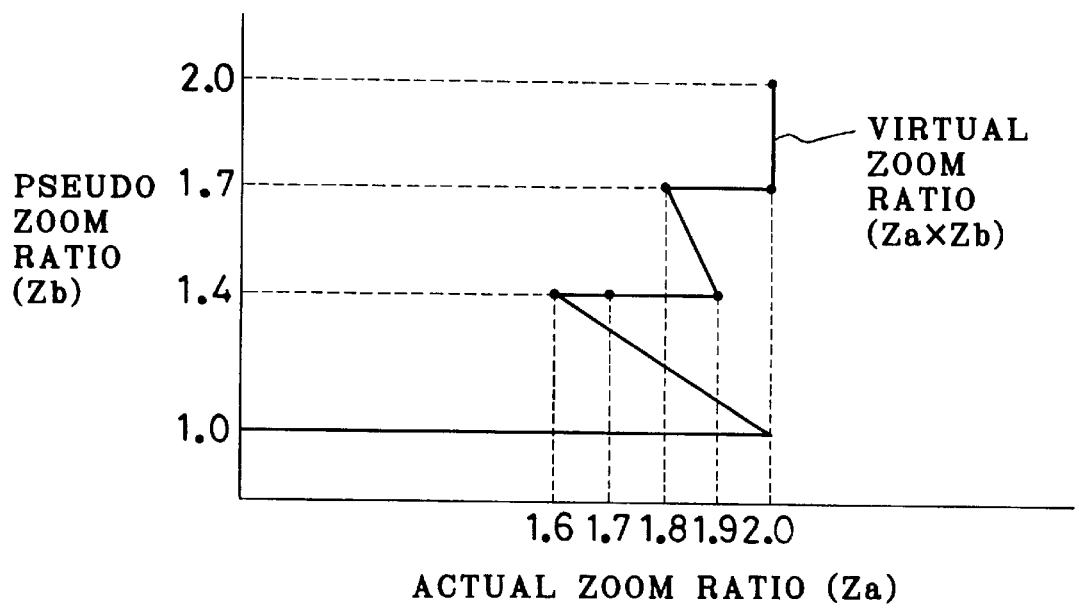
FIG. 36 is a graph illustrating a relationship between actual zoom ratio of the taking lens and pseudo zoom ratio according to the embodiment of FIG. 34.

Table 4 shows a correlation between the actual zoom ratio Za and the pseudo zoom ratio Zb and the virtual zoom ratio (=Za×Zb), wherein numerical values are rounded to one decimal. FIG. 36 shows this relationship in a graph.

TABLE 4

| ACTUAL ZOOM RATIO | PSEUDO ZOOM RATIO | VIRTUAL ZOOM RATIO |
| --- | --- | --- |
| 1.0–2.0 | 1.0 | 1.0–2.0 |
| 1.6 | 1.4 | 2.2 |
| 1.7 | 1.4 | 2.4 |
| 1.9 | 1.4 | 2.7 |
| 1.8 | 1.7 | 3.1 |
| 2.0 | 1.7 | 3.4 |
| 2.0 | 2.0 | 4.0 |

Figure 37:
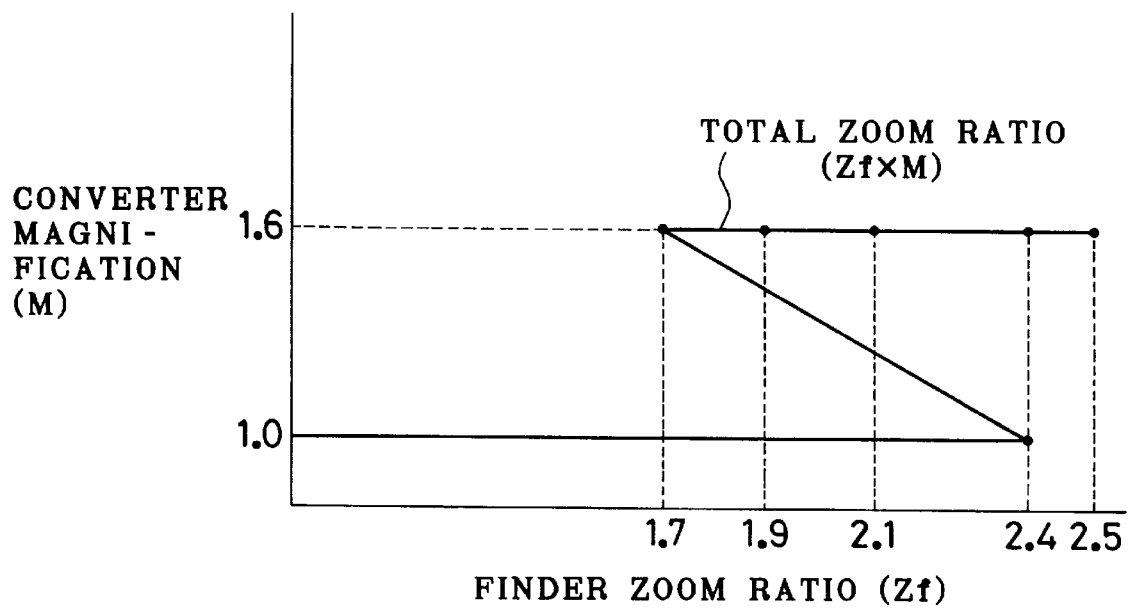
FIG. 37 is a graph illustrating a relationship between total zoom ratio of the finder optical system and zoom ratio of the zoom finder according to the embodiment of FIG. 34.

A finder optical system 6 consists of a zoom finder 124 and a converter lens 126. According to the present embodiment, the zoom finder 124 has a maximum zoom ratio of 2.5 and the converter lens 126 has a magnification of 1.6, while the taking lens 4 has the maximum zoom ratio of 2.0. A rotary cam barrel 138 of the zoom finder 124 is provided with two cam grooves 160 and 162 for first and second movable lenses 130 and 132, which are shaped such that the zoom ratio of the zoom finder 124 varies up and down in a way as shown in FIG. 37. Specifically, the finder zoom ratio Zf increases linearly till it reaches 2.4, and if the rotary cam barrel 138 is further rotated clockwise toward the telephoto side, the finder zoom ratio Zf drops down to 1.7 and, thereafter, increases stepwise up to the maximum value of 2.5.

A contact pattern 168 for switching over the position of the converter lens 126 depending upon the rotational position of the rotary cam barrel 138 is provided on an outer periphery of the rotary cam barrel 138 along its circumferential or rotational direction. The contact pattern 168 is brushed by a brush member 168A, see FIG. 35. Through the brush member 168A, a first kind of switching signal is generated from the contact pattern 168 when the finder zoom ratio Zf changes from 2.4 to 1.7 during the clockwise rotation of the rotary cam barrel 138.

Responsive to the first switching signal, the converter lens 126 is inserted into the optical axis of the zoom finder 124. Since the magnification of the converter lens 126 is 1.6 in this embodiment, the total zoom ratio of the finder optical system 6 becomes 2.72(=1.7×1.6). On the contrary, when the finder zoom ratio Zf changes from 1.6 to 2.4 during the counterclockwise rotation of the rotary cam barrel 138, a second kind of switching signal is detected from the contact pattern 168, and the converter lens 126 is retracted from the optical axis of the zoom finder 124 responsive to the second switching signal. Table 5 shows the relationship between the zoom ratio Zf of the zoom finder 124 and the converter lens 126, wherein numerical values are rounded to one decimal.

TABLE 5

| FINDER ZOOM RATIO | CONVERTER MAGNIFICATION | TOTAL ZOOM RATIO |
|---|---|---|
| 1–2.4 | 1.0 | 1–2.4 |
| 1.7 | 1.6 | 2.7 |
| 1.9 | 1.6 | 3.1 |
| 2.1 | 1.6 | 3.4 |
| 2.5 | 1.6 | 4.0 |

The rotational position of the rotary cam barrel 138 and the shapes of the cam grooves 160 and 162 are determined such that the total zoom ratio of the finder optical system 6 changes in correspondence with the virtual zoom ratio of the taking lens 4.

Figure 35:
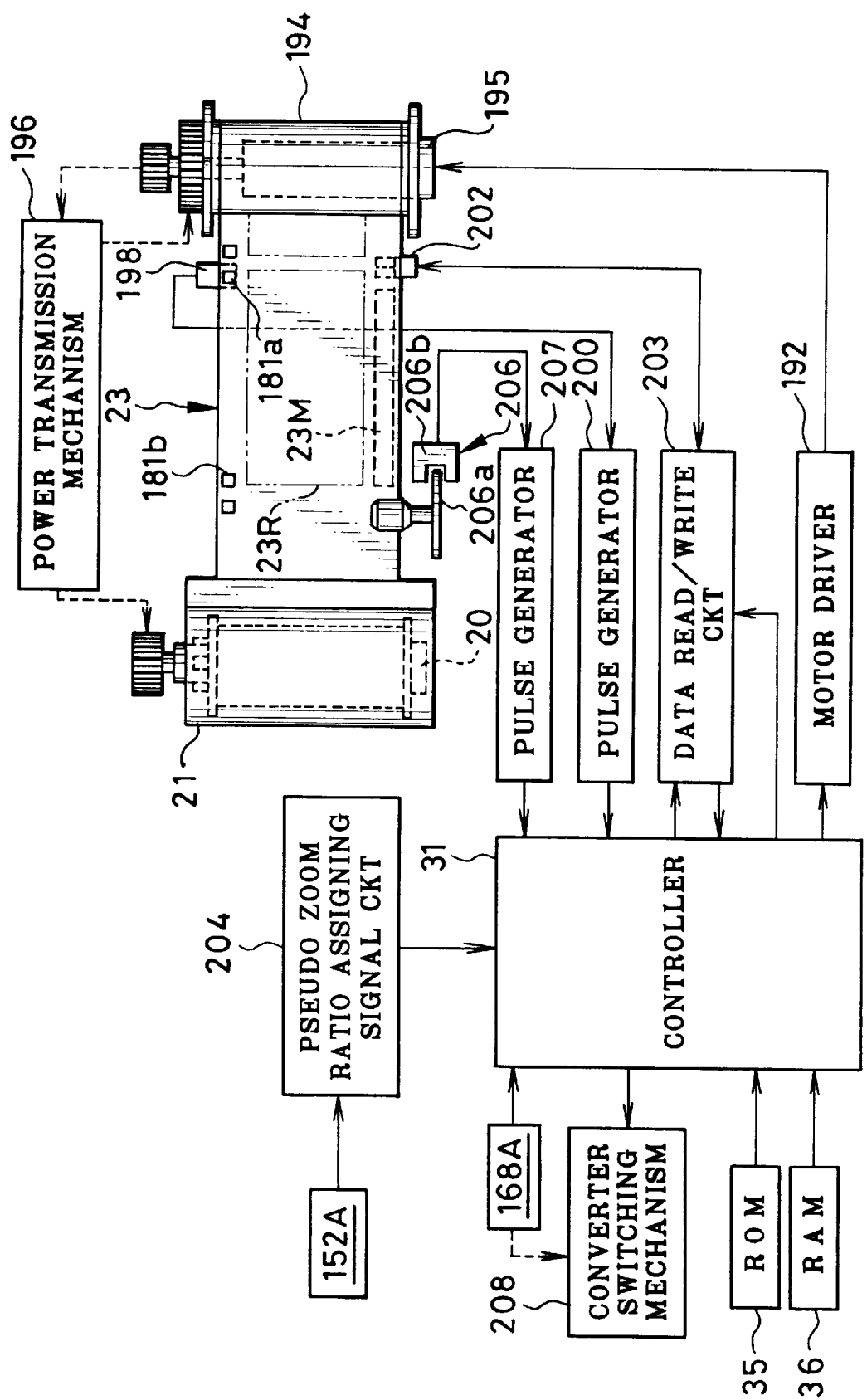
FIG. 35 is a diagram illustrating an internal construction of a zoom camera having the taking lens and the finder optical system of the embodiment of FIG. 34.

FIG. 35 shows an example of circuitry of a zoom camera provided with the taking lens 4 and the finder optical system 6 shown in FIG. 34. A controller 31 controls the whole operation of the camera according to a sequence program stored in a ROM 35. The ROM 35 stores various data necessary for controlling the camera. A RAM 36 serves as a work memory for temporarily storing data obtained during the operation. The controller 31 controls driving the lens motor 110 through a motor driver through it is not shown in the drawings.

The controller 31 also controls driving a film winding motor 195 through a motor driver 192. The rotational power of the film winding motor 195 is transmitted through a power transmission mechanism 196 to a spool 21 of a cartridge shell 21 in the first stage of film loading, such that the spool 21 is rotated in an unwinding direction to advance a filmstrip 23 out of the cartridge shell 23. Once a leader of the filmstrip 23 is coiled around a take-up spool 194, the filmstrip 23 is wound up onto the take-up spool 194 by rotating only the take-up spool 194.

While the filmstrip 23 is advanced, a perforation sensor 198 detects perforations 181a and 181b of the filmstrip 23 that are formed in pairs to indicate leading and trailing ends of each frame recording portion 23R. A detection signal generated each time the perforation sensor 198 detects the perforation 181a or 181b is shaped into a pulse signal through a pulse generator 200. The controller 31 counts the number of pulses, and stops advancing the filmstrip 23 when a frame recording portion 23R to be exposed first is positioned behind an exposure aperture.

A magnetic head 202 is provided for reading data from or writing data on a magnetic recording track 23M. The magnetic head 202 is driven by the controller 31 through a data read/write circuit 203 while the filmstrip 23 is advanced by one frame after each exposure. According to the present embodiment, the pseudo zoom ratio data that is produced from the signal from the brush member 152A through a pseudo zoom ratio assigning signal circuit 204, is written on the magnetic recording track 23M along with other photographic data such as exposure data, flash data, light source data, the date of photography and the like.

A rotary encoder 206 is provided for detecting the advancing speed of the filmstrip 23. The rotary encoder 206 consists of an encoding plate 206a that rotates following the advancing filmstrip 23, and a photo-interrupter 206b. A photo-electric signal from the photo-interrupter 206b is shaped into an encoder pulse signal through a pulse generator 207. As the frequency of the encoder pulse signal represents the advancing speed of the filmstrip 23, the controller 31 synchronizes the data reading and writing operation of the magnetic head with the film advancing speed.

The switching signal detected from the contact pattern 168 through the brush member 168A is also sent to the controller 31, so the controller 31 switches over the position of the converter lens 126 through a converter switching mechanism 208. It is alternatively possible to actuates the converter switching mechanism 208 by the switching signal applied directly from the brush member 168A, as shown by dashed line in FIG. 35.

Although the pseudo zoom ratio data is written on the magnetic recording track 23M of the filmstrip 23 in the present embodiment, it is possible to write the pseudo zoom ratio data in an IC memory in the same way as described with respect to the embodiment shown in FIG. 2. That is, the pseudo zoom ratio data may be written in the IC memory 24 and/or on the magnetic recording track 23M in any of the above described embodiments.

Figure 38:
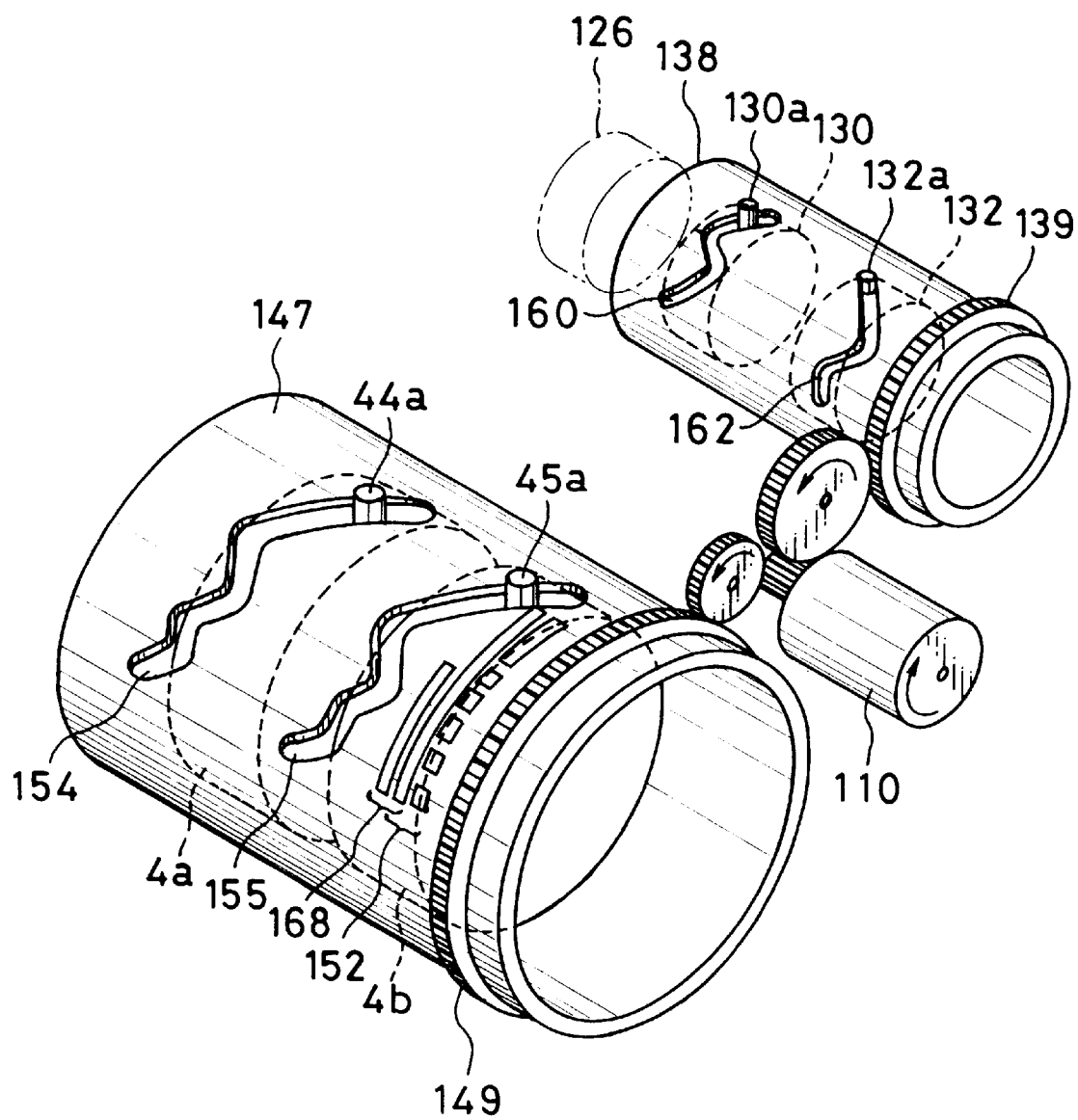
FIG. 38 is a perspective view of a taking lens and a finder optical system as a modification of the embodiment of FIG. 34.

It is possible to provide the converter switching contact pattern 168 as well as the pseudo zoom ratio assigning contact pattern 152 on the periphery of the rotary cam barrel 147 of the taking lens 4, as shown in FIG. 38. It is also possible to provide both the converter switching contact pattern 168 and the pseudo zoom ratio assigning contact pattern 152 on the periphery of the rotary cam barrel 138 of the zoom finder 124, as shown in FIG. 39.

Figure 39:
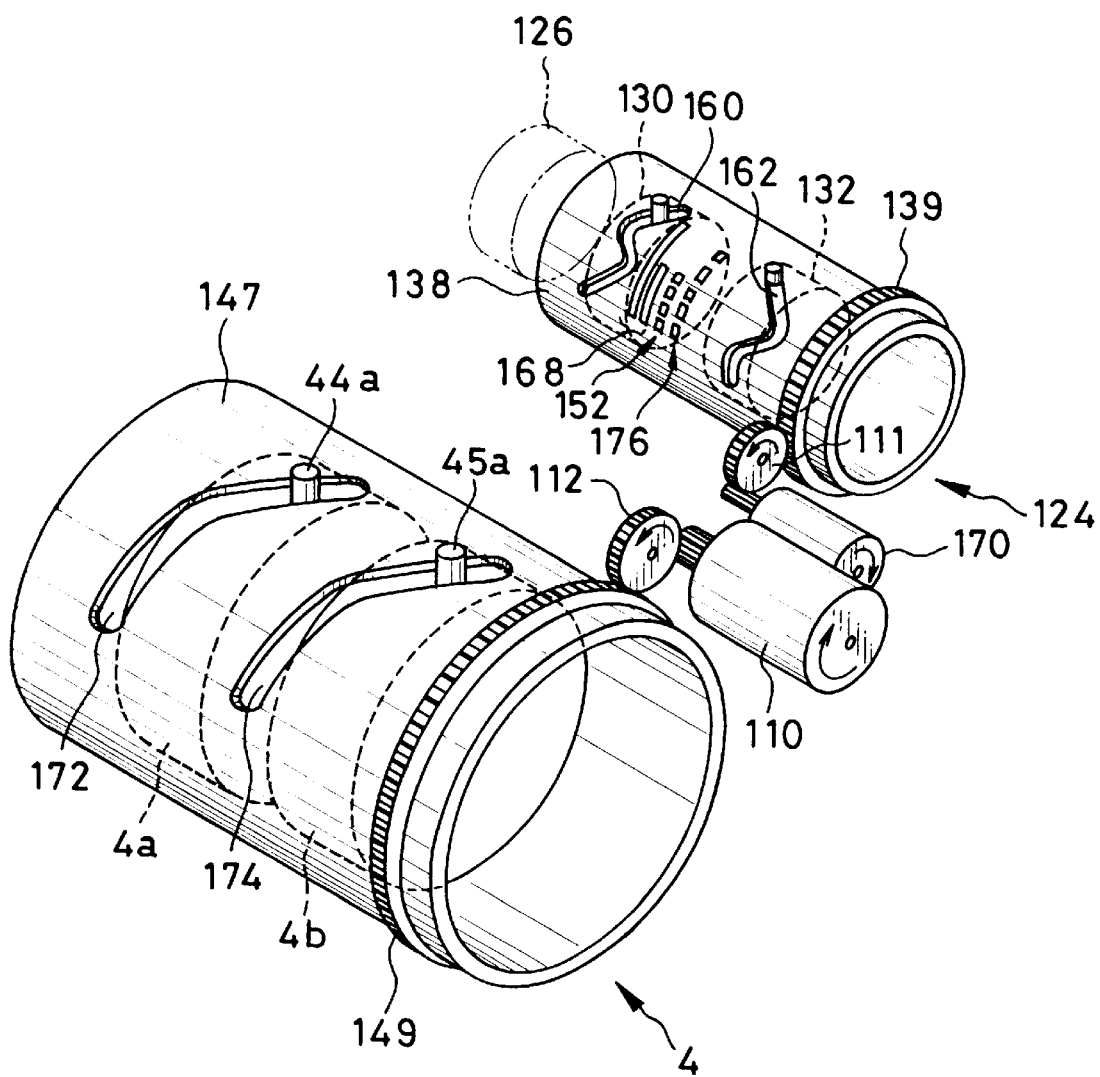
FIG. 39 is a perspective view of a taking lens and a finder optical system according to another embodiment of the invention.

Although the rotary cam barrels 138 and 147 of the zoom finder 124 and the taking lens 4 are rotated by the single lens motor 110 in the above embodiments, the rotary cam barrels 138 and 147 may be driven by individual motors 120 and 110 as shown in FIG. 39. In that case, the rotary cam barrels 138 and 147 may be rotated either in the same direction or in the opposite directions from each other at the same time. Therefore, even for controlling the zoom ratio of the taking lens 4 in the way as shown in FIG. 36, the rotary cam barrel 147 of the taking lens 4 may have cam grooves 172 and 174 that cause front and rear lens groups 4a and 4b to move in one direction while the rotary cam barrel 147 rotates in one direction. That is, the rotary cam barrel 147 with the cam grooves 172 and 174 are rotated in the counterclockwise direction in FIG. 39 when to put down the actual zoom ratio of the taking lens 4 after the converter lens 126 is inserted in the optical axis of the zoom finder 124. On the other hand, the rotational direction and amount of the rotary cam barrel 138 of the zoom finder 124 are determined in accordance with the direction and amount of a zooming operation.

To switch over the rotational direction of the rotary cam barrel 147 depending upon the rotational position of the rotary cam barrel 138 of the zoom finder 124, a zooming direction designating contact pattern 176 is provided on the periphery of the rotary cam barrel 138. Based on a signal detected from the zooming direction designating contact pattern 176 through a not-shown brush member, the motor 110 for zooming the taking lens 4 is driven in the forward or the reverse direction to achieve an approximately linear virtual zoom ratio curve in combination with the pseudo zooming function.

Figure 40:
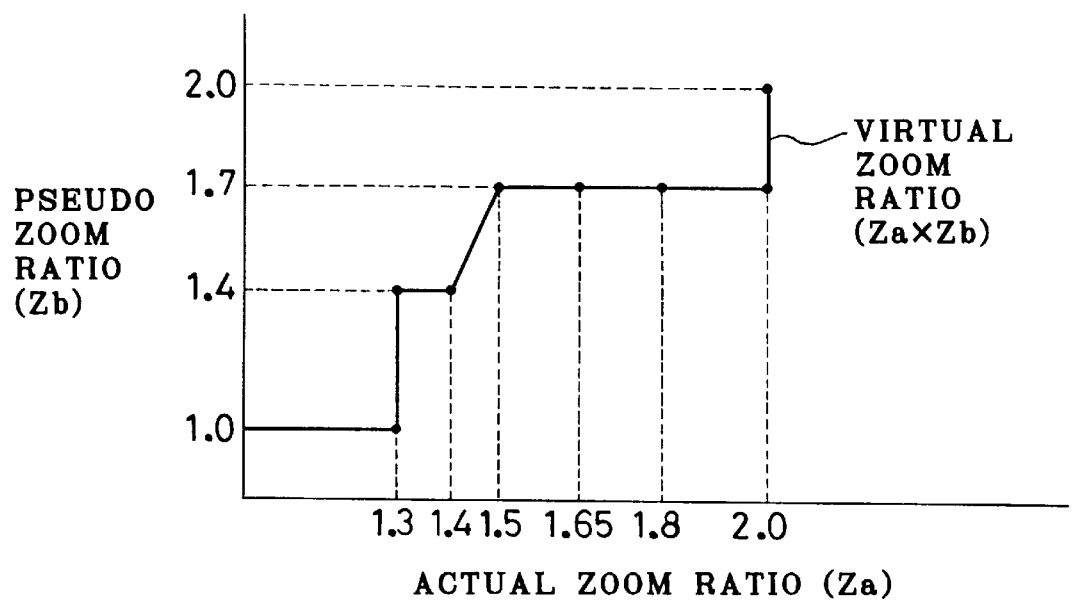
FIG. 40 is a graph illustrating a relationship between actual zoom ratio of a taking lens and pseudo zoom ratio according to another embodiment of the invention.
Figure 41:
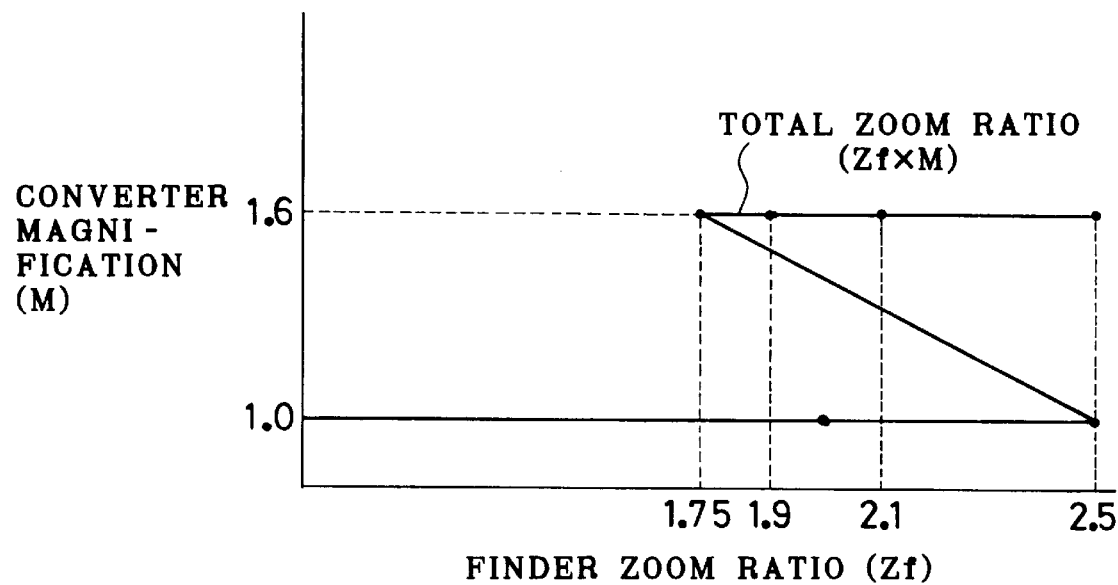
FIG. 41 is a graph illustrating a relationship between total zoom ratio of a finder optical system consisting of a zoom finder and a converter lens, and zoom ratio of the zoom finder according to the embodiment of FIG. 40.

It is possible to use the finder optical system consisting of a zoom finder and at least a converter lens in a zoom camera wherein the pseudo zooming function is used in a zooming range before the actual zoom ratio of a taking lens reaches its maximum value, as shown for example in FIG. 40. Table 6 shows the relationship between the actual zoom ratio Za, the pseudo zoom ratio Zb and the virtual zoom ratio Za×Zb, that is shown in FIG. 40. Assuming that the zoom finder has a maximum zoom ratio of 2.5, and a single converter lens of 1.6 magnification is used, the total zoom ratio of the finder optical system is adjusted to the virtual zoom ratio of the taking lens in the way as shown in FIG. 41. Table 7 show the relationship between the zoom ratio Zf of the zoom finder, and the total zoom ratio Zf×M of the finder optical system. In Tables 6 and 7, numerical values are rounded to one decimal.

TABLE 6

| ACTUAL ZOOM RATIO | PSEUDO ZOOM RATIO | VIRTUAL ZOOM RATIO |
|---|---|---|
| 1.0 | 1.0 | 1.0 |
| 1.3 | 1.0 | 1.3 |
| 1.3 | 1.4 | 1.8 |
| 1.4 | 1.4 | 2.0 |
| 1.5 | 1.7 | 2.5 |
| 1.65 | 1.7 | 2.8 |
| 1.8 | 1.7 | 3.1 |
| 2.0 | 1.7 | 3.4 |
| 2.0 | 2.0 | 4.0 |

TABLE 7

| FINDER ZOOM RATIO | CONVERTER MAGNIFICATION | TOTAL ZOOM RATIO |
|---|---|---|
| 1–2.5 | 1.0 | 1–2.5 |
| 1.75 | 1.6 | 2.8 |
| 1.9 | 1.6 | 3.1 |
| 2.1 | 1.6 | 3.4 |
| 2.5 | 1.6 | 4.0 |

It is possible to zoom a zoom finder at the same zoom ratio as a taking lens, and insert one or more than one converter lens into the optical axis of the zoom finder such that the total magnification of the inserted converter lenses coincides with the pseudo zoom ratio assigned to the taking lens. It is also possible to constitute a finder optical system of a fixed focus lens and a plurality of converter lenses, and insert the converter lenses in the optical axis of the fixed focus lens to change the total magnification of the finder optical system in accordance with the virtual zoom ratio.

Figure 42:
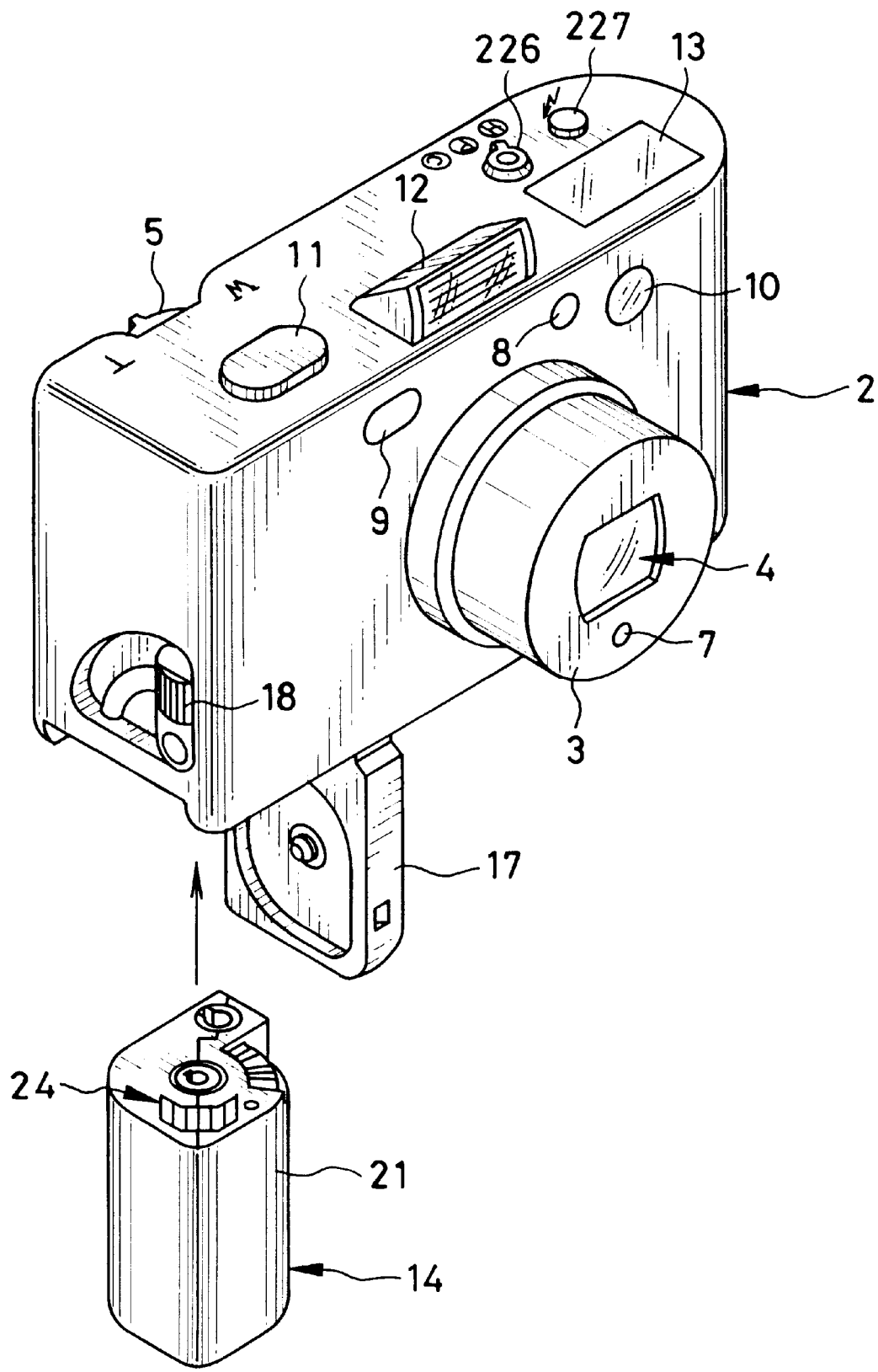
FIG. 42 is a perspective view illustrating an outer appearance of a zoom camera.

FIG. 42 shows a zoom camera 2 according to another embodiment of the invention. Fundamental constructions of the zoom camera 2 of this embodiment may be equivalent to those shown in FIG. 1. In FIG. 42, the same reference numerals as used in the above embodiments designate corresponding elements, so the following description relates only to those elements essential for explaining the present embodiment.

Figure 43:
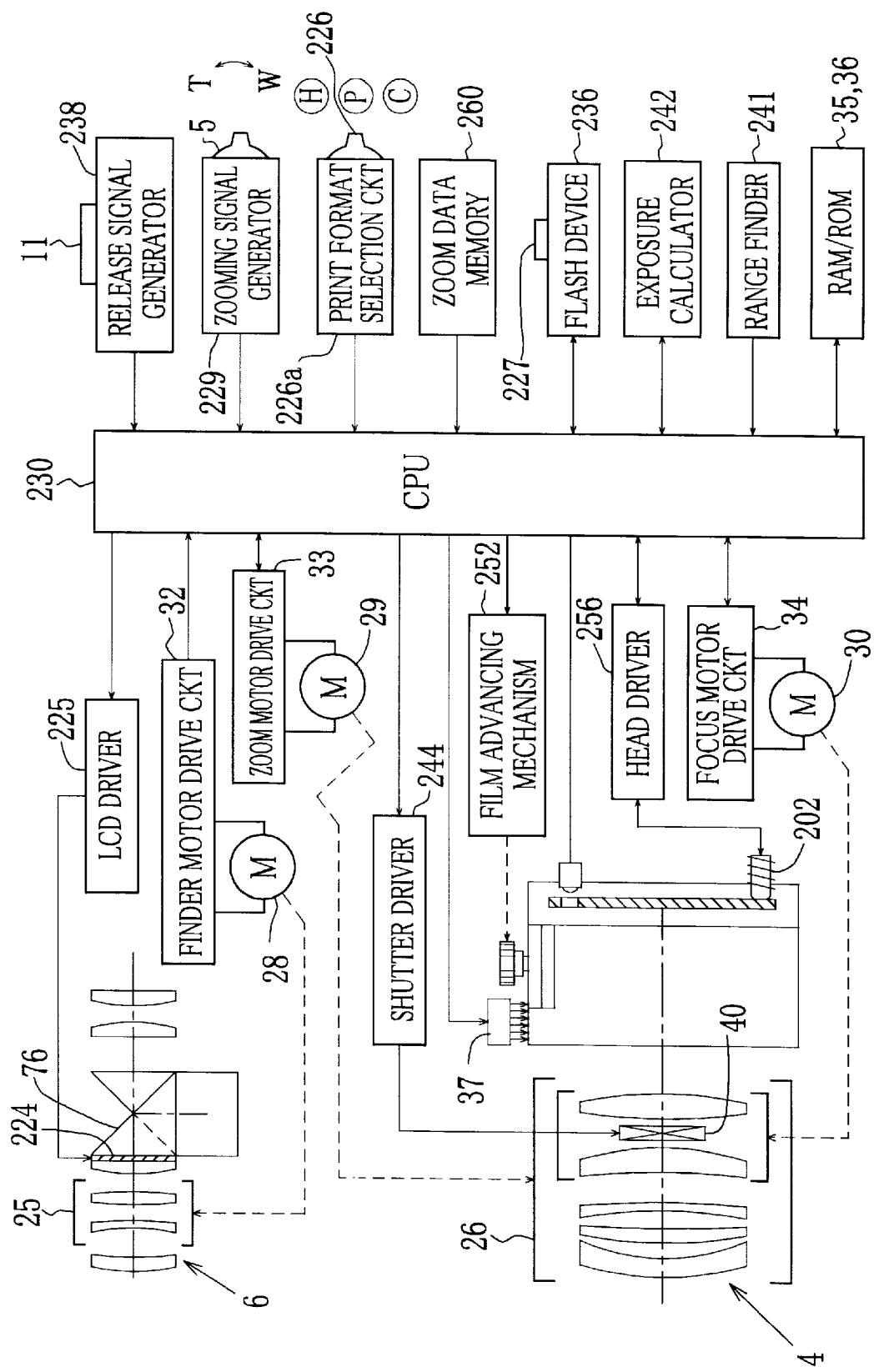
FIG. 43 is a block diagram illustrating an internal construction of the zoom camera, according another preferred embodiment of the invention.

The camera of FIG. 42 has not only the pseudo zooming function, but also a print format designating function. To choose a print format from among three options: a high-vision size, a panoramic size and a conventional size, a switching lever 226 is provided on a top portion of the camera 2. By switching over the switching lever 226 between three positions indicated by "H", "P" and "C", which are respectively allocated to the high-vision size, the panoramic size and the conventional size, a corresponding print format selection signal is generated from a print format selection circuit 226a, as shown in FIG. 43, and thus one of these three print formats is assigned to each frame. As well-known in the art, the high-vision size has an aspect ratio of about 1.8, and the panoramic size has an aspect ratio of about 3.0, whereas the conventional size has an aspect ratio of about 1.4 that is substantially equal to the aspect ratio of the full size frame of conventional 135-type film.

To adjust the field of view to the selected print format, an LCD panel 224 is provided in a finder optical system 6. In this embodiment, the camera 2 is loaded with an IX240 type photo film cartridge 14, and every frame is photographed in the high-vision size on a photo filmstrip 23. Therefore, the view field has the high-vision size aspect ratio without any limitation. When the panoramic size print format is selected, the LCD panel 224 is driven to limit the vertical length of the view field by a CPU 230 through an LCD driver 225 in correspondence with the panoramic size aspect ratio. When the conventional size print format is selected, the LCD panel 224 is driven to limit the horizontal length of the view field in correspondence with the conventional size aspect ratio.

The finder optical system 6 constitutes a real image type zoom finder, wherein an image of a photographic subject is formed through an objective lens unit on an initial incident surface of a Porro prism 76, and the image is viewed as an erect image through the Porro prism 76 and an eyepiece lens. The objective lens unit constitutes a zoom lens which is driven by a finder motor 28 through a finder zooming mechanism 25 under the control of the CPU 230.

The taking lens 4 is a zoom lens consisting of two lens groups, wherein both lens groups are moved for zooming by a zoom motor 29 through a lens zooming mechanism 25, whereas only the rear lens group is moved for focusing by a focus motor 30 through a focusing mechanism 27. In this embodiment, a shutter unit 40 is provided as a between-lens shutter.

A finder motor drive circuit 32 and a zoom motor drive circuit 33 include rotary encoders to detect rotational positions of the finder motor 28 and the zoom motor 29 respectively. The rotational positions of the motors 28 and 29 are fed back to the CPU 230, so the CPU 230 can control the zooming positions of the finder optical system 6 and the taking lens 4 while monitoring them. It is alternatively possible to detect rotational position or axial position of the finder zooming mechanism 25 and that of the lens zooming mechanism 26 in order to detect the zooming positions of the finder optical system 6 and the taking lens 4.

For example, the focal length of the taking lens 4 can change from 24 mm to 48 mm. That is, the maximum zoom ratio of the taking lens 4 is 2.0, whereas the pseudo zoom ratio is chosen from among four options: 1.2, 1.4, 1.7 and 2.0, aside from the pseudo zoom ratio of 1.0 that has no pseudo zooming effect on the actual zoom ratio. The finder zooming position or finder zoom ratio of the finder optical system 6 is controlled according to the zooming direction and amount entered through a zooming lever 5, such that the finder zoom ratio coincides with the virtual zoom ratio of the camera 2 that is obtained by multiplying the actual zoom ratio of the taking lens 4 by the pseudo zoom ratio. Accordingly, the finder optical system 6 is designed to have a maximum zoom ratio of 4.0.

As well-known in the art, when the panoramic size print format is designated, a printing area having an aspect ratio of 3.0 is defined by masking out upper and lower portions of an original frame, and is printed into a panoramic size print whose short side length is equal to that of the high-vision or the conventional size print, but the long side length is three times its own short side length. For this purpose, a larger magnification that is 1.7 times the standard print magnification is used for making the panoramic size print. As described above, the standard print magnification is used for printing the whole area of the high-vision size frame into the high-vision size print. Therefore, it is preferable to make the pseudo zoom ratio of 1.7 available, because the print magnification of 1.7 times the standard print magnification is usable both for making the panoramic size print and for making a pseudo zoom print at the pseudo zoom ratio of 1.7.

According to the present embodiment, the zooming position of the taking lens 4 and the pseudo zoom ratio are determined not only according to the finder zooming position that is determined by the zooming direction and amount entered through the zooming lever 5, but also according to other photographic conditions. The photographic conditions include brightness and distance of the photographic subject, and flash mode that is selected by operating a flash mode button 227, as well as the print format selected by the switching lever 226. In this instance, the camera 2 is provided with three flash modes: an auto-flash mode where a flash device 236 fires when the subject brightness is below a predetermined level, a flash-on mode where the flash device 236 fires at each exposure, and a flash-off mode where the flash device 236 is deactivated.

For this purpose, a zoom data memory 260 stores a look-up table as shown in Table 8, wherein the optical finder system 6 is determined to be zoomed in 16 steps from 1.0 to 4.0 at an increment of 0.2 in zoom ratio, and a plurality of combinations of actual zoom ratio and pseudo zoom ratio are allocated to one finder zooming position in a range of from 1.2 to 3.4 in zoom ratio.

TABLE 8

| FINDER ZOOM RATIO | ACTUAL ZOOM RATIO | PSEUDO ZOOM RATIO |
|---|---|---|
| 1.0 | 1.0 | 1.0 |
| 1.2 | 1.2 | 1.0 |
|  | 1.0 | 1.2 |
| 1.4 | 1.4 | 1.0 |
|  | 1.17 | 1.2 |
|  | 1.0 | 1.4 |
| 1.6 | 1.6 | 1.0 |
|  | 1.33 | 1.2 |
|  | 1.14 | 1.4 |
| 1.8 | 1.8 | 1.0 |
|  | 1.5 | 1.2 |
|  | 1.29 | 1.4 |
|  | 1.06 | 1.7 |
| 2.0 | 2.0 | 1.0 |
|  | 1.67 | 1.2 |
|  | 1.43 | 1.4 |
|  | 1.18 | 1.7 |
|  | 1.0 | 2.0 |
| 2.2 | 1.83 | 1.2 |
|  | 1.57 | 1.4 |
|  | 1.29 | 1.7 |
|  | 1.1 | 2.0 |
| 2.4 | 2.0 | 1.2 |
|  | 1.71 | 1.4 |
|  | 1.41 | 1.7 |
|  | 1.2 | 2.0 |
| 2.6 | 1.86 | 1.4 |
|  | 1.53 | 1.7 |
|  | 1.3 | 2.0 |
| 2.8 | 2.0 | 1.4 |
|  | 1.65 | 1.7 |
|  | 1.4 | 2.0 |
| 3.0 | 1.76 | 1.7 |
|  | 1.5 | 2.0 |
| 3.2 | 1.88 | 1.7 |
|  | 1.6 | 2.0 |
| 3.4 | 2.0 | 1.7 |
|  | 1.7 | 2.0 |
| 3.6 | 1.8 | 2.0 |
| 3.8 | 1.9 | 2.0 |
| 4.0 | 2.0 | 2.0 |

Since the finder zoom ratio is determined to be equal to the multiplication product of the actual zoom ratio and the pseudo zoom ratio, the view field of the finder optical system 6 always corresponds to the photographic field that would be included in the printing area. Although the photographic field included in the printing area is unchanged at the same finder zoom ratio regardless of the variation in actual zoom ratio and pseudo zoom ratio, the higher print quality is achieved at the lower pseudo zoom ratio. On the other hand, in order to prevent blurring due to camera-shake, it is preferable to choose the lower actual zoom ratio because the shutter speed may be higher at the lower actual zoom ratio. Because the depth of field gets larger as the actual zoom ratio is lowered, the lower actual zoom ratio is also preferable in view of focusing.

Figure 44:
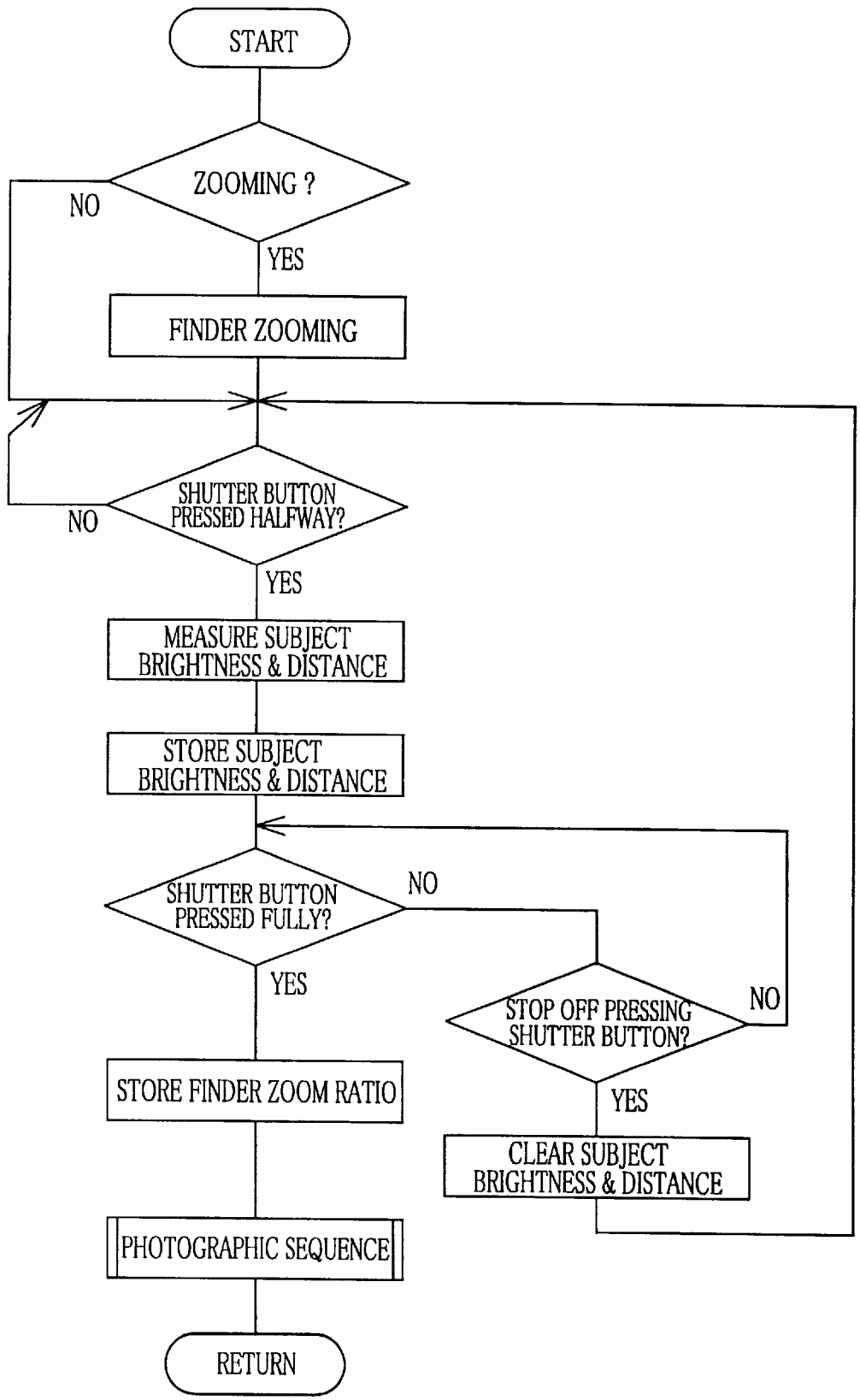
FIG. 44 is a flow chart illustrating a main sequence for controlling overall operation of the zoom camera according to the embodiment of FIG. 42.

Now the operation of the zoom camera 2 constituted as shown in FIGS. 42 and 43 will be described with reference to flow charts of FIGS. 44 to 46.

The CPU 230 sequentially controls the whole parts of the camera 2 in accordance with a program stored in a ROM 35. When the zooming lever 5 is operated to the telephoto side or to the wide-angle side, the finder optical system 6 is zoomed up or down in an approximately linear fashion throughout its zooming range of from 1.0 to 4.0 in zoom ratio. Along with the zooming of the finder optical system 6, finder zoom ratio data is fed back from the finder motor drive circuit 32, and is revised in a predetermined location of a RAM 36. When a shutter button 11 is pressed halfway, a release signal generator 238 sends out a first release signal to the CPU 230. Upon the first release signal, the CPU 230 activates a range finder 241 to measure a subject distance through the light projecting and receiving windows 8 and 9, and reads in a subject brightness measured through a photosensor 7. The measured subject brightness and distance are stored in the RAM 36. If the photographer stops off pressing the shutter button 11, the stored data of the subject brightness and distance is cleared, and the routine returns to the stage of waiting for the first release signal.

When the shutter button 11 is fully pressed, the release signal generator 238 sends out a second release signal to the CPU 230. Upon the second release signal, the CPU 230 starts a photographic sequence as shown in FIG. 45. In the photographic sequence, the CPU 230 reads out the finder zoom ratio and the subject brightness and distance from the RAM 36, checks the present flash mode. Then, the CPU 230 determines the actual zoom ratio and the pseudo zoom ratio with reference to the look-up table stored in the zoom data memory 260, that corresponds to Table 8.

For example, in a case where the finder zoom ratio is 2.2, there are four options in the combinations of actual zoom ratio and pseudo zoom ratio. Unless the panoramic size print format is selected, the CPU 230 chooses an optimum combination from among these options depending upon the present flash mode and the subject brightness and distance. The chosen actual zoom ratio and pseudo zoom ratio are written in a designated location of the RAM 36. After the actual zoom ratio of the taking lens 4 is determined in this way, the CPU 230 refers to the ROM 35 to read out an f-number of the taking lens 4 at the chosen zoom ratio from a table showing a relationship between f-number and zoom ratio of the taking lens 4.

The f-number and the subject brightness are sent to an exposure calculator 242, where an optimum shutter speed is calculated based on the subject brightness, while considering the f-number, a film speed of the filmstrip 23 and whether the flash device 236 is going to fire or not.

Simultaneously, the zoom motor 29 is driven to zoom the taking lens 4 at the chosen zoom ratio, and the focus motor 30 is driven to focus the taking lens 4 on the subject distance. Thereafter, the shutter unit 40 is driven through a shutter driver 244 in accordance with the shutter speed determined by the exposure calculator 242.

After an exposure is accomplished in this way, the CPU 230 accesses the RAM 36 and checks if there is the pseudo zoom ratio data in the predetermined location. It is to be noted that the pseudo zoom ratio of 1.0 is not regarded as the pseudo zoom ratio data. The CPU 230 transfers the pseudo zoom ratio data to a data read/write device 37, so the pseudo zoom ratio data is written in an IC memory 24 of the photo film cartridge 14.

Concurrently, the CPU 230 drives a film advancing mechanism 252 to advance the filmstrip 23 by one frame with reference to perforations of the filmstrip 23 detected through a perforation sensor 198. For example, the film advancing mechanism 252 includes a film winding motor, a take-up spool and a power transmission mechanism like as shown in FIG. 35. While the filmstrip 23 is advanced by one frame, the CPU 230 drives a magnetic head 202 through a head driver 256 to record photographic data about the photographed frame on a transparent magnetic recording layer that is provided on the back side of the filmstrip 23.

When all available exposures are accomplished, the filmstrip 23 is wound back into a cartridge shell 21. The cartridge shell 21 containing the exposed filmstrip 23 is unloaded from the camera 2 and is subjected to a photofinishing process. After the photofinishing, the developed filmstrip 23 is rewound into the same cartridge shell 21.

Figure 47A:
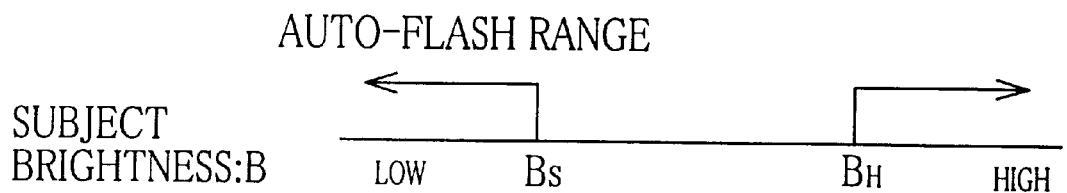
FIG. 47A is a diagram illustrating reference values for subject brightness in the actual zoom ratio choosing sequence of FIG. 46.
Figure 47B:
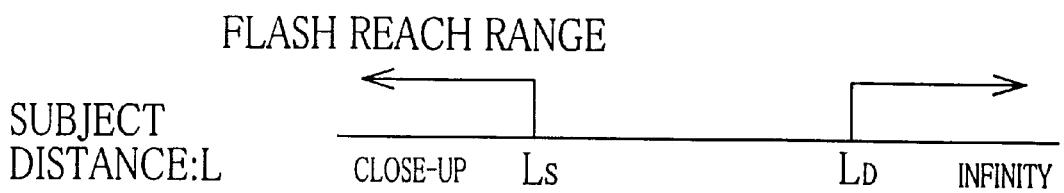
FIG. 47B is a diagram illustrating reference values for subject distance in the actual zoom ratio choosing sequence of FIG. 47B.

The actual zoom ratio is determined according to an actual zoom ratio choosing sequence as shown in FIG. 46, that may be modified depending upon characteristics of the camera. In this sequence, two reference values Bs and BH are used for classifying the subject brightness B measured through the photosensor 7, as shown in FIG. 47A. The subject brightness Bs is a threshold level below which the flash device 236 fires in the auto-flash mode, whereas the subject brightness BH is a level above which the photography can be taken at a sufficient exposure amount without any supplemental illumination. As shown in FIG. 47B, the subject distance L measured through the range finder 241 is classified with reference to two values Ls and LD. The subject distance Ls is an upper limit of a flash reach range within which the flash light can reach with a sufficient intensity, whereas the subject distance LD shows a border beyond which a main subject, such as a person to photograph, may be too small at the wide-angle position. For example, the subject distance LD is 7 m to 8 m.

When the subject brightness B is lower than the level Bs and the flash device 236 is going to fire, the subject distance L is compared with the value Ls. If L<Ls, the flash photography will be done properly. Therefore, in order to give priority to the print quality, an actual zoom ratio priority mode is selected, wherein the pseudo zoom ratio is set to be as low as possible. That is, the largest actual zoom ratio combined with the smallest pseudo zoom ratio is first chosen from among those options given to the presently selected finder zoom ratio. For example, when the finder zoom ratio is 2.2, the combination of actual zoom ratio of 1.83 and pseudo zoom ratio of 1.2 is the first to be chosen.

Figure 48:
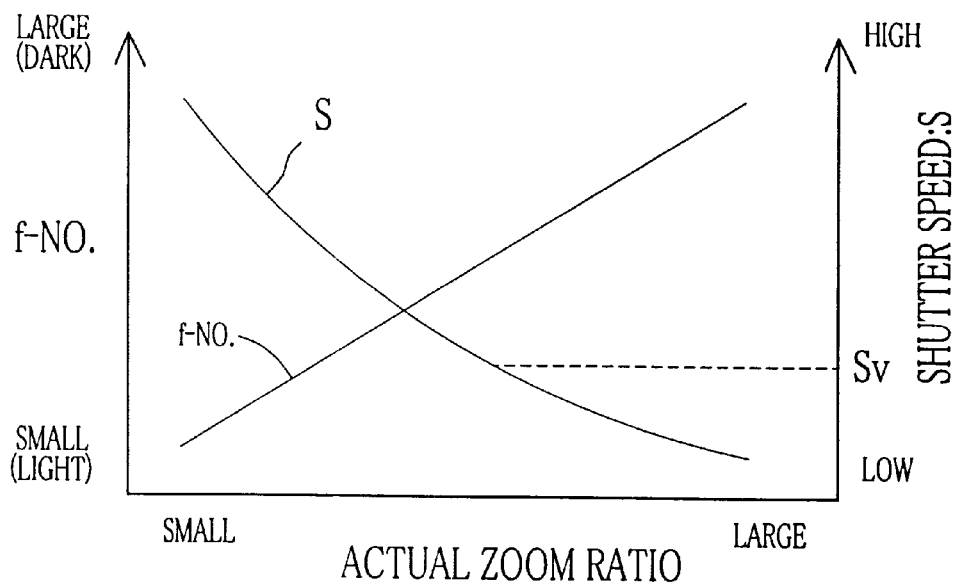
FIG. 48 is a graph illustrating a relationship between f-number and actual zoom ratio of the taking lens and shutter speed.

However, as well known in the art, the f-number of the taking lens 4 increases with an increase in the actual zoom ratio of the taking lens 4, and the shutter speed S decreases with an increase in the f-number, as shown in FIG. 48. Therefore, if the f-number at the first chosen actual zoom ratio is so large and thus the shutter speed S will be so low that the camera-shake may affect the photography, the actual zoom ratio is shifted one step toward the lower value within the options for the same finder zoom ratio. Correspondingly, the pseudo zoom ratio is shifted one step toward the higher value. For example, $1/30$ seconds may be a threshold shutter speed Sv below which the camera-shake may affect the photography.

In a case where the subject distance L is larger than the value Ls, and the flash device 236 is going to fire, the flash light cannot sufficiently illuminate the subject. If a larger actual zoom ratio is chosen in that case, the f-number can be too large to obtain a proper exposure amount, because the transmittance of the taking lens 4 is lowered with the increase in f-number. For this reason, when the subject distance L is larger than the value Ls, a pseudo zoom ratio priority mode is selected, wherein the smallest actual zoom ratio combined with the largest pseudo zoom ratio is chosen. In this way, the lack of flash light is compensated by making the transmittance of the taking lens 4 as large as possible.

When the subject brightness B is below the level Bs though the flash-off mode is selected, the subject distance L is compared with the value LD. If L is not less than the value LD, the actual zoom ratio is chosen in the actual zoom ratio priority mode. This is because for the subject in the distant range beyond the value LD the flash light is ineffective in any case, and thus the exposure amount will be under the proper value if the subject brightness B is below the level Bs, regardless of whether the flash device 236 fires nor not. Therefore, it is preferable to use the smallest possible pseudo zoom ratio, and photograph the main subject as large as possible by use of the largest possible actual zoom ratio, in order to minimize the print quality deterioration. If, on the contrary, the subject distance L is less than the value LD, the actual zoom ratio is chosen in the pseudo zoom ratio priority mode. This is because in the subject range nearer than the distance LD the photographed main subject will be large enough even at a smaller actual zoom ratio, so the smaller actual zoom ratio is preferable to make the f-number smaller and make up for the low subject brightness as much as possible.

When the subject brightness B is above the level Bs and the flash device 236 is not going to fire, the subject distance L is compared to the value LD. If the subject distance L is not less than the value LD, the actual zoom ratio priority mode is selected for the shake of better print quality. If the subject distance L is less than the value LD, the subject brightness B is compared with the level BH. If the subject brightness B is above the level BH, it means the subject brightness B is sufficiently high, so the actual zoom ratio is chosen in the actual zoom ratio priority mode. If the subject brightness B is below the level BH, the shutter speed S will be relatively low, and the aperture size will be relatively large, even through the shutter speed S is not lower than the threshold value Sv for the camera-shake. In that case, it is often preferable to choose the actual zoom ratio in the pseudo zoom ratio priority mode because it is possible to enlarge the depth of field of the taking lens 4.

When the flash device 236 is activated while the subject brightness B is above the level Bs, for example when the flash-on mode is selected as the main subject is back-lighted, the subject distance L is compared with the value Ls. On the same ground as described above, the actual zoom ratio is determined in the actual zoom ratio priority mode when L<Ls, or in the pseudo zoom ratio priority mode when L≧Ls.

The actual zoom ratio choosing sequence as shown in FIG. 46 is not applied when the panoramic size print format is selected by the switching lever 226. In that case, the pseudo zooming function is not used, and the actual zoom ratio combined with the pseudo zoom ratio of 1.0 is chosen from among the options predetermined for each finder zoom ratio. That is, the finder optical system 6 is prohibited from zooming up beyond the maximum zoom ratio of the taking lens 4, i.e., 2.0 in this instance. Since a larger print magnification that is 1.7 times the standard print magnification is needed for making the panoramic size print, if a pseudo zoom ratio of more than 1.0 is assigned to a panoramic size printing frame, the print magnification becomes too large to maintain adequate print quality. For this reason, the pseudo zooming function is prohibited when the panoramic size print format is selected.

As described so far, since a plurality of combinations of actual zoom ratio and pseudo zoom ratio are prepared for one finder zoom ratio, and an optimum one of those combinations is automatically chosen depending upon the photographic conditions, the print quality and the exposure condition are improved and the blurring due to the camera-shake is prevented, while making good use of the pseudo zooming function and the flash device.

In the above embodiment, the pseudo zoom ratio priority mode is determined to choose the smallest actual zoom ratio combined with the largest pseudo zoom ratio from among the predetermined options. However, it is possible to shift the actual zoom ratio step by step toward the larger value in the pseudo zoom ratio priority mode, insofar as the shutter speed S is maintained above the camera-shake threshold value Sv.

Figure 45:
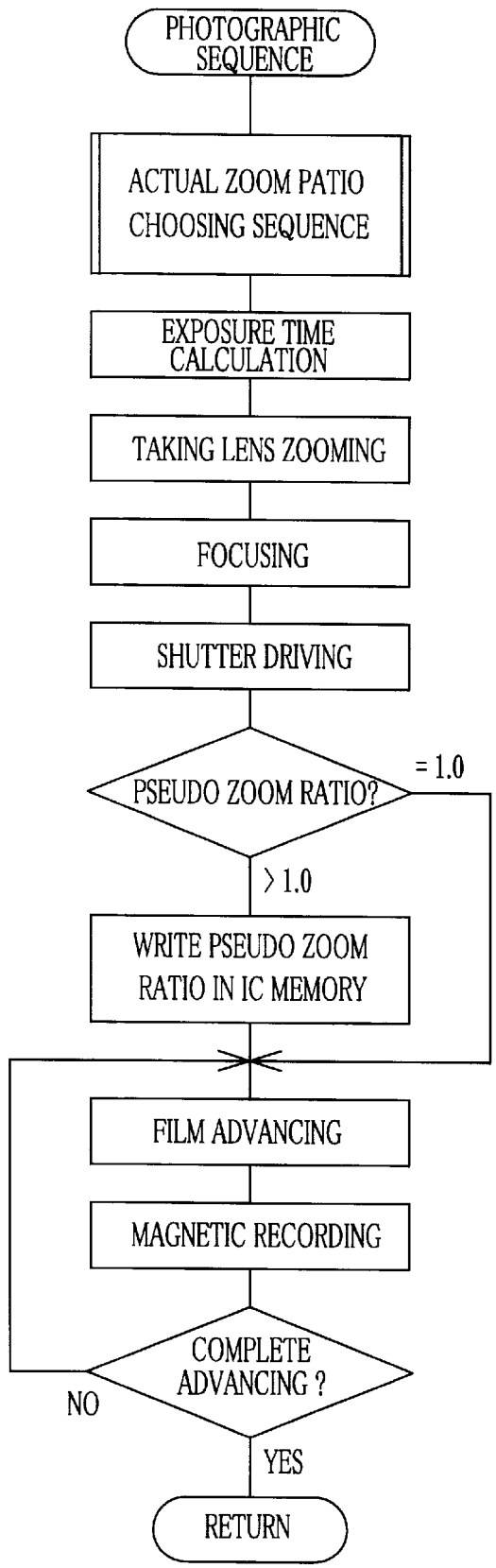
FIG. 45 is a flow chart illustrating a photographic sequence as a sub routine of the main sequence of FIG. 44.

Although the photographic sequence as shown in FIG. 45 is started upon the shutter button 11 being pressed to the full, it is also possible to start the photographic sequence upon the shutter button 11 being pressed halfway, and move the taking lens 4 to a zooming position determined depending upon the finder zoom ratio, the subject brightness and distance before the shutter button 11 is pressed to the full. In that case, focusing and shutter-releasing are effected upon the full depression of the shutter button 11.

Also in this embodiment, the finder optical system 6 may be replaced by an electric viewfinder such as shown in FIG. 23, or the pseudo zoom ratio data may be written on the magnetic recording layer by the magnetic head 202.

Although the pseudo zoom ratio data is written at each exposure, it is possible to write the pseudo zoom ratio data of all frames at the conclusion of the photography on one filmstrip.

In any of the above embodiments, the number and variations of the available pseudo zoom ratios may be modified appropriately. The present invention is applicable not only to IX240 cameras using the IX240 type photo film cartridge, but also to any other type cameras. For example, when applying to a Brownie camera, a print magnification of less than 1.0 may be possible.

Instead of zooming the taking lens 4 stepwise, it is possible to zoom the taking lens 4 without any steps. In that case, it is preferable to section the zooming position of the taking lens into several ranges, and allocate a pseudo zoom ratio, including 1.0, to each zooming range.

The lens construction and the maximum zoom ratio of the taking lens 4 as well as those of the finder optical system 6 may not be limited to the above embodiments. Of course, the appearance and other constructions of the zoom camera are not limited to the shown embodiments.

Thus, the present invention is not to be limited to the above embodiments but, on the contrary, various modifications are possible to those skilled in the art without departing from the scope of appended claims.

What is claimed is:

1. A zoom camera with a pseudo zooming function for assigning a frame a pseudo zoom ratio by which a printing area and a print magnification of the frame are modified to obtain a photo print which appears to have been taken at a virtual focal length that is equal to a multiplication product of the pseudo zoom ratio and an actual focal length of a taking lens used for photographing the frame, the zoom camera comprising:

a virtual focal length determining means for determining a virtual focal length in accordance with operating direction and amount of a manual zooming operation member, said virtual focal length ranging from a minimum virtual focal length defined by a minimum focal length of said taking lens to a maximum virtual focal length that is obtained by multiplying a maximum focal length of said taking lens by a maximum pseudo zoom ratio;

a finder controlling means for controlling a viewfinder in correspondence with said virtual focal length, to show a photographic field to be contained in a photo print as photographed at said virtual focal length;

a lens zooming means for changing actual focal length of said taking lens depending upon said virtual focal length in accordance with a predetermined relationship between virtual focal length and actual focal length and pseudo zoom ratio;

a pseudo zoom ratio deciding means for deciding a pseudo zoom ratio depending upon said virtual focal length in accordance with said predetermined relationship when a frame is photographed at said virtual focal length; and a pseudo zoom ratio recording means for recording said pseudo zoom ratio in association with said photographed frame; wherein as the virtual focal length is increased from the minimum virtual focal length to the maximum virtual focal length, the pseudo zoom ratio is set to other than a minimum pseudo zoom ratio prior to the actual focal length of the taking lens being set to a maximum actual focal length.

2. A zoom camera according to claim 1, wherein said lens zooming means changes the actual focal length stepwise and said pseudo zoom ratio deciding means chooses said pseudo zoom ratio from among predetermined options.

3. A zoom camera according to claim 1, wherein said viewfinder constitute an optical zoom finder having a corresponding focal length range to that of virtual focal length, and said finder controlling means changes focal length of said optical zoom finder in correspondence with said virtual focal length.

4. A zoom camera according to claim 3, wherein said pseudo zoom ratio deciding means detects zooming position of said zoom finder to decide said pseudo zoom ratio depending upon the zooming position of said zoom finder.

5. A zoom camera according to claim 1, wherein said viewfinder comprises an optical zoom finder having a corresponding focal length range to that of said taking lens, and a view field limiting device, and said finder controlling means changes focal length of said optical zoom finder in correspondence with said actual focal length being changed by said lens zooming means and drives the view field limiting device to limit the view field with an increase in said pseudo zoom ratio decided by said pseudo zoom ratio deciing means.

6. A zoom camera according to claim 1, wherein said viewfinder comprises an optical zoom finder, and at least a converter lens movable into and out of an optical axis of said optical zoom finder for changing a total focal length of said viewfinder, and said finder controlling means moves said converter lens into or out of the optical axis while controlling focal length of said optical zoom finder, thereby to change the total focal length of said viewfinder in correspondence with said virtual focal length.

7. A zoom camera according to claim 6, wherein focal length of said zoom finder is changed in correspondence with said virtual focal length without inserting said converter lens till said zoom finder reaches its maximum focal length, and thereafter focal length of said zoom finder is controlled in combination with said converter lens to change the total focal length of said viewfinder in correspondence with said virtual focal length.

8. A zoom camera according to claim 6, wherein said zoom finder has a corresponding focal length range to that of said taking lens, and said finder controlling means changes focal length of said zoom finder in correspondence with actual focal length of said taking lens, and when said virtual focal length goes above the maximum focal length of said taking lens, said finder controlling mens inserts one or more than one converter lens sequentially into the optical axis, and wherein said pseudo zoom ratio deciding means detects the insertion of said one or more than one converter lens to decide said pseudo zoom ratio by a magnification of said one converter lens or a total magnification of said more than one converter lens inserted in the optical axis.

9. A zoom camera according to claim 8, wherein said finder controlling means rotates a finder cam barrel of said zoom finder in accordance with operating direction and amount of said manual zooming operation member, and said finder cam barrel has first cam sections for changing focal length of said zoom finder along with the rotation of said finder cam barrel, and second cam sections that extend in a circumferential direction of said finder cam barrel to maintain focal length of said zoom finder at its maximum value through a limited rotational range of said finder cam barrel after said virtual focal length goes above the maximum focal length of said taking lens.

10. A zoom camera according to claim 9, wherein said converter lens is inserted into the optical axis of said zoom finder by a rotational movement of said finder cam barrel into said limited rotational range.

11. A zoom camera according to claim 3, wherein a single motor is used for changing focal length of said viewfinder and actual focal length of said taking lens.

12. A zoom camera according to claim 1, wherein said viewfinder constitute an electronic finder, and said finder controlling means controls image magnification of said electronic finder in correspondence with said virtual focal length in the whole range of virtual focal length.

13. A zoom camera according to claim 1, wherein said relationship is predetermined such that the whole range of virtual focal length is divided into a plurality of steps, and at least some of said virtual focal length steps are each allocated a plurality of options of pairs of actual zoom ratio and pseudo zoom ratio, and said pseudo zoom ratio deciding means decides said pseudo zoom ratio by choosing one pair among from said plurality of options depending upon said virtual focal length and photographic conditions at each photography.

14. A zoom camera according to claim 13, further comprising a flash mode selection device, an automatic exposure control device, and an automatic range finding device, wherein said photographic conditions include a subject brightness, a subject distance and a selected flash mode.

15. A zoom camera according to claim 13, further comprising a device for designating a print format of a different aspect ratio to each frame before photography, and said photographic conditions include said print format.

16. A method of controlling zoom camera with a pseudo zooming function for assigning a frame a pseudo zoom ratio, by which a printing area and a print magnification of the frame are modified to obtain a photo print which appears to have been taken at a virtual focal length that is equal to a multiplication product of the pseudo zoom ratio and an actual focal length of a taking lens used for photographing the frame, the method comprising the steps of:

determining a virtual focal length in accordance with a manual zooming operation, said virtual focal length ranging from a minimum focal length of said taking lens to a value that is equal to a multiplication product of a maximum focal length of said taking lens and a maximum pseudo zoom ratio;

controlling a viewfinder in correspondence with said virtual focal length, to show a photographic field to be contained in a photo print as photographed at said virtual focal length;

changing actual focal length of said taking lens depending upon said virtual focal length in accordance with a predetermined relationship between actual focal length and a virtual focal length and pseudo zoom ratio;

deciding a pseudo zoom ratio depending upon said virtual focal length in accordance with said predetermined relationship when a frame is photographed at said virtual focal length; and recording said pseudo zoom ratio in association with said photographed frame;

wherein said relationship is predetermined such that the actual focal length of said taking lens is determined to be equal to or less than said virtual focal length, and is increased or decreased in the same direction as said virtual focal length in the whole range of virtual focal length, and pseudo zoom ratio of more than 1.0 is used before said virtual focal length reaches the maximum focal length of said taking lens.

17. A method according to claim 16, wherein the whole range of virtual focal length is divided into a plurality of steps, and a pair of actual focal length and pseudo zoom ratio are allocated to each virtual focal length step in said predetermined relationship.

18. A method according to claim 16, wherein said relationship is predetermined such that the whole range of virtual focal length is divided into a plurality of steps, and at least some of said virtual focal length steps are each allocated a plurality of options of pairs of actual zoom ratio and pseudo zoom ratio, and wherein said method further comprises the step of choosing an optimum one of said plurality of options depending upon said virtual focal length and photographic conditions.

19. A method according to claim 18, wherein said photographic conditions include at least one of a subject brightness, a subject distance and whether a flash light is going to be projected or not.

20. A method according to claim 18, wherein said method further comprises the step of designating a print format of a different aspect ratio to each frame before photography, and said photographic conditions include said print format.

21. A zoom camera with a pseudo zooming function for assigning a frame a pseudo zoom ratio by which a printing area and a print magnification of the frame are modified to obtain a photo print which appears to have been taken at a virtual focal length that is equal to a multiplication product of the pseudo zoom ratio and an actual focal length of a taking lens used for photographing the frame, the zoom camera comprising:

a virtual focal length determining means for determining a virtual focal length in accordance with operating direction and amount of a manual zooming operation member, said virtual focal length ranging from a minimum virtual focal length defined by a minimum focal length of said taking lens to a maximum virtual focal length that is obtained by multiplying a maximum focal length of said taking lens by a maximum pseudo zoom ratio;

a finder controlling means for controlling a viewfinder in correspondence with said virtual focal length, to show a photographic field to be contained in a photo print as photographed at said virtual focal length;

a lens zooming means for changing actual focal length of said taking lens depending upon said virtual focal length in accordance with a predetermined relationship between virtual focal length and actual focal length and pseudo zoom ratio;

a pseudo zoom ratio deciding means for deciding a pseudo zoom ratio depending upon said virtual focal length in accordance with said predetermined relationship when a frame is photographed at said virtual focal length; and a pseudo zoom ratio recording means for recording said pseudo zoom ratio in association with said photographed frame;

wherein said lens zooming means changes actual focal length of said taking lens to be equal to said virtual focal length and said pseudo zoom ratio deciding means sets pseudo zoom ratio to be 1.0 in a range where said virtual focal length is within the maximum focal length of said taking lens, whereas in a range where said virtual focal length is above the maximum focal length of said taking lens, said lens zooming means maintains actual focal length of said taking lens at the maximum value, and pseudo zoom ratio is increased or decreased in proportion to operating direction and amount of said manual zooming operation member; and wherein said lens zooming means comprises a cam barrel with cam grooves and a device for rotating said cam barrel in accordance with operating direction and amount of said manual zooming operation member, said cam grooves having a first section for changing actual focal length of said taking lens along with rotation of said cam barrel, and a second section extending in a circumferential direction of said cam barrel to maintain actual focal length of said taking lens at the maximum value.

22. A zoom camera with a pseudo zooming function for assigning a frame a pseudo zoom ratio by which a printing area and a print magnification of the frame are modified to obtain a photo print which appears to have been taken at a virtual focal length that is equal to a multiplication product of the pseudo zoom ratio and an actual focal length of a taking lens used for photographing the frame, the zoom camera comprising:

a virtual focal length determining means for determining a virtual focal length in accordance with operating direction and amount of a manual zooming operation member, said virtual focal length ranging from a minimum virtual focal length defined by a minimum focal length of said taking lens to a maximum virtual focal length that is obtained by multiplying a maximum focal length of said taking lens by a maximum pseudo zoom ratio;

a finder controlling means for controlling a viewfinder in correspondence with said virtual focal length, to show a photographic field to be contained in a photo print as photographed at said virtual focal length;

a lens zooming means for changing actual focal length of said taking lens depending upon said virtual focal length in accordance with a predetermined relationship between virtual focal length and actual focal length and pseudo zoom ratio;

a pseudo zoom ratio deciding means for deciding a pseudo zoom ratio depending upon said virtual focal length in accordance with said predetermined relationship when a frame is photographed at said virtual focal length; and a pseudo zoom ratio recording means for recording said pseudo zoom ratio in association with said photographed frame;

wherein said lens zooming means changes actual focal length of said taking lens to be equal to said virtual focal length and said pseudo zoom ratio deciding means sets pseudo zoom ratio to be 1.0 in a range where said virtual focal length is within the maximum focal length of said taking lens, whereas in a range where said virtual focal length is above the maximum focal length of said taking lens, said lens zooming means varies actual focal length up and down between the maximum value and at least one predetermined smaller value, and pseudo zoom ratio is determined to increase or decrease in proportion to operating direction and amount of said manual zooming operation member; and wherein said lens zooming means rotates a cam barrel of said taking lens in accordance with operating direction and amount of said manual zooming operation member, and said cam barrel has first cam sections for changing actual focal length along with the rotation of said cam barrel, and second cam sections that wind back and forth in an axial direction of said cam barrel to vary actual focal length of said taking lens up and down between the maximum value and said at least one predetermined small value along with rotation of said cam barrel.

* * * * *